US010185882B2

United States Patent
Elarian

(10) Patent No.: US 10,185,882 B2
(45) Date of Patent: *Jan. 22, 2019

(54) METHOD FOR SYNTHESIZING ARABIC HANDWRITTEN TEXT

(71) Applicant: KING FAHD UNIVERSITY OF PETROLEUM AND MINERALS, Dhahran (SA)

(72) Inventor: Yousef S. I. Elarian, Jazan (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,550

(22) Filed: Jun. 12, 2018

(65) Prior Publication Data

US 2018/0300570 A1    Oct. 18, 2018

Related U.S. Application Data

(63) Continuation of application No. 15/496,031, filed on Apr. 25, 2017, which is a continuation of application
(Continued)

(51) Int. Cl.
*G06K 9/00* (2006.01)
*G06K 9/72* (2006.01)
(Continued)

(52) U.S. Cl.
CPC ......... *G06K 9/00859* (2013.01); *G06F 21/36* (2013.01); *G06K 9/00154* (2013.01);
(Continued)

(58) Field of Classification Search
CPC . G01C 21/36; G01C 21/3629; G06F 17/2211; G06F 17/30867; G10L 17/22
See application file for complete search history.

(56) References Cited

U.S. PATENT DOCUMENTS

| 5,416,898 A | 5/1995 | Opstad et al. |
| 5,504,822 A * | 4/1996 | Holt ........................ G06K 9/00 382/135 |
| 2004/0148577 A1 | 7/2004 | Xu et al. |

FOREIGN PATENT DOCUMENTS

KR    2008079657 A    9/2008

OTHER PUBLICATIONS

AK, S., "Turn Your Handwriting Into a Font With MyScriptFont", URL: http://www.hongkiat.com/blog/turn-handwriting-into-fonts/, hongkiat.com, 10 Pages total, (Feb. 18, 2015).
(Continued)

*Primary Examiner* — Manuchehr Rahmjoo
(74) *Attorney, Agent, or Firm* — Oblon, McClelland, Maier & Neustadt, L.L.P.

(57) ABSTRACT

Systems and associated methodology are presented for Arabic handwriting synthesis including accessing character shape images of an alphabet, determining a connection point location between two or more character shapes based on a calculated right edge position and a calculated left edge position of the character shape images, extracting character features that describe language attributes and width attributes of characters of the character shape images, the language attributes including character Kashida attributes, and generating images of cursive text based on the character Kashida attribues and the width attribues.

7 Claims, 82 Drawing Sheets

Related U.S. Application Data

No. 15/145,582, filed on May 3, 2016, now Pat. No. 10,055,659.

(60) Provisional application No. 62/156,690, filed on May 4, 2015.

(51) Int. Cl.
*G06F 21/36* (2013.01)
*G06K 9/62* (2006.01)
*G06K 9/46* (2006.01)

(52) U.S. Cl.
CPC ....... *G06K 9/00879* (2013.01); *G06K 9/4604* (2013.01); *G06K 9/6226* (2013.01); *G06K 9/72* (2013.01); *G06F 2221/2133* (2013.01); *G06K 2209/013* (2013.01)

(56) References Cited

OTHER PUBLICATIONS fontifier.com, "Fontifier—Your Own Handwriting on Your Computer!", URL: http://www.fontifier.com/, 1 Page total, (Feb. 18, 2015).

\* cited by examiner

| Isolated Shape (A) | | Ending Shape (E) | | Middle Shape (M) | Beginning Shape (B) |
|---|---|---|---|---|---|
| ٺ | ٮٮٮ | ٯ | ـٮ | ـٮـ ـٮـ ـٮـ ـٮـ | ٮـ ٮـ ٮـ ٮـ |

Figure 13

| Character-Shapes Covering (CSC) |
|---|
| Inputs:<br>$R$, a corpus of Arabic sentences<br>$A$, the alphabet of character-shapes<br>Include_lipo_condition, a flag to request lipogram monitoring |
| Output: $P$, an Arabic pangram |
| Algorithm:<br>1. Initiate set $S$ to contain all elements in $A$;<br>2. Let $H$ be the histogram of the character-shapes in $S$ based on probabilities computed from $R$;<br>3. Repeat until set $S$ is empty<br>4.    For each sentence $X$ of $R$<br>5.       Let $x$ be the set of character-shapes in $X$;<br>6.          if Include_lipo_condition<br>7.            remove from $x$ all character-shapes that only appear in ligative bigrams;<br>8.       Added_Value = $x \cap S$;<br>9.       $C_x$ = minimum($H$(Added_Value));<br>10.      Move $X$ with minimum $C_x$ to the output set $P$ resolving ties with the smallest $X$;<br>11.      Remove entries in $x$ from the set $S$; |

Figure 17

| | | |
|---|---|---|
| أصدق الأمور أثناء من الفرج | احذر صديقك ألف مرة | اختلط حلمهم بناياهم |
| الإفراط في التواضع يجلب المذلة | الشجاع من لا يغضب | رأي الناس الهلاك |
| احذروا ما قرب من الأرض | احفظ فرقتك الأبيض أيومك | إذا أنت منعتني من النقص فهي |
| إن البنات بفرشتنا يستتر | الأسود | الشهادة لي بقى كامل |
| الذل في المرض وفي الرضاعة | يُحسن الجار لجاره | يقفي الرسول لأمته |
| بقدر الرأي تصغر الرجل وبالأمل ينتظر | أكثر قراءة القرآن | فليع الرأي نصيحة حلم |
| الأمل | الأخ لأخيه | إذا تعرفت العظم كلمتها العظر |
| تكثرت الضياء على خراش فما يدري | أحفك أخاك من من لا أخا له | البرواء |
| خراش ما يسيد | كماع إلى الهيجا بغير سلاح | إذا تكلمت بالكلمة ملكتك |
| نتاس مسلوي الإخوان ذم لك ودُهُمُ | لا تعري طنونك | إذا تمنيت فاستكثر |
| الحق أكبح والباطل لجلج | و إن منلك لا تسوّف | إذا ذكرت الذئب فأعد له السما |
| الأعين مرائي | إذا مرع الفؤاد ذهب الرقاد | أورة في كومة هش |
| تلفح الأم السلم | إذا نل ماء الوجه على حيلوه | أقسم الحرق على الرافي |
| سلامة الحق من سلامة الأفاظ | إذا هبت ريلحك فاغتنمها | اجلس حيث يؤخذ بيدك وتُقر ولا |
| السلاح ثم الكفاح | تجلو و اعلم بأن النمر غير | تجلس حيث يؤخذ برجلك وتُخر |
| مسورنا ولا مسح غرينا | مكلل | |

Figure 18

KFUPM Arabic Handwritten Text Database
Database Collection Form

| Writer Information | | معلومات الكاتب |
|---|---|---|
| Name (Or Nickname): | | :الاسم (أو لقب) |
| Age: | ☐ فوق 40   ☑ 40-15   ☐ دون 15 | :العمر |
| Upbringing country: | | :بلد النشأ |
| Qualification: | ☑ جامعي   ☐ ثانوي   ☐ ابتدائي | :التحصيل العلمي |
| Gender | ☐ أنثى   ☑ ذكر | :الجنس |
| Handedness: | ☐ اليسار   ☑ اليمين | :يد الكتابة |

```
Algorithm: Deskew
Inputs:
    • Image img, containing a BoH
    • Integer m, the averaging factor
Output: Deskewed Image imgDeskew
1. θ = 0
2. MAXSquareSum = $\sum_r (HR_{img}{}^m[r])^2$
3. for θ in range from $-|\theta_1|$ to $|\theta_2|$
    3.1.  imgD = img rotated by angle θ
    3.2.  Obtain $HP_{imgθ}{}^m[r]$ from imgD
    3.3.  SquareSum = $\sum_r (HR_{imgθ}{}^m[r])^2$
    3.4.  if SquareSum > MAXSquareSum
        3.4.1.    MAXSquareSum = SquareSum
        3.4.2.    imgDeskew = imgD
        end if
    end for
end Algorithm Deskew
```

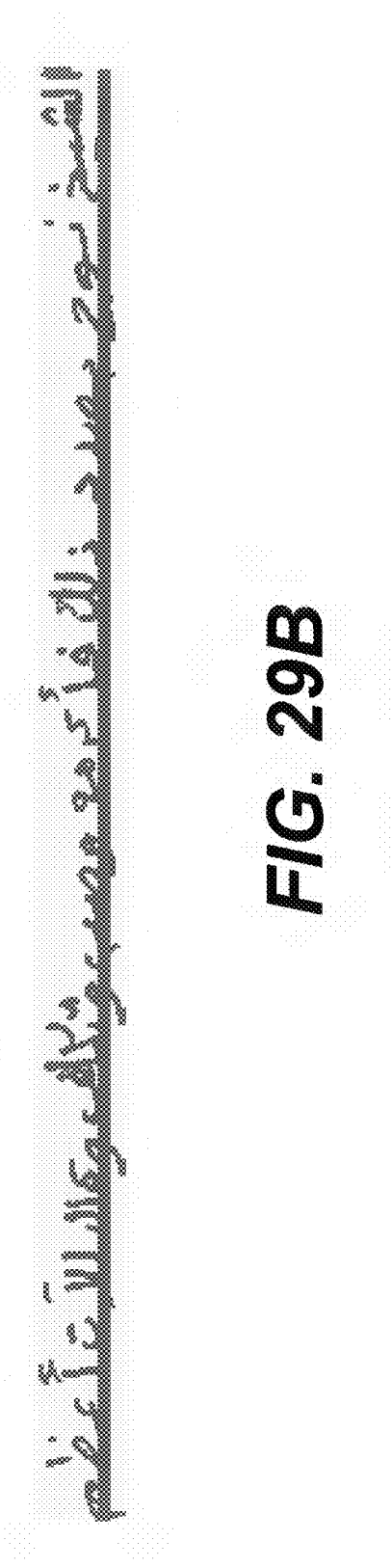

| Algorithm: Single Baseline-Range Estimation (SBRE) |
|---|
| Inputs:<br>• Array $HP(r)$ of the smoothed horizontal projection of an image<br>• Fraction $factor$ with a value between $0$ and $1$ |
| Output: Pair of Integers $(u, d)$ representing the upper and lower y-coordinates of the baseline-range |
| Steps:<br>1. Let $h_{max}$ be the maximum value in $HP(r)$; i.e. $h_{max} = Max(HP(r))$<br>2. Let $h_x$ be the row-number of $h_{max}$; i.e. $h_x = ArgMax(HP(r))$<br>3. $bl = factor * h_{max}$<br>4. Set $u$ to be the nearest row-number to $h_x$ satisfying the following conditions:<br>   4.1.   $u$ is above $h_x$<br>   4.2.   $HP(u) \geq bl$<br>   4.3.   $HP(\text{the row above } u) < bl$<br>5. Set $d$ to be the nearest row-number to $h_x$ satisfying the following conditions:<br>   5.1.   $d$ is below $h_x$<br>   5.2.   $HP(d) \geq bl$<br>   5.3.   $HP(\text{the row below } d) < bl$<br>end Algorithm Single Baseline-Range Estimation (SBRE) |

Figure 30

Algorithm: Multiple Baseline-Range Estimation (MBRE)

Inputs:
- Array $HP(r)$ containing the m-averaged horizontal projection of the text-line image,
- Array $VP(c)$ containing the m-averaged vertical projection of the text-line image,
- Fraction $factor$, a baseline factor
- Integer $cut$, a threshold on VP
- Number $Threshold$

Output: An Array of ordered pairs of integers $(u_i, d_i)$ representing the y-coordinates of the baseline-range

Steps:
1. Let $Segment$ be the set of chunks, where each chunk is a range of columns $(c^i_1, c^i_2)$ that are surrounded by, but not containing, columns where $VP(c)$ is less than $cut$.
2. Let $width_i$ denote the width of the $i^{th}$ element in $Segment$ given by $c^i_2 - c^i_1 + 1$
3. Let $widthMs$ be the average $width_i$
4. Assign to $Th$ the product of $Threshold * widthMs$
5. for the first, last and every element $i$ in $Segment$ where $width_i > Th$
   5.1. Compute $(u_i, d_i)$ using SBRE with inputs: $HP(c^i_1, c^i_2)$, $factor$
   end for
6. for every element $i$ in $Segment$ where $width_i \leq Th$
   6.1. Interpolate the values for the output element $(u_c, d_c)$ from the nearest entries, i.e. $u_c = (u_{c-1} + u_{c+1})/2$, $d_c = (d_{c-1} + d_{c+1})/2$
   end for end Algorithm Multiple Baseline-Range Estimation (MBRE)

Figure 31

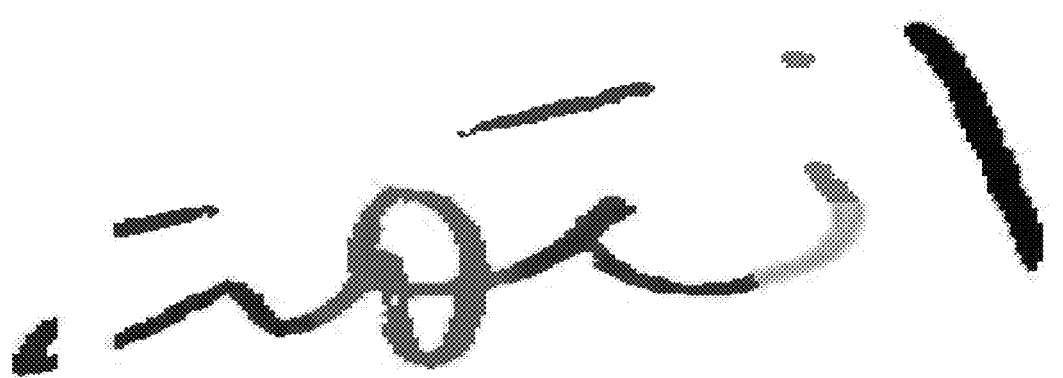
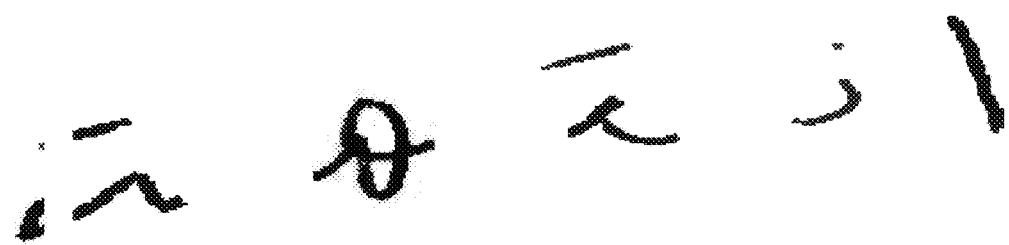
Figure 36

Algorithm: ALSA

Input:
- Binary image $B$ of a BoH
- Integer $m$, smoothing factor

Output: Labeled image $LB$, where each line of $B$ ideally has a distinct label 1. Compute $HP^m(r)$ from $B$
2. Compute $LTh$ as the average of all local minima in $HP^m(r)$
3. Define Valleys as maximal chunks of rows with $HP^m(r) \leq LTh$
4. Let $Wavg$ be the average valley width
5. for each valley, $v$
   5.1. if the width of $v$ is less than $0.5 * Wavg$
      5.1.1. merge $v$ to its nearest neighboring valley
   end if
   end for
6. for each valley, $v$
   6.1. Let $CP(v)$ be the median of the longest run with minimum $HP^m(r)$ in $v$
   end for
7. Assign label $v$ to pixels in $LB$ corresponding to the CCs that have COGs between $CP(v)$ and $CP(v+1)$ end Algorithm ALSA

Figure 37

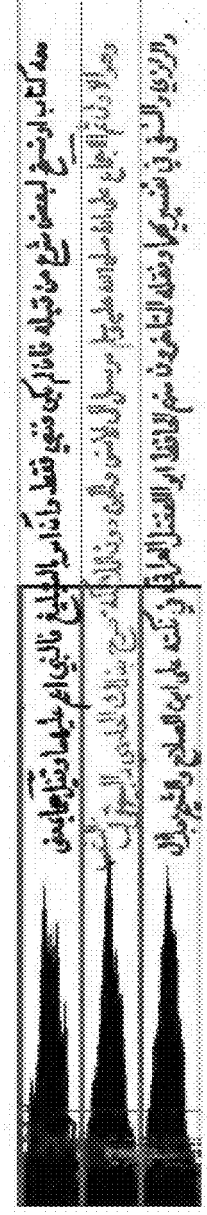
Figure 39

Algorithm: Blind Character-Shape Segmentation

Inputs:
- Binary image *img* of a handwritten line or a chunk of it
- Integer *m*, smoothing factor
- Integers *MountTh* and *ValleyTh*, such that *MountTh* ≥ *ValleyTh*

Output: Labeled image *Limg*, where each character-shape of *img* ideally has a distinct label 1. Compute $VP^s(c)$ from *img*
2. Define a Valley as maximal chunks of *img* where:
   2.1. $VP^s(c)$ is never above *MountTh*
   2.2. $VP^s(c)$ at both of its ends are less than *ValleyTh*
   2.3. No column $c$ out of the Valley with $VP^s(c) <$ *ValleyTh* is nearer than any other column with $VP^s(c) \geq$ *MountTh*
3. Define cuts at the median $c$ from those sharing the value $\min(VP^s(c))$
4. Assign one distinct label in *Limg* to every pixel corresponding to the foreground of *img* and falling between two consecutive cuts end Algorithm Blind character-shape Segmentation

```
Algorithm: Word-to-PAWs Segmentation
Inputs:
 •   Word Image word_img
 •   Word Text ground-truth corresponding to word_img
 •   baseline parameters (factor and m)
 •   Three Thresholds:
 o   Integer thS, initial minimum size of PAW
 o   Integer thO, maximum orientation of a secondary
 o   A structural element SE, for dilatation
 o   baseline thresholds (m, factor)
Output: Labeled Image Limg where connected components of a PAW share a
distinct label
Steps:
1.  Initiate wmg to be equal to word_img
2.  Use ground-truth and script rules to obtain correctPAW, the real number
of PAWs in wmg
3.  Let connected components be the set of connected components of wmg
4.  Let (u, d) be the output of SBRE for wmg with baseline parameters
(factor and m)
5.  Let PAWset be the set of connected components that have any point with
the y-coordinate in the range (u, d) AND are larger than threshold thS
6.  Let Secondaries be the set of connected components that:
              do NOT intersect any point in the Range (u, d) OR
              are NOT larger than threshold thS
7.  Let numPAWs be equal to the number of elements in PAWs
8.  if  (numPAWs < correctPAW  AND (u, d) are within the range of wmg rows
9.      increment the range of (u, d) by performing u = u - 1 and d = d + 1
10.     Repeat from Step 5
     else
        Repeat while (numPAWs < correctPAW  AND ar <1.5* thS AND or < thO)
11.        Let cc be the largest element in Secondaries
12.        Let ar be the area of cc
13.        Let or be the orientation of cc
14.        if (ar < threshold 1.5*thS AND |or| < thO)
15.           move cc from SEC to PAWset
           end if
        end while
end if
16. if (numPAWs > correctPAW AND se < SE)
17.     dilate wmg with the structural element se, increment se and goto
Step 5
endif
18. Label each element in word_img AND PAWset distinctly
19. Use closing to label each element in word_img AND in SEC like its
nearest neighbor from PAWset
end Algorithm Word-to-PAWs Segmentation
```

Figure 46

Algorithm: Fuzzy Parameters

Inputs:
- Integer $W$ the width of image $img$
- Array $TXT()$ of the codes of the underlying text for $img$
- Number $\alpha \geq 1$, an attenuation factor for fuzzy range
- Array $Ws()$ of character width averages indexed by $TXT$
- Array $STDSs()$ of character width standard deviations

Outputs:
- Array $DL()$ of fuzzy centers
- Array $DR()$ of fuzzy ranges

Steps:
1. Let $sum$ be the sum of all $Ws(TXT)$ elements
2. Initiate $accumulator$ to 0
3. for $i$ indexing all characters in $TXT$
4. $\quad accumulator = accumulator + \frac{W}{sum} Ws[TXT]$
5. $\quad DL(i) = \lfloor accumulator - \frac{1}{2}W \rfloor$ /* where $DL$ is the array of Fuzzy centers and $\lfloor \rfloor$ denotes the rounding operator */
   end for /* subtraction is to reverse the center position, as Arabic is written from right to left */
6. for $i$ indexing until the penultimate character in $TXT$
   $\quad R(i) = \lceil (STDSs(TXT(i)) + STDSs(TXT(i+1)))/2 \rceil$
   $\quad nR(i) = \lceil \frac{W}{sum} STDSs(i) \rceil / \alpha$ // normalize and attenuate
7. Replace $nR$ values that are lower than 1 by 1 and all values that are greater than $W$ by $W$
8. for $i$ indexing until the penultimate character in $TXT$
9. $\quad DR(i) = DL(i) - nR(i)$ representing the vertices of the triangle $(DL(i), R(i))$, $(DL(i), 0)$ and $(DL(i) + nR(i+1), 0)$
   end for end Algorithm Fuzzy Parameters

Figure 48

```
Algorithm: PAW-to-Characters Segmentation
Inputs:
    • Image PAW_img, of the PAW to be segmented
    • Integer m, the averaging factor
    • Text ground-truth corresponding to the characters in PAW_img
    • Array Wm{} containing the average statistic widths of characters
    • Arrays SDm{} containing the standard deviation of the widths of
      characters
Output: Labeled images Lcharacter and Fcharacter where every character should
have a distinct label
Steps:
1.  Use ground-truth, to obtain realChs, the ideal number of characters,
2.  Use Algorithm Fuzzy Parameters to obtain DR{}, the dissection locations, and
    DR{}, the dissection ranges
3.  Let v be equal to VP°{c} of PAW_img
4.  Initiate error to infinity
5.  for integer MountTh ranging from |min(v)| to |max(v)|
6.      for integer ValleyTh ranging from |min(v)| to MountTh
7.          Use Algorithm Blind character segmentation to obtain cuts on PAW_img
8.          if the number of elements in cuts equals realChs
9.              update error with sum{|DR- cuts|} if it is less than the previous
                error
            end if
        end for
    end for
10. Assign to pixels in each Lcharacter range between neighboring cuts
    corresponding to foreground pixels of PAW_img a distinct label
11. v = v - DR
12. Repeat the Steps 4 and 5 one more time
13. Assign to pixels in each Fcharacter range between neighboring cuts
    corresponding to foreground pixels of PAW_img a distinct label
end Algorithm PAW-to-Characters Segmentation
```

Figure 50

Algorithm: Kashida Features Extraction

Input: Arabic Handwritten Images with Character-Level Ground-Truth Labels

Output: Arrays for the values of Width, UCD and LCD

Procedure:
For each labeled image $i$:
For each Kashida connected components $K$:
Filter out noise based on dimensions & aspect ratio
Trim leftmost and rightmost pixels of $K$
Compute and Save the width Width of $K$ in Array Widths
Compute $\frac{dK}{dy}$ to obtain upper and lower contours of $K$
/* $UC_y$: vector containing the pixels' y-coordinates of upper contours of $K$
and $LC_y$: vector containing the pixels' y-coordinates of lower contours of $K$
*/
Compute $\frac{dUC_y}{dx}$ and $\frac{dLC_y}{dx}$ to obtain UCD and LCD
// The pixel slope vectors of $UD$ and $LD$
Reverse UCD and LCD to become from right to left
Multiply them by -1 to comply with coordinate system
Save UCD and LCD in Arrays UCDs and LCDs
END Algorithm

Figure 60

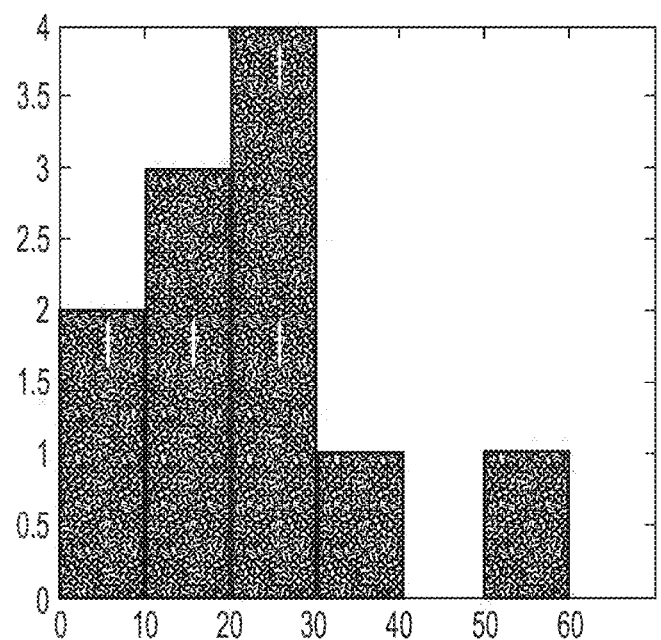
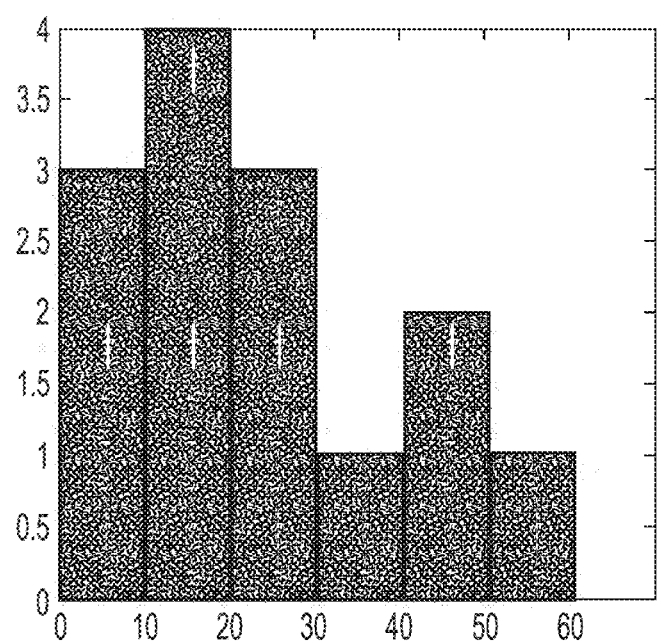
FIG. 66

| Character Names | Alone (A) | Ending (E) | Middle (M) | Beginning (B) |
|---|---|---|---|---|
| Hamza | ء | | | |
| Alef with Madda Above | آ | ـآ | | |
| Alef with Hamza Above | أ | ـأ | | |
| Waw with Hamza Above | ؤ | ـؤ | | |
| Alef with Hamza Below | إ | ـإ | | |
| Yeh with Hamza Above | ئ | ـئ | ـئـ | ئـ |
| Alef | ا | ـا | | |
| Beh | ب | ـب | ـبـ | بـ |
| Teh Marbuta | ة | ـة | | |
| The | ت | ـت | ـتـ | تـ |
| Theh | ث | ـث | ـثـ | ثـ |
| Jeem | ج | ـج | ـجـ | جـ |
| Hah | ح | ـح | ـحـ | حـ |
| Khah | خ | ـخ | ـخـ | خـ |
| Dal | د | ـد | | |
| Thal | ذ | ـذ | | |
| Reh | ر | ـر | | |

FIG. 73A

| Name | | | | |
|---|---|---|---|---|
| Zain | ز | ـز | | |
| Seen | س | ـس | ـسـ | سـ |
| Sheen | ش | ـش | ـشـ | شـ |
| Sad | ص | ـص | ـصـ | صـ |
| Dad | ض | ـض | ـضـ | ضـ |
| Tah | ط | ـط | ـطـ | طـ |
| Zah | ظ | ـظ | ـظـ | ظـ |
| Ain | ع | ـع | ـعـ | عـ |
| Ghain | غ | ـغ | ـغـ | غـ |
| Feh | ف | ـف | ـفـ | فـ |
| Qaf | ق | ـق | ـقـ | قـ |
| Kaf | ك | ـك | ـكـ | كـ |
| Lam | ل | ـل | ـلـ | لـ |
| Meem | م | ـم | ـمـ | مـ |
| Noon | ن | ـن | ـنـ | نـ |
| Heh | ه | ـه | ـهـ | هـ |
| Waw | و | ـو | | |
| Alef Maksura | ى | ـى | | |
| Yeh | ي | ـي | ـيـ | يـ |

FIG. 73B

| Model | Beginning | | Middle | | Ending | | Isolated | |
|---|---|---|---|---|---|---|---|---|
| 4-character-shapes | | هـ | | ـهـ | | ـه | | ه |
| 2-character-shapes | | كـ | | ـكـ | | ـك | | ك |
| 1-character-shape | | جـ | | ـجـ | | ـج | | ج |

METHOD FOR SYNTHESIZING ARABIC HANDWRITTEN TEXT

CROSS-REFERENCE TO RELATED APPLICATIONS

The present application is a continuation of Ser. No. 15/496,031, having a filing date of Apr. 25, 2017, now allowed, which is a continuation of Ser. No. 15/145,582, now allowed, having a filing date of May 3, 2016, which is a non-provisional application claiming priority to provisional application 62/156,690, filed on May 4, 2015, of which the entire contents are incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Handwriting recognition and synthesis are challenging problems, especially for the Arabic script. However, synthesis, or the automatic generation of handwriting, has recently gained interest because of its various applications that include training recognition systems and font personalization.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

Embodiments of the disclosure include systems, methods and computer readable media for analysis and design of synthesized text. In one exemplary embodiment a system for handwriting synthesis comprising circuitry configured to access character shape images of an alphabet; determine a connection point location between two or more character shapes based on a calculated right edge position and a calculated left edge position of the character shape images; extract character features that describe language attributes and width attributes of characters of the character shape images, the language attributes including character Kashida attributes; and generate images of cursive text based on the character Kashida attribues and the width attribues.

In another exemplary embodiment, the circuitry may be further configured to identify Kashida extensions as part of the character Kashida attributes; isolate the identified Kashida extensions from pepper noise components based on a predetermined ground-truth label, by constraining the extracted character features to be two consecutive characters; and extract the identified Kashida extensions based on the predetermined ground-truth label. The circuitry is further configured to remove a left edge segment and a right edge segment from the identified Kashida extensions. Furthermore, a width of each of the left edge segment and the right edge segment is adaptively computed based on a Kashida width based on the calculated right edge position and the calculated left edge position. Additionally, each extracted Kashida is classified based on three features: a width of the extracted Kashida, a slope of an upper contour direction (UCD) of the extracted Kashida, and a slope of a lower contour direction (LCD) of the extracted Kashida.

In yet another exemplary embodiment, the circuitry is further configured to: generate a width probability density function (PDF) for each of the width, UCD and LCD of the extracted Kashida, wherein the width PDF is generated based on one or more selected square bins having a width of 8-pixels; and discard extracted Kashida strokes having a width of less than 6-pixels. Furthermore, the width PDF is further generated based on at least one of an author related attribute of the character shape, a character from which the extracted Kashida originates, or a character to which the extracted Kashida connects. The circuitry may be further configured to filter out attributes relating to a thickness of a left edge segment and a thickness of a right edge segment of the extracted Kashida.

Other exemplary embodiments include a method for outputting synthesized handwritten text comprising: accessing, with circuitry, character shape images of an alphabet; determining, with the circuitry, a connection point location between two or more character shapes based on a calculated right edge position and a calculated left edge position of the character shape images; extracting, with the circuitry, character features that describe language attributes and width attributes of characters of the character shape images, the language attributes including character Kashida attributes; and generating, with the circuitry, images of cursive text based on the character Kashida attribues and the width attribues.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 9A-9B illustrate concatenation for Latin offline word from characters, and Arabic line from characters;

FIG. 13 illustrates sample characters that differ only in dots (also known as Hamza) in some character groups according to an exemplary embodiment;

FIG. 17 illustrates a character-shape covering algorithm (CSC) according to an exemplary embodiment;

FIG. 18 illustrates a character-shape pangram, composed from proverbs and cliches, with a lipogram condition according to an exemplary embodiment;

FIG. 19 illustrates a scanned sample of a first form collection page where a writer's information is filled according to an exemplary embodiment;

FIG. 23 illustrates examples of legative forms according to an exemplary embodiment;

FIG. 24 illustrates a sample of the ligatures and grid of the ligatures according to an exemplary embodiment;

FIG. 27 illustrates a Deskew algorithm according to an exemplary embodiment;

FIGS. 28A-28B illustrates a sample paragraph before and after global Deskew correction according to an exemplary embodiment;

FIGS. 29A-29B illustrate a baseline miss estimation for a short line and for a long wavy line according to an exemplary embodiment;

FIG. 30 illustrates listing of a single baseline range estimation algorithm according to an exemplary embodiment;

FIG. 31 illustrates a listing of a multiple baseline range estimation algorithm according to an exemplary embodiment;

FIG. 36 illustrates a labeled word and its corresponding extended character-shapes according to an exemplary embodiment;

FIG. 37 illustrates an adaptive line segmentation algorithm (ALSA) for Arabic according to an exemplary embodiment;

FIG. 39 illustrates output samples of printed, handwritten and historical manuscript ALSA according to an exemplary embodiment;

FIG. 43 illustrates blind character shape segmentation algorithm according to an exemplary embodiment;

FIGS. 44A-44B illustrates visualization of segmentation results on a handwritten text-line and its ground-truth according to an exemplary embodiment;

FIG. 46 illustrates a word to PAW segmentation algorithm according to an exemplary embodiment;

FIG. 48 illustrates fuzzy parameters algorithm for the estimation of non-blind character segmentation ranges according to an exemplary embodiment;

FIG. 50 illustrates PAW to characters segmentation algorithm according to an exemplary embodiment;

FIG. 60 illustrates Kashida feature extraction algorithm;

FIG. 66 illustrates non-descending KW-PDFs found to enter middle character shapes according to an exemplary embodiment;

FIG. 73A illustrates Table 1, containing a list of Arabic characters and their different shapes based on their positions within PAWS;

FIG. 73B illustrates Table 1, containing a list of Arabic characters and their different shapes based on their positions within PAWS;

FIG. 74 illustrates Table 7, containing examples of character-shapes with the name of the smallest model that applies to the set;

FIG. 75 illustrates Table 8, containing Arabic characters grouped based on the dot-less, the 2-Shapes, and the combined models;

FIG. 76 illustrates Table 10, containing bigrams based on the dot-less model with shadings on the shortest 1-shape representatives;

FIG. 79 illustrates Table 15, containing linguistically excluded ligatures according to Arabic cryptanalysis;

FIG. 80 illustrates Table 17, containing final designs of 12 distinct but related forms with 40 entries each;

FIG. 82 illustrates Table 31 containing numbers of samples per character-shape used in experiments;

FIG. 83A illustrates part of Table 32, containing bigrams of the dot-less typographic model representing 548 out of all the possible 2,622;

FIG. 83B illustrates part of Table 32, containing bigrams of the dot-less typographic model representing 548 out of all the possible 2,622.

DETAILED DESCRIPTION OF THE EMBODIMENTS

Figure 1:
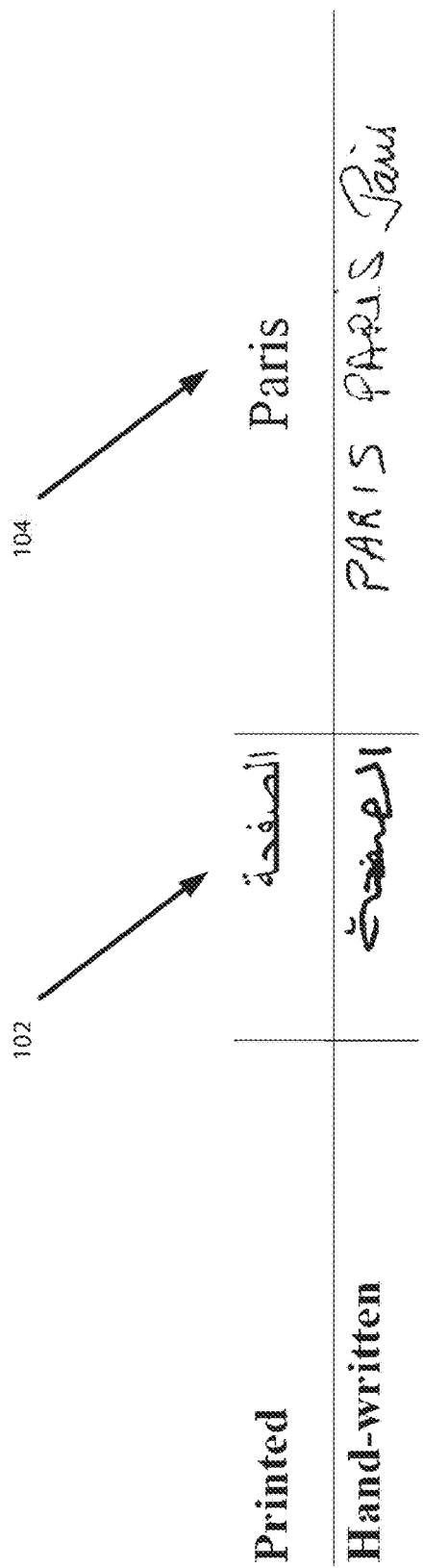
FIG. 1 includes exemplary illustrations of printed and handwritten samples for Arabic and Latin scripts, where, unlike modern Latin writing, Arabic writing rules consistently apply to both printed and handwritten forms.

Referring now to the drawings, wherein like reference numerals designate identical or corresponding parts throughout the several views.

Handwriting recognition and synthesis are challenging problems, especially for the Arabic script. However, synthesis, or the automatic generation of handwriting, has recently gained interest because of its various applications that include training recognition systems and font personalization.

Handwriting is challenging, whether for analysis or synthesis, especially for languages that use the Arabic script. Analysis aims at gaining better understanding of a complex object by breaking it down into to smaller components. Handwriting analysis usually encompasses segmenting handwritten images into characters.

Synthesis refers to a combination of two or more entities that together form something new; alternately, it refers to the creating of something by artificial means. Synthesis of handwriting often aims at the automatic production of images that resemble, or perform like, those of human handwriting. Handwriting synthesis can be seen as the reverse operation of handwriting recognition: In recognition, handwritten images are given, and the corresponding text is output. In synthesis, a required text is given, and a corresponding handwritten-like image is output.

Synthesis has applications in the improvement of text recognition systems, in PC-personalization, in forgery detection, in Steganography (the art of biding the existence of information), and in Completely Automated Public Turing test to tell Computers and Humans Apart (CAPTCHA). These applications may require different specifications on the synthesized data, such as being of a specific writer's style or difficult to read by machines. Other characteristics of a handwriting synthesis systems include: whether the data is online (with temporal information from tablets) or offline (on paper, without time stamps), the synthesis level (stroke, character, word, etc. . . . ), and the scripting system (Arabic, Chinese, Latin, etc. . . . ).

Handwriting synthesis may encompass generation and concatenation operations. Handwriting generation alters samples of handwriting to increase their shape-variability within some closed-vocabulary. Concatenation operations, in contrast, aim at the compilation of new units of vocabulary, such as words, from a smaller pool of basic samples, such as characters. Handwriting generation can be seen as the inverse operation of preprocessing in a text recognition system whereas handwriting concatenation can be seen as the inverse operation of segmentation.

Handwriting recognition requires training samples that capture as much as possible of the natural variability of handwriting styles. Moreover, it requires the samples to contain ground-truth (GT) information that aligns the underlying text with the corresponding images at some level. The conventional ways of collection and ground-truthing encompass manual tasks that can be very laborious and time-consuming. Hence, the use of synthesized data in expanding training sets of recognition systems is proposed.

The insertion of synthesized data in a training set can have benefits and side effects. While the increased variability of the training set may lead to the recognition of otherwise mal-recognized examples, distorted samples may disturb the parameters of a recognition system from their adequate values. The overall impact of any proposed method needs to be positive in terms of recognition rates. It can be expected that naturally looking data are more promising to avoid distorting the parameters of a recognition system while improving its recognition performance.

Concatenation-based systems can provide a means of open-vocabulary synthesis. However, concatenation calls for character-segmentation, a quite challenging problem, especially for the Arabic script. One main cause for the lag in solving Arabic segmentation is the severe lack of appropriate ground-truthed datasets for its benchmarking. Since ground-truths, themselves, consist of labeled segmented handwriting, ground-truthing and segmentation engage in a "chicken and egg" relationship: the ground-truth data is needed for the development and evaluation of segmentation systems, and segmentation systems are needed to speed up ground-truthing.

One way to break this recursion is by implementing text-aware alignment systems. These can result in accurately labeled (segmented) data for the special circumstances where the text is known, like in certain datasets. Another way out is to find subjective and objective semi-automatic alternatives for ground-truths for segmentation evaluation. For all of the above, it is useful to expand small amounts of manually ground-truthed data via handwriting synthesis Researchers cite the lack of datasets of Arabic handwriting as a reason for the lagging-behind in Arabic writing recognition. Conventional ways of collecting datasets directly from writers have some disadvantages:

Collection is costly in terms of time and effort.
Once a dataset is designed and collected, adding new words to it can be difficult.
Ground-truthing usually necessitates human interaction; hence, it is time-consuming.

Synthesized data can improve systems that have deficiencies in their text segmentation accuracy, recognition features and classifiers, or variability of training data. In practice, the above features can benefit from the use of synthesized data to improve recognition rates. Hence, synthesized data is used to expand text recognition training sets independently from their underlying recognition system. Other applications that demand handwriting synthesis include:

Word spotting and holistic recognition
Writer imitation/authentication,
Personalized fonts generation,
CAPTCHA generation, and
Aesthetical calligraphy generation.

As a native language, Arabic is used by more than 200 million people around the world. In addition, there are around 1.6 billion Muslims with some association to Arabic due to religious reasons. The Arabic alphabet is also used to write Jawi, Urdu, Persian and other languages.

In Arabic, most characters obligatorily connect to their within-word successors. The Arabic character Hamza "ء" does not connect to either its precedent or to its successor, even if in the same word. Six other Arabic characters ("ا", "د", "ذ", "ر", "ز", "و") and some Hamza variants of them, never connect to their successors in the same word. These characters cause words to separate into unconnected pieces of Arabic words (PAWs). Spaces between PAWs are typically smaller than inter-word spaces. FIG. 1 shows samples of printed and handwritten texts for Arabic 102 and Latin 104 scripts.

Those skilled in the art will understand that the techniques described herein may be implemented in various system and database topologies consistent with various computational methodologies. Topologies and methodologies suitable for aspects of various embodiments are described in A. Abdel-Raouf, C. A. Higgins, and M. Khalil, "A Database for Arabic Printed Character Recognition," in Image Analysis and Recognition, A. Campilho and M. Kamel, Eds. Springer Berlin Heidelberg, 2008, pp. 567-578 which is incorporated herein by reference; Y. Elarian and F. Idris, "A Lexicon of Connected Components for Arabic Optical Text Recognition," in 1st International Workshop on Frontiers in Arabic Handwriting Recognition (FAHR2010), in conjunction with the 20th International Conference on Pattern Recognition (ICPR), Istanbul, 2010, which is incorporated herein by reference; Y. Haralambous and A. F. Virus, "The traditional Arabic typecase extended to the Unicode set of glyphs," Electron. Publ. Dissem. Des., vol. 8, 1995, which is incorporated herein by reference; Y. Haralambous, "Simplification of the arabic script: Three different approaches and their implementations," in Electronic Publishing, Artistic Imaging, and Digital Typography, R. D. Hersch, J. André, and H. Brown, Eds. Springer Berlin Heidelberg, 1998, pp. 138-156. F. Menasri, N. Vincent, E. Augustin, and M. Cheriet, "Shape-Based Alphabet for Off-line Arabic Handwriting Recognition," in Ninth International Conference on Document Analysis and Recognition, 2007. ICDAR 2007, 2007, vol. 2, pp. 969-973, which is incorporated herein by reference; Y. Al-Ohali, M. Cheriet, and C. Suen, "Databases for recognition of handwritten Arabic cheques," Pattern Recognit., vol. 36, no. 1, pp. 111-121, January 2003, which is incorporated herein by reference; S. A. M. Husni A Al-Muhtaseb, "A novel minimal script for Arabic text recognition databases and benchmarks," 2009, which is incorporated herein by reference; V. Märgner and H. El Abed, "Databases and Competitions: Strategies to Improve Arabic Recognition Systems," in Proceedings of the 2006 Conference on Arabic and Chinese Handwriting Recognition, Berlin, Heidelberg, 2008, pp. 82-103, which is incorporated herein by reference; M. Pechwitz, S. S. Maddouri, V. Margner, N. Ellouze, and H. Amiri, "IFN/ENIT—database of handwritten Arabic words," in In Proc. of CIFED 2002, 2002, pp. 129-136, which is incorporated herein by reference; Hashim Mohammed al-Baghdadi, rules of Arabic calligraphy. 1961, which is incorporated herein by reference; Naser Abdelwahab Al-Nassary, The Ruqaa Style Workbook: The best way to teach the Ruqaa calligraphic style which is incorporated herein by reference; A. Gillies, E. Erlandson, J. Trenkle, and S. Schlosser, Arabic Text Recognition System. 1999; Aqil Azmi and Abeer Alsaiari, "Arabic Typography. A Survey," Int. J. Electr. Comput. Sci., vol. 9, no. 10, pp. 16-22, 2010, which is incorporated herein by reference; and The Unicode Consortium, "Unicode." [Online]. Available: http://www.unicode.org/charts/PDF, which is incorporated herein by reference.

Each Arabic character can take up to four shapes depending on its position in a PAW. From right to left (the Arabic writing direction), the first character in an Arabic PAW takes a character-shape that is called the beginning shape (B). A (B) shape in a PAW can be followed by one or more middle shaped characters (M) before an ending shaped character (E)

ends it. If a PAW consists solely of one character, it takes a shape called the isolated shape (A). In regular expressions, Arabic PAWs are expressed as <(A)|(B)(M)*(E)>, where the bar symbol "|" denotes the "OR" operator, and the star symbol, "*", denotes zero or more occurrences of the character-shape it follows.

Figure 2:
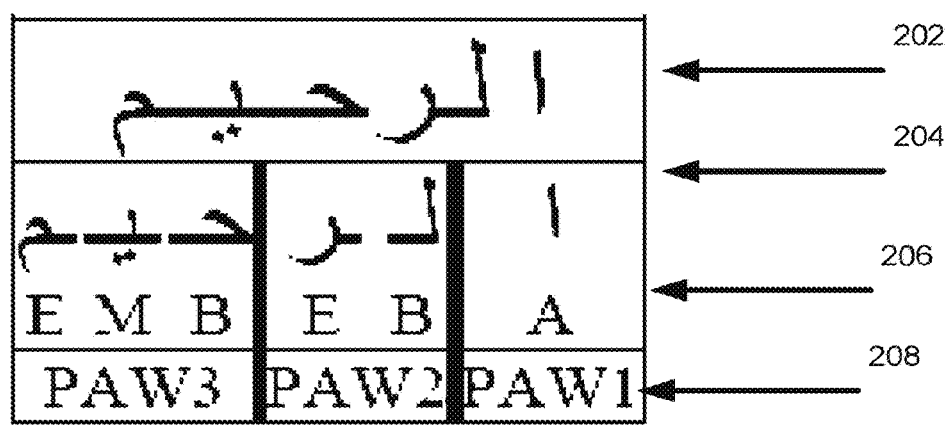
FIG. 2 illustrates an Arabic word with three pieces of an Arabic word (PAWs) according to an exemplary embodiment.

FIG. 2 describes a word segmentation system 200 that identifies the status of each letter in the word. 204, labels the letters as either isolated, beginning or middle 206 divides a word 202 into three PAWs 208. For example, PAW1 consisting of an (A) character-shape, PAW2 consisting of a (B) and an (E) character-shapes and PAW3 consisting of a (B), an (M), and an (E) character-shape. PAW1, PAW2 and PAW3 of are examples for the <(A)>, <(B)(E)> and <(B)(M)(E)> expressions, respectively. The PAWs are ordered from right to left, as this is the direction of Arabic script.

To further elaborate the diversity of Arabic character use, Table 1, as illustrated in FIGS. 73A and 73B, shows a list of the 29 Arabic characters along with extra Arabic-used keyboard characters. The number of the character-shapes is 117.

Figure 3:
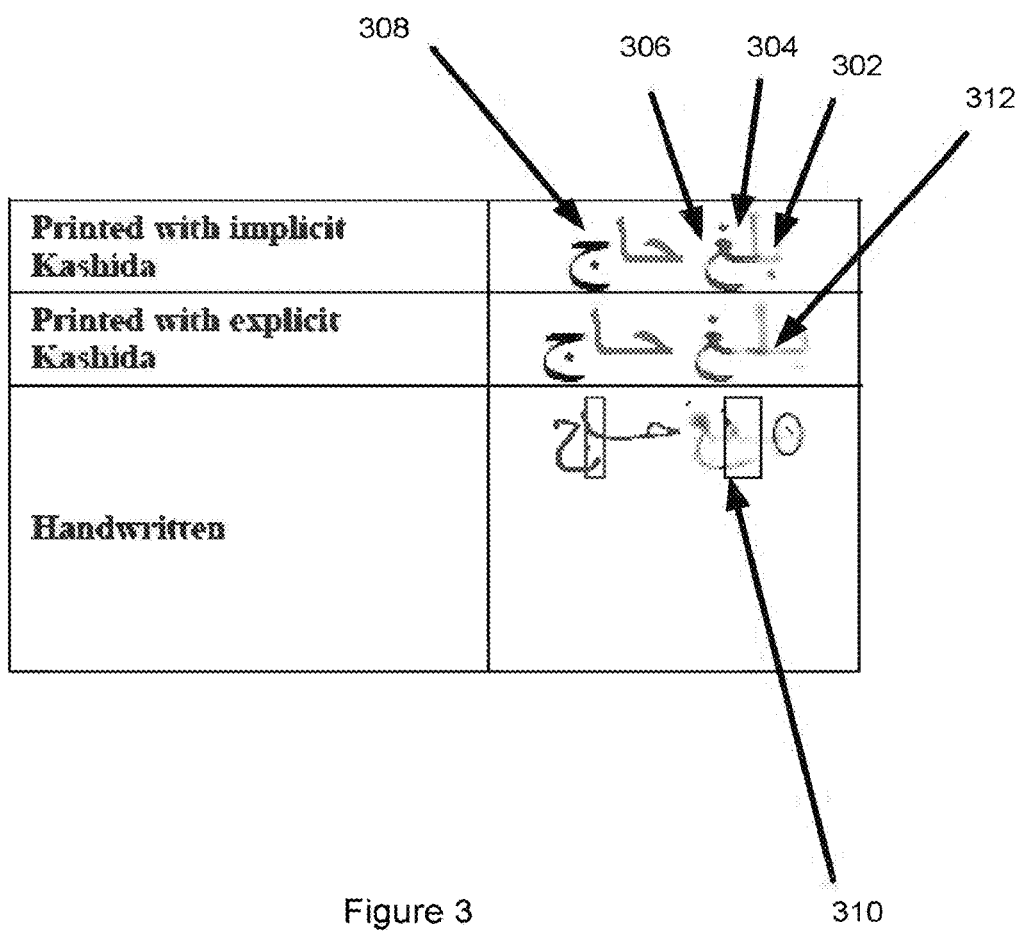
FIG. 3 illustrates samples of Arabic printed and handwritten Arabic characters and connections (ligatures) that are portrayed in different shades to distinguish their character shapes according to an exemplary embodiment.

Arabic characters usually connect horizontally within an imaginary line that is referred to as the baseline (BL). The simplest and most frequent form of connecting consecutive Arabic characters is through a semi-horizontal stroke called the Kashida. The Kashida stroke, shown in FIG. 3, can vary in length, shape and thickness depending on the writing style. The FIG. also shows vertical overlapping between several characters and PAWs in the handwritten sample, which is a common case in the Arabic script. It also shows a broken character (the rightmost ـ character). For example, each printed word or phrase includes a beginning character shape 302, a middle character shape 304, an end character shape 306 and an alone character shape 308. Box 310 includes overlaps in Kashida between the characters and a Kashida 312 can be used to connect characters in any given length.

In this regard, ligatures can be defined as alternate forms that replace certain sequences of characters in a way that is deformed from their direct concatenation. Alternative nomenclatures include ligative or ligaturisable for sequences of two or more characters that accept to be connected with a ligature. Accordingly, the terms legative and ligature may be used interchangeably herein after. The term unligative or ligatures-free are used for sequences of two or more characters that only accept to be connected with a simple extension on the baseline. Ligatures are mainly used for aesthetic reasons. They can also play a role in making a writing more compact.

Figure 4:
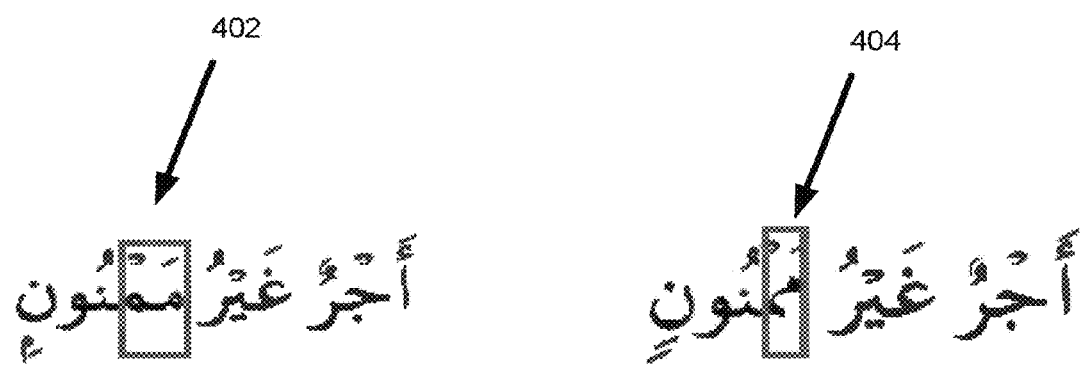
FIG. 4 illustrates examples of the same script from the Holy Qur'an without and with ligature according to an exemplary embodiment.

FIG. 4 shows example of the same script from the Holy Qur'an illustrating characters that are ligated in one instance 402 and unligated in another instance 404.

Calligraphic conventions determine which connectable character sequences are ligative. Except for the Lam-Alef family (ﻻﻼﻷﻵ), where ligation is obligatory, actual ligation is a writer's choice. In other words, being ligative is a necessary but not sufficient condition for ligation (forming a ligature).

The frequency of ligature usage in a document may depend on the font or handwriting style, the level of formality of the document content (e.g. poetry vs. business documents) and on other factors. In general, the frequency of ligatures in handwritten documents tends to exceed their frequency in modern printed documents.

Figure 5:
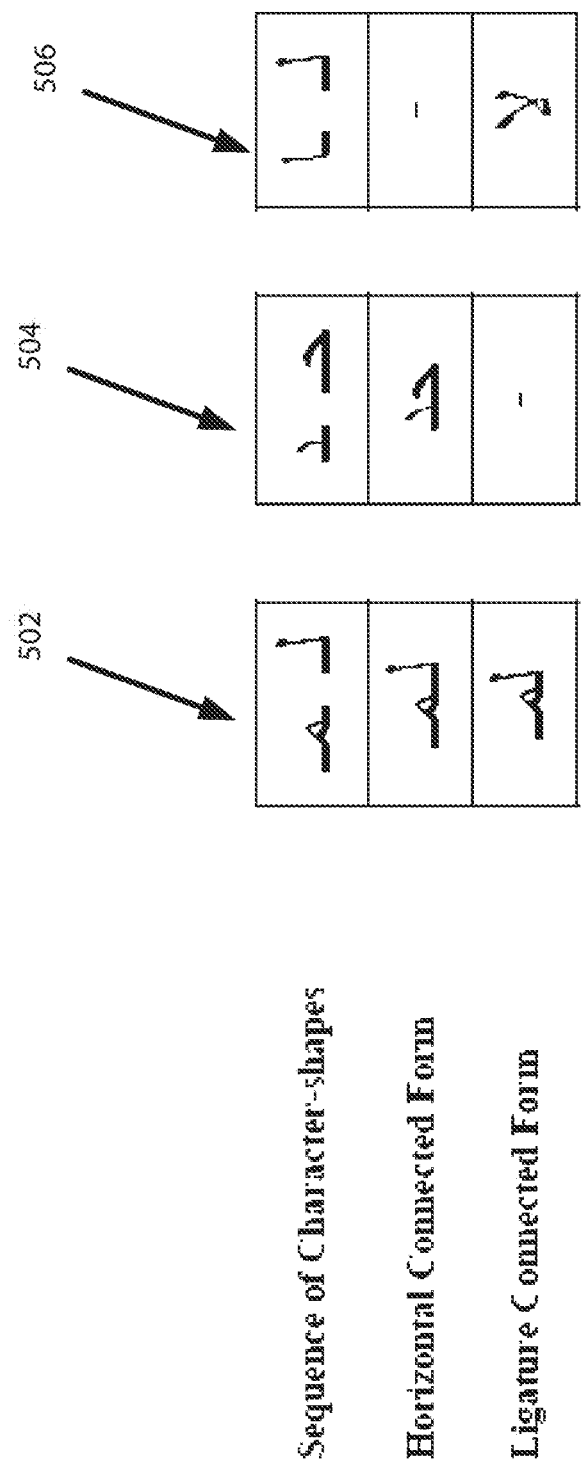
FIG. 5 illustrates examples of a legative, unlegative and obligatory-legative character sequences according to an exemplary embodiment.

FIG. 5 shows three pairs of connectable characters, hereafter referred to as bigrams. FIG. 5 shows an example of a ligative bigram 502 that can be optionally written as a ligature, an instance of an unligative bigram 504 since it does not encompass any ligative form, and an instance of the obligatorily ligative family of bigrams 506.

Figure 6:
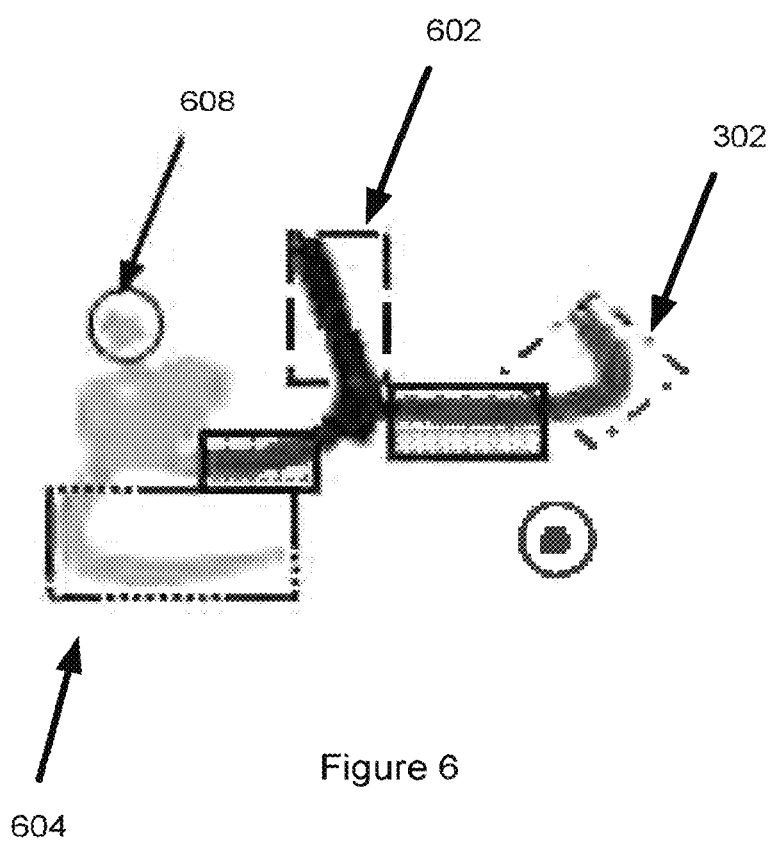
FIG. 6 illustrates a word with Kashida, ascender and descender segmented analysis according to an exemplary embodiment.

FIG. 6 describes Arabic characters may have ascenders 602 that go above the BL range, descenders 604 that go below the BL line, or curvy shapes 606 within the BL zone. Arabic characters may have secondary diacritics and dots 608 above or below the primary glyph of a character. Arabic characters vary considerably in width and height as illustrated by Table 2.

Table 2 includes statistics on character-shape samples. Table 2 shows examples of statistics that can be taken from GTed data. The Width columns display the average and the standard deviation of the widths (in pixels) of the different character-shapes. This statistic is used in the non-blind segmentation of PAWs into words. The VP Height columns compute the maximum height in the VP profile of characters. This statistic can be used together with the widths statistics to design adaptive thresholds for alignment and can provide more robust information than the mere height average.

TABLE 2

Statistics on the images of character-shape extracted from the UT and the IL PoDs scanned at 300 dpi.

| | | Width (Pixels) | | VP Height (Pixels) | |
|---|---|---|---|---|---|
| SN | character-shape | Average | Standard Deviation | Average | Standard Deviation |
| 1 | ـﺐ | 23.66 | 7.36 | 22.06 | 6.85 |
| 2 | ـﺒ | 23.39 | 7.78 | 40.44 | 11.03 |
| 3 | ﻉ | 44.20 | 15.02 | 32.99 | 7.16 |
| 4 | ـﺢ | 43.17 | 11.74 | 17.71 | 7.44 |
| 5 | ﻟ | 20.01 | 7.00 | 32.40 | 12.08 |
| 6 | ﺡ | 44.27 | 10.56 | 27.99 | 6.61 |
| 7 | ﺍ | 23.76 | 7.77 | 34.33 | 11.27 |
| 8 | ﻥ | 35.00 | 10.74 | 23.21 | 5.69 |
| 9 | ا | 17.09 | 7.58 | 34.50 | 12.21 |
| 10 | ـﺖ | 39.54 | 11.09 | 21.91 | 8.18 |
| 11 | ﻟ | 19.46 | 6.31 | 32.64 | 11.66 |
| 12 | ﻩ | 27.57 | 10.46 | 20.59 | 4.90 |
| 13 | ﻇ | 44.27 | 8.77 | 38.06 | 10.77 |
| 14 | ـﺤ | 42.36 | 19.79 | 25.03 | 13.03 |
| 15 | ﻝ | 38.06 | 12.55 | 40.73 | 14.95 |
| 16 | ﻧ | 39.14 | 14.75 | 22.26 | 5.54 |
| 17 | ـﺪ | 22.47 | 7.05 | 20.04 | 6.82 |
| 18 | ﻑ | 35.33 | 9.34 | 23.73 | 4.90 |
| 19 | ا | 16.03 | 5.14 | 27.24 | 11.30 |
| 20 | ﺩ | 25.49 | 11.62 | 17.71 | 3.78 |
| 21 | ﻯ | 49.00 | 14.61 | 26.91 | 6.75 |
| 22 | ﻊ | 33.03 | 11.04 | 19.64 | 4.34 |
| 23 | ﻑ | 39.70 | 11.56 | 22.74 | 4.79 |
| 24 | ﺵ | 59.80 | 23.83 | 23.16 | 5.59 |
| 25 | ﻃ | 45.20 | 10.14 | 41.16 | 12.52 |
| 26 | ـﺾ | 31.40 | 8.29 | 22.63 | 5.32 |
| 27 | ﻙ | 55.04 | 14.96 | 27.40 | 6.42 |
| 28 | ـﺑ | 32.54 | 12.39 | 22.09 | 5.77 |
| 29 | ـﺴ | 45.64 | 10.89 | 14.80 | 4.58 |
| 30 | ـﺤ | 30.93 | 7.87 | 19.84 | 5.15 |
| 31 | ﺱ | 47.81 | 20.29 | 22.74 | 5.91 |
| 32 | ﻻ | 46.40 | 13.56 | 39.96 | 12.02 |
| 33 | ـﺢ | 42.03 | 11.81 | 18.36 | 8.53 |
| 34 | ـﻀ | 45.86 | 11.13 | 24.79 | 6.23 |
| 35 | ﻟ | 17.87 | 5.41 | 30.60 | 12.21 |
| 36 | ﺭ | 33.97 | 14.39 | 17.71 | 7.37 |
| 37 | ـﺚ | 29.76 | 8.39 | 24.27 | 7.24 |
| 38 | ﺨ | 48.17 | 13.11 | 41.09 | 9.53 |
| 39 | ﺙ | 58.63 | 16.43 | 21.21 | 4.68 |
| 40 | ـﺞ | 34.44 | 9.02 | 22.80 | 5.20 |
| 41 | ﻑ | 38.26 | 10.25 | 19.53 | 6.85 |
| 42 | ﺑ | 52.19 | 19.10 | 19.10 | 4.24 |
| 43 | ﺫ | 36.23 | 11.73 | 21.50 | 6.48 |

TABLE 2-continued

Statistics on the images of character-shape extracted from the UT and the IL PoDs scanned at 300 dpi.

| SN | character-shape | Width (Pixels) Average | Width (Pixels) Standard Deviation | VP Height (Pixels) Average | VP Height (Pixels) Standard Deviation |
|---|---|---|---|---|---|
| 44 |  | 30.33 | 9.17 | 16.24 | 3.36 |
| 45 |  | 39.76 | 9.61 | 22.49 | 6.58 |
| 46 |  | 39.79 | 14.68 | 33.14 | 11.74 |
| 47 |  | 27.81 | 6.86 | 23.66 | 6.16 |
| 48 |  | 28.21 | 10.94 | 17.21 | 5.00 |
| 49 |  | 38.38 | 9.20 | 20.33 | 6.89 |
| 50 |  | 34.93 | 8.78 | 16.45 | 4.71 |
| 51 |  | 46.72 | 24.59 | 22.98 | 8.23 |
| 52 |  | 28.57 | 8.13 | 16.21 | 3.59 |
| 53 |  | 40.66 | 13.06 | 26.89 | 6.97 |
| 54 |  | 50.93 | 14.48 | 15.50 | 5.96 |
| 55 |  | 43.21 | 11.07 | 37.36 | 11.54 |
| 56 |  | 39.03 | 12.77 | 22.49 | 4.65 |
| 57 |  | 52.80 | 24.33 | 32.29 | 9.49 |
| 58 |  | 39.85 | 12.77 | 21.80 | 5.79 |
| 59 |  | 41.57 | 10.31 | 26.97 | 6.28 |
| 60 |  | 34.89 | 10.68 | 16.72 | 4.77 |
| 61 |  | 53.97 | 21.08 | 28.05 | 6.57 |
| 62 |  | 14.81 | 5.02 | 31.85 | 13.81 |
| 63 |  | 18.54 | 5.64 | 34.00 | 13.19 |
| 64 |  | 50.02 | 16.44 | 20.44 | 4.91 |
| 65 |  | 35.63 | 11.30 | 19.06 | 5.37 |
| 66 |  | 73.69 | 30.08 | 26.81 | 6.12 |
| 67 |  | 45.87 | 13.91 | 19.17 | 8.87 |
| 68 |  | 69.71 | 25.60 | 21.46 | 6.00 |
| 69 |  | 33.93 | 11.99 | 19.16 | 3.97 |
| 70 |  | 42.13 | 14.07 | 22.07 | 4.80 |
| 71 |  | 68.44 | 14.50 | 26.36 | 7.31 |
| 72 |  | 14.33 | 5.51 | 32.82 | 10.83 |
| 73 |  | 17.56 | 6.31 | 35.51 | 10.97 |
| 74 |  | 51.85 | 16.35 | 21.65 | 5.25 |
| 75 |  | 37.09 | 11.90 | 17.58 | 5.24 |
| 76 |  | 53.56 | 26.33 | 30.47 | 8.67 |
| 77 |  | 28.54 | 9.57 | 19.01 | 4.21 |
| 78 |  | 38.26 | 10.25 | 23.91 | 5.31 |
| 79 |  | 49.67 | 17.43 | 27.66 | 8.31 |
| 80 |  | 35.07 | 14.78 | 20.36 | 5.59 |
| 81 |  | 52.37 | 13.49 | 22.29 | 4.98 |
| 82 |  | 31.63 | 12.20 | 18.11 | 5.87 |
| 83 |  | 26.24 | 7.59 | 18.03 | 3.86 |
| 84 |  | 28.53 | 8.39 | 18.89 | 4.84 |
| 85 |  | 16.40 | 4.75 | 35.63 | 10.79 |
| 86 |  | 70.81 | 23.39 | 37.70 | 10.05 |
| 87 |  | 28.73 | 6.51 | 21.91 | 5.51 |
| 88 |  | 30.14 | 9.61 | 37.59 | 12.98 |
| 89 |  | 49.17 | 18.78 | 28.67 | 9.80 |
| 90 |  | 39.16 | 12.93 | 21.67 | 6.99 |
| 91 |  | 31.19 | 12.49 | 17.24 | 4.47 |
| 92 |  | 43.20 | 22.81 | 24.53 | 8.75 |
| 93 |  | 42.86 | 16.25 | 20.67 | 4.31 |
| 94 |  | 51.54 | 11.00 | 21.61 | 6.82 |
| 95 |  | 60.09 | 20.76 | 18.80 | 4.98 |
| 96 |  | 38.96 | 11.29 | 20.89 | 5.46 |
| 97 |  | 32.87 | 9.65 | 19.74 | 7.01 |
| 98 |  | 58.44 | 27.64 | 32.99 | 12.58 |
| 99 |  | 28.53 | 14.60 | 38.51 | 10.62 |
| 100 |  | 65.00 | 27.33 | 24.67 | 6.79 |
| 101 |  | 39.81 | 11.43 | 22.16 | 5.30 |
| 102 |  | 34.21 | 9.01 | 22.40 | 6.79 |
| 103 |  | 19.41 | 7.11 | 34.90 | 11.53 |
| 104 |  | 36.54 | 10.91 | 40.89 | 11.51 |
| 105 |  | 19.49 | 8.97 | 37.33 | 11.88 |
| 106 |  | 58.29 | 16.12 | 39.89 | 12.02 |
| 107 |  | 55.57 | 18.36 | 20.64 | 5.47 |
| 108 |  | 26.14 | 9.46 | 37.86 | 12.31 |
| 109 |  | 36.06 | 11.95 | 19.89 | 4.63 |
| 110 |  | 43.97 | 12.01 | 41.35 | 13.96 |
| 111 |  | 34.05 | 9.11 | 33.35 | 10.98 |
| 112 |  | 54.77 | 12.66 | 23.29 | 5.61 |
| 113 |  | 33.44 | 11.43 | 14.94 | 3.97 |
| 114 |  | 55.54 | 20.12 | 37.16 | 11.97 |
| 115 |  | 51.83 | 16.40 | 15.34 | 5.10 |
| 116 |  | 48.19 | 25.09 | 27.33 | 7.69 |
| 117 |  | 32.31 | 9.63 | 17.17 | 4.57 |
| 118 |  | 47.51 | 17.29 | 44.27 | 12.99 |
| 119 |  | 40.94 | 11.61 | 22.24 | 5.36 |
| 120 |  | 23.21 | 10.54 | 38.42 | 13.04 |
| 121 |  | 54.95 | 16.46 | 21.03 | 5.49 |
| 122 |  | 42.55 | 11.41 | 21.61 | 5.91 |
| 123 |  | 23.63 | 16.31 | 36.87 | 14.61 |
| 124 |  | 67.90 | 13.60 | 26.34 | 5.82 |
| 125 |  | 31.34 | 18.67 | 35.97 | 11.45 |
| 126 |  | 78.09 | 18.66 | 26.43 | 5.74 |
| 127 |  | 14.67 | 6.30 | 34.17 | 14.92 |
| 128 |  | 22.35 | 15.64 | 31.83 | 9.34 |
| 129 |  | 38.83 | 12.34 | 18.13 | 7.32 |
| 130 |  | 61.15 | 34.88 | 25.85 | 5.93 |
| 131 |  | 38.27 | 11.80 | 22.26 | 4.27 |
| 132 |  | 77.89 | 20.56 | 28.27 | 7.84 |
| 133 |  | 37.86 | 12.23 | 20.00 | 8.67 |
| 134 |  | 13.50 | 4.95 | 34.89 | 14.60 |
| 135 |  | 43.44 | 12.46 | 21.44 | 8.29 |
| 136 |  | 48.94 | 13.73 | 29.67 | 8.89 |
| 137 |  | 34.49 | 9.48 | 23.17 | 6.17 |
| 138 |  | 32.01 | 9.32 | 21.99 | 6.34 |
| 139 |  | 19.75 | 6.10 | 35.00 | 13.72 |
| 140 |  | 30.20 | 10.77 | 15.96 | 3.32 |
| 141 |  | 43.59 | 16.11 | 26.33 | 8.02 |
| 142 |  | 19.69 | 6.85 | 39.39 | 10.91 |
| 143 |  | 30.24 | 7.19 | 21.53 | 5.38 |
| 144 |  | 14.16 | 5.31 | 35.53 | 14.15 |
| 145 |  | 45.24 | 12.38 | 23.60 | 9.44 |
| 146 |  | 46.53 | 13.49 | 23.40 | 5.94 |
| 147 |  | 27.99 | 9.83 | 21.66 | 5.26 |
| 148 |  | 33.81 | 8.66 | 24.70 | 6.36 |
| 149 |  | 39.11 | 10.47 | 18.06 | 5.29 |
| 150 |  | 57.96 | 21.17 | 37.16 | 11.90 |
| 151 |  | 39.27 | 12.23 | 22.90 | 5.82 |
| 152 |  | 14.91 | 5.78 | 33.39 | 11.17 |
| 153 |  | 25.01 | 9.75 | 20.99 | 5.45 |
| 154 |  | 40.50 | 12.03 | 24.70 | 4.89 |
| 155 |  | 73.50 | 18.42 | 29.07 | 7.15 |
| 156 |  | 16.03 | 6.15 | 32.72 | 12.83 |
| 157 |  | 20.65 | 7.32 | 21.60 | 5.59 |
| 158 |  | 35.52 | 10.36 | 15.42 | 5.83 |
| 159 |  | 44.83 | 13.17 | 31.25 | 9.80 |
| 160 |  | 80.28 | 40.18 | 19.00 | 5.21 |
| 161 |  | 46.16 | 16.7399 | 26.76 | 11.5155 |
| 162 |  | 59.76 | 31.4501 | 20.52 | 7.927379 |
| 163 |  | 60.88 | 32.9689 | 24.2 | 11.39444 |
| 164 |  | 63 | 29.3414 | 26.56 | 12.97459 |
| 165 |  | 58.76 | 27.3576 | 29.64 | 13.21262 |
| 166 |  | 54.44 | 29.4067 | 34.84 | 12.89922 |
| 167 |  | 53.04 | 25.5285 | 25.48 | 8.607748 |
| 168 |  | 68.28 | 38.5957 | 31.08 | 11.48521 |

Table 3 displays the average widths of several. UT PoD ligatures and compares them to the widths of the composing character-shape widths, from Table 2 individually and when summed.

TABLE 3

Ligatures statistics extracted from GTed data scanned at 300 dpi.

| Ligatures | Ligatures | Average width (Pixels) | | | |
|---|---|---|---|---|---|
| | | 1st character-shape | 2$^{nd}$ character-shape | Sum of 1$^{st}$ & 2$^{nd}$ character-shapes | Ligatures-Sum |
| ظه | 63.95 | 44.27 | 42.36 | 86.62 | −22.67 |
| نج | 53.25 | 28.21 | 38.38 | 66.59 | −13.34 |
| حج | 70.89 | 34.89 | 53.97 | 88.85 | −17.96 |
| شم | 49.93 | 50.02 | 35.63 | 85.65 | −35.72 |
| خج | 67.60 | 37.09 | 53.56 | 90.65 | −23.05 |
| ظم | 75.57 | 43.97 | 34.05 | 78.02 | −2.45 |
| سم | 100.33 | 51.83 | 32.31 | 84.14 | 16.19 |
| شف | 74.25 | 54.95 | 42.55 | 97.50 | −23.25 |
| لح | 31.22 | 22.35 | 38.83 | 61.19 | −29.97 |
| حج | 63.50 | 43.44 | 48.94 | 92.38 | −28.88 |
| نب | 67.50 | 35.52 | 44.83 | 80.35 | −12.85 |

Figure 7:
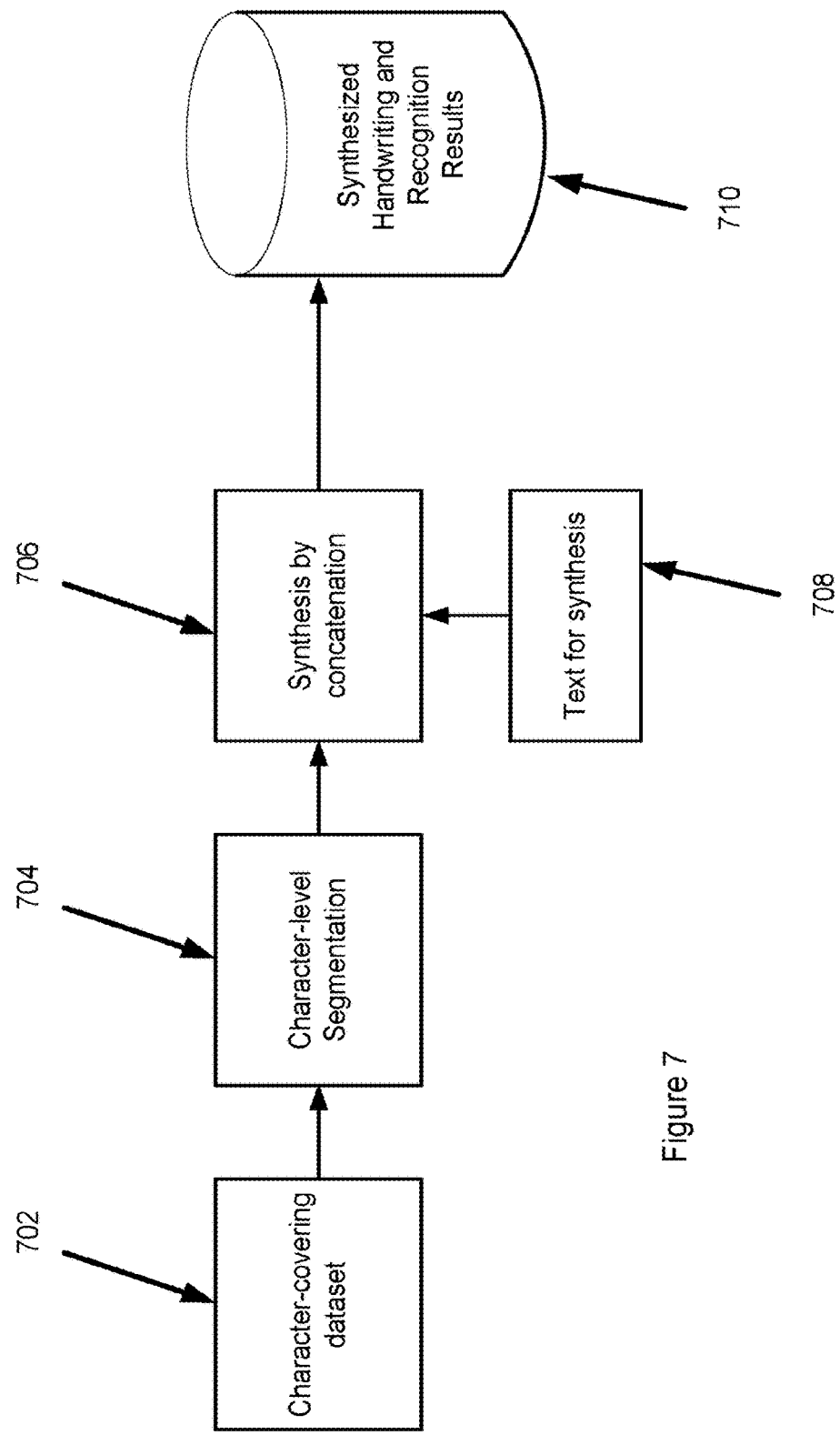
FIG. 7 illustrates blocks of a concatenation-based synthesis system according to an exemplary embodiment.

FIG. 7 illustrates an exemplary concatenation-based synthesis system 700 for cursive writing involving a segmentation phase and a concatenation phase. Concatenation-based synthesis system 700 includes character covering dataset 702, which presents analysis of Arabic handwriting and discusses the design of an exemplary dataset and the steps taken towards extracting handwriting samples from the exemplary dataset; character level segmentation 704 which focuses on the processes and results utilized for segmenting and aligning blocks of handwriting into ground-truthed character-shapes and opens doors for pixel level analysis; synthesis by concatenation 706 presents the syntheses approach and results; and text for synthesis 708 and synthesized handwriting and recognition results stored in database 710.

Handwriting synthesis refers to the artificial generation of data that resembles human writing. Synthesis has applications such as the improvement of text recognition systems, PC-personalization, calligraphic fonts, forgery detection, and Completely Automated Public Turing test to tell Computers and Humans Apart (CAPTCHA). These applications may require certain specifications on the synthesized data, such as being of a specific writer's style or a specific-script. Applications also suggest methods to evaluate the adequacy of synthesized data.

Handwriting synthesis can model handwriting either via the simulation of the human writing process (top-down approach) or via the mere imitation of its outcome (bottom-up approach). In the top-down approach, the neuromuscular acts of writing are simulated in what is commonly termed as movement-simulation. When the data itself is regenerated without imitating human movements, synthesis is termed as shape-simulation.

Some synthesis systems can be seen as the reverse of more well-known applications. For example, when synthesis aims at the generation of individual characters from their ASCII codes, it can be regarded as the reverse of character recognition. Similarly, when synthesis aims at the generation of words through the concatenation of characters, it can be regarded as the inverse of character segmentation.

Handwriting synthesis is a hot topic with increasing interest from the research community. Among the refereed journals that contribute to the dissemination of established knowledge in the area are: the International Journal of Document Analysis and Recognition (IJDAR), Pattern Recognition, Pattern Recognition Letters, Machine Learning, and others. Besides, some prestigious conferences such as the International Conference on Document Analysis and Recognition (ICDAR), the International Workshop on Document Analysis Systems (DAS)), the International Conference on Pattern Recognition (ICPR), and the International Conference on Frontiers in Handwriting Recognition (ICFHR) help in spreading the advances in the field.

Synthesis Applications, Specifications and Evaluation Methods

The applications of synthesis guide the specifications (requirements and constrains) of synthesized data and suggest methods to evaluate the corresponding synthesis systems. Handwriting synthesis applications are identified and linked to the specifications and evaluation methods that may suit them.

Synthesis Applications

Handwriting synthesis has a wide range of applications. It can be used to generate desired and inexpensive ground-truth data for the development of text segmentation and recognition systems. A recent application of synthesis is CAPTCHA. Synthesis can also be a means for fonts personalization. Synthesis with writer-imitation can be used for calligraphy generation, word spotting, and writer identification.

Synthesized handwriting might target humans, machines or both. It may be intended to imitate a particular writer's style, to generate writer-independent handwriting, or to tell humans and machines apart. Synthesized calligraphy, for example, targets human subjects while generic training data targets text recognition systems. Then again, word spotting systems may benefit from writer-specific synthesis to find words written by a particular scribe and from generic synthesis to find words regardless of scribes. Some synthesis applications may require human legibility but low machine readability.

Figure 8:
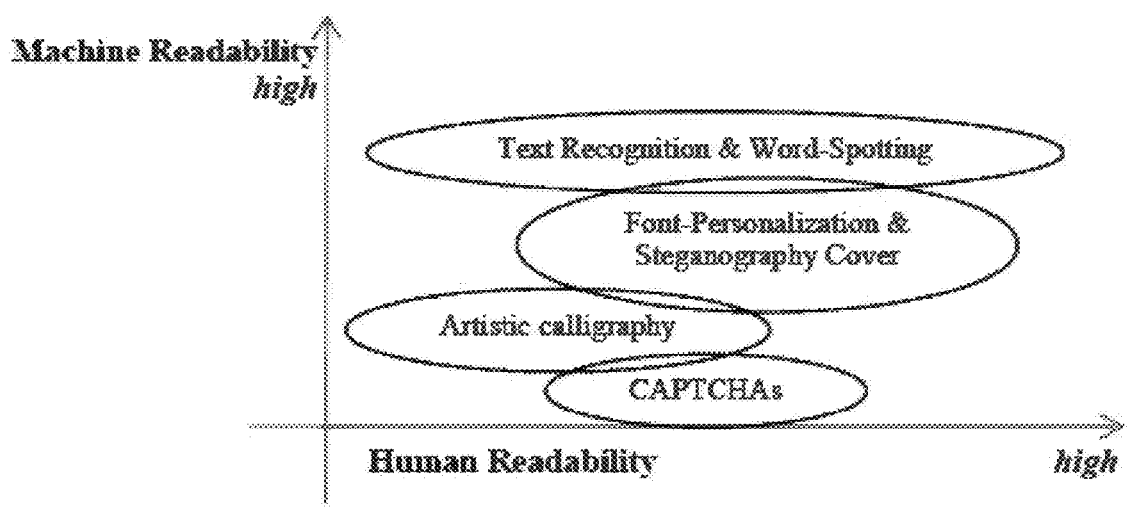
FIG. 8 illustrates applications of handwriting synthesis on a human vs. machine readability graph according to an exemplary embodiment.

FIG. 8 illustrates applications of handwriting synthesis on shows some applications on the Human vs. Machine readability graph. CAPTCHA is a test used to ensure that a response is generated by a human, not a computer. Handwritten CAPTCHAs, in particular, exploit the gap between humans and machines in reading to handwriting. Similarly, calligraphic and personalized fonts aim at the aesthetic aspects of writing but may be confusing to machines. On the other hand, some perturbed and noisy text which might not be pleasant to humans can be useful for training recognition systems. Steganography, the art of hiding data, is another application for synthesized handwriting where secret messages can be communicated by certain choices of the optional features in a script.

Specifications of Synthesis Systems and Outputs

There are several aspects of the synthesized data that can be specified based on their application. One, or occasionally more, specifications for each of the following aspects can be used to describe a synthesis system:

Input/output levels relationship: Generation vs. concatenation system
Output level: Stroke, character, character group/PAW, word, line or paragraph
Data types: Online vs. offline
Writing script: Arabic, Chinese, Indian, Latin, etc . . . .
Parameterization: parametric vs. non-parametric system
Writer-imitation: Writer-specific vs. writer-independent The input/output levels relationship and the parameterization aspects specify synthesis systems, rather than their outputs. The data types' aspect may specify input or output data. The rest of the aspects strictly describe specifications of the outputs of synthesis systems. The first two aspects are discussed jointly while the remaining ones are discussed in the subsequent subsections.

Input/Output Levels

Figures 9A, 9B:
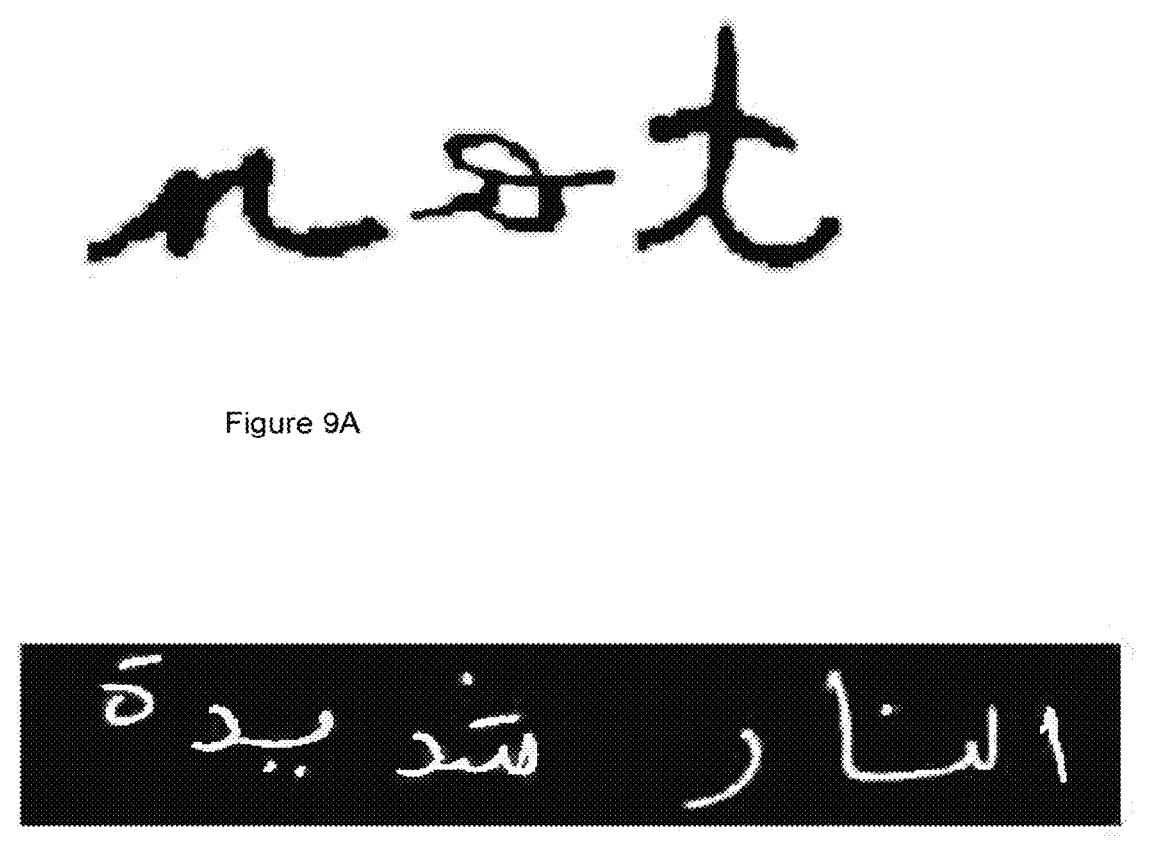
Figure 10:
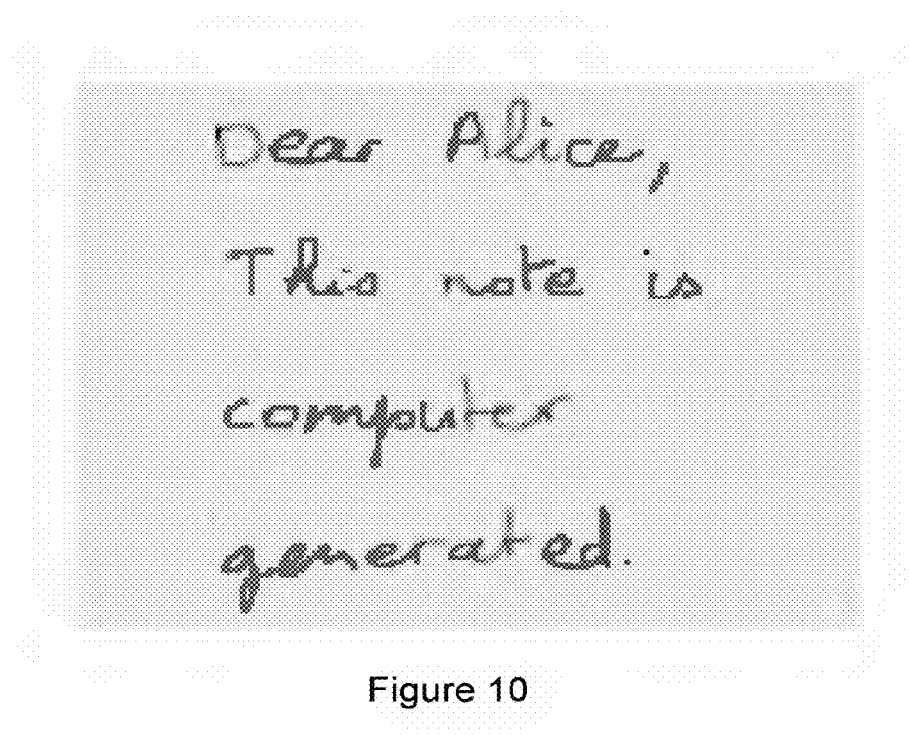
FIG. 10 illustrates concatenation for Latin paragraphs from character groups according to an exemplary embodiment.

Handwriting synthesis receives images of handwritten samples and generates output handwriting images. The input and output images can be at different levels of writing units such as sub-characters, characters, words, lines, or paragraphs. Based on the relationship between the levels of the input units and the output units, synthesis techniques are classified into: generation techniques and concatenation techniques. Generation techniques produce new synthesized images at the same level of the input samples they receive. Concatenation techniques, in contrast, produce output images at higher levels than their inputs. FIG. 9 and FIG. 10 show examples of generation and concatenation synthesis, respectively. The levels of the output units in FIGS. 9A, 9B and 9C are characters while FIGS. 10A, 10B and 10C correspond to words, lines and paragraphs, respectively. For example, FIG. 9A is an example of a generation of a Hangul character, FIG. 9B is an example of a Hiragana character, and FIG. 9C is an example of a concatenation for a Latin online character from sub-characters. FIG. 10A illustrates a latin offline word from concatenated from characters, 10B illustrates an Arabic line concatenated from characters and 10C illustrates a Latin paragraph concatenated from PAWs.

Data Types

Online data, such as coordinate time-stamps and pressure, are captured as writing occurs on special devices called tablets. Offline data are taken as static images of script that are written on paper. FIGS. 9A and 9C illustrate examples of online data. Offline data lacks temporal information but contains inking and stroke-thickness information, as illustrated, for example, in FIG. 10A. Usually, the data types of the inputs and the outputs of synthesis systems are the same. Sometimes, however, online data might be used to generate offline-like outputs, often by the addition of inking effects. In addition, some systems utilize a mixture of online and offline data in their inputs, as illustrated, for example, in FIG. 9B when a printed character is used as a standard reference for handwritten samples.

Writing Scripts

A script can be used to write several languages. The Latin script, for example, is used in English and Spanish languages. A script can be inherently cursive as in Arabic, inherently discrete as in Hiragana and Katakana, or mixed as in modern Latin. Synthesis can be done on Latin, Arabic, Cyrillic, Chinese, Korean (Hangul), Japanese and Indian (Hindi, Tamil, Malayalam, and Telugu) scripts. Systems can be implemented and tested on multi-scripts as well.

Parameterization

The number of parameters a synthesis technique involves is an important aspect to study. In general the less the number of parameters the preferable it is. But sometimes, more parameters provide increased flexibility in deciding the desired quality of synthesized text. Parameters may also affect the computational efficiency of a technique. Another important aspect of parameters is their estimation/training. Some techniques may involve parameters which require expert knowledge for calibration while other parameters may be trained from the data available. Moreover the number of parameters that need to be trained also places some constraint on the minimum data required to robustly train the model.

Synthesis systems may differ in the ways how they are parameterizable. Parametric models use observable parameters to define a system. Non-parametric models, e.g. statistical models, may still use parameters; but these usually lack physical meaning. Sigma lognormal models, as well as signal-based models and spline-based models, depend on parameters for the definition of character-shapes. Parameterization may be used to smooth joining ligatures between characters in concatenation systems. In generative systems, changes to samples are controlled via parameters. For example, perturbation is added to samples. Naturalness can be parameterized, where the relative distance from the printed sample and the nearness to handwritten sample is considered naturalness.

Writer-Imitation

Synthesis may or may not aim at the imitation of a specific writer's style, depending on their applications. Synthesis for character recognition improvement, as well as for CAPTCHA generation, usually lacks writer-specific features. On the other side, applications such as PC-personalization and writer-identification call for writer-specific synthesis. Table 4 classifies the applications of handwriting synthesis by their writer-imitation and target aspects. In some cases large databases of handwriting can be synthesized to generate writing samples for a single writer as well as in multi-writer setup. A system may be developed that can function in either a writer-independent or a writer-specific modes.

TABLE 4

Handwriting synthesis for the human and machine targets.

| Writer-Imitation Target | Writer-Independent | Writer-Specific |
| --- | --- | --- |
| Human | Pen-Based PC Calligraphy Arts CAPTCHAs | Writer-imitation PC-Personalization |
| Machine | Text Recognition Word-Spotting Compression | Writer Identification Word-Spotting |

Evaluation Methods

The choice of evaluation methods for synthesized data depends on the application domains for which the synthesis system is designed. Evaluation methods fall into two main categories: subjective and objective.

Subjective evaluation methods mainly rely on the opinion of human subjects. In few cases, trained subjects may decide if some handwriting belongs to a specific writer. Several researchers have used subjective methods for evaluating the synthesized handwriting. Subjective opinions of 21 English native speakers, that were not among the 15 writers of the database of, were used to evaluate the performance of their parameter calibration. For example, in subjective evaluation, the trained eye can find exaggerated regularities in character-shapes and probable inconsistencies in inking.

Objective methods rely on quantitative measures for the evaluation of synthesized handwriting. Text and writer recognition systems give success rates which can be used as measures of the machine-readability or writer-resemblance of some handwriting. In order to assess data that is synthesized for OCR improvements, the data can be injected to the training set. Injecting more synthesized data to training data is expected to improve the performance of the recognizer under the condition that the synthesized data captures variability of natural writing. The premise is taken from a rule of thumb with real data: the more training data the better the recognition.

Figure 11:
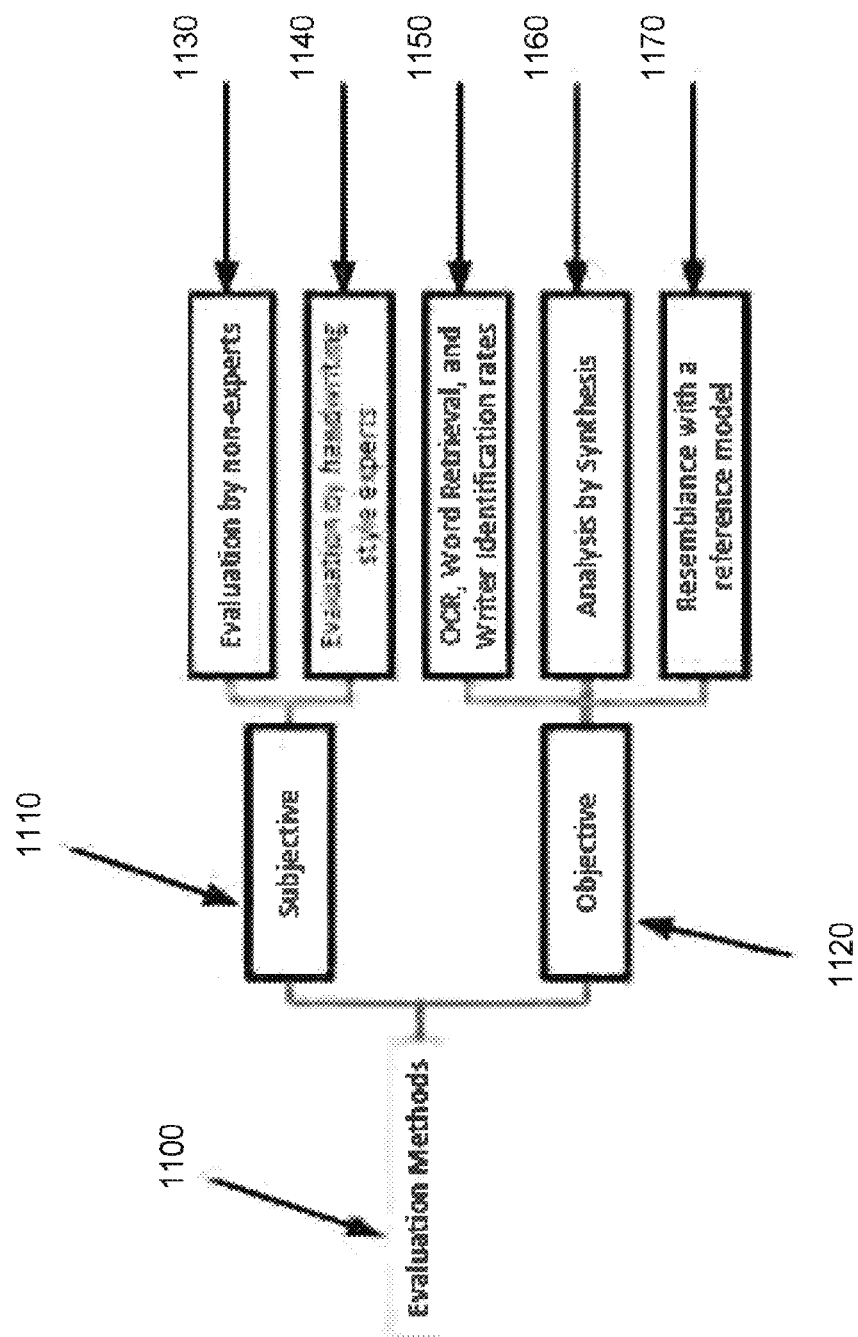
FIG. 11 illustrates methods to evaluate synthesized data according to an exemplary embodiment.

FIG. 11 describes evaluation methods 1100 grouped into the subjective and objective criteria according to an exemplary embodiment. Evaluation methods 1100 include subjective methods 1110 and objective methods 1120. Subjective methods include evaluation by non-experts 1130 and evaluation by handwriting style experts 1140. Objective method 1120 includes optical character recognition (OCR), word retrieval, and writer identification rates 1150, analysis by synthesis 1160 and resemblance with a reference model 1170.

Improvements in HMM-OCR performance on the IAM database (a database which contains forms of handwritten English text which can be used to train and test handwritten text recognizers and to perform writer identification and verification experiments) were reported after the injection of synthetic training data in. Support vector machine OCR that runs on a database of 10 Hiragana characters can be used with improvements on the OCR performance. A script recognizer may also be used to classify synthesized text into Arabic, Latin or Russian. A normal OCR Turing test is used for the evaluation of synthesized Arabic handwriting.

Analysis by synthesis is an objective evaluation method that judges synthesizers by the quality of their recognition models. This evaluation method is especially useful with generative model-based synthesizers. Test of completeness may be implemented on a statistical model to demonstrate the ability to recognize data not in the training set.

Another objective evaluation method for synthesis compares synthesized handwriting to some reference model. Correlations and regression analysis are used to quantify the difference between the synthesized and reference model.

A combination of subjective and objective evaluations can be performed using a synthesis model to implement a recognition scheme, in analysis by synthesis. Demonstrating the distances between some original and the synthesized sample characters can be presented on a graph to further report on the natural and legible appearance of the results. The results of character synthesis are reported to be similar to their corresponding natural characters. The shape vectors used achieve 94% success rate as recognition models.

The performance of CAPTCHAs is evaluated by low OCR recognition rates while preserving reasonable human legibility. Hence, both OCR and subjective evaluation methods are needed to evaluate CAPTCHAs.

Linking Applications, Specifications and Evaluation Methods

Applications may drive specifications related to the outputs of synthesis systems such as the level, data type, and writer-style imitation aspects. Table 5 suggests specifications of the outputs of synthesis systems for some common applications of synthesized handwriting along with some suitable evaluation methods. The script aspect is not shown because it directly follows from the application script.

TABLE 5

Output specifications and evaluation methods for some common applications.

| Application | Level | Online/ Offline | Writer-Specific? | Suitable Evaluation Methods |
|---|---|---|---|---|
| Word Spotting | Word | Offline | Application dependent | Objective: Retrieval accuracy/sensitivity rates |
| CAPTCHAs | Character string | Offline | No | Subjective/Objective: Human legible text with deteriorated OCR rate |
| Character recognition improvement | Text | Both | Usually not | Objective: Recognition success ratio Objective: Analysis by synthesis |
| Forgery detection | Words or text lines | Mostly offline | Yes | Subjective: Handwriting style experts Objective: Writer identification results Objective: Resemblance with a reference model |
| Calligraphic & aesthetic styles | Words or text lines | Offline | Style specific | Subjective: Evaluation by experts and non-experts |
| Personalization | Words or text | Offline | Yes | Subjective: Evaluation by non-experts Objective: Writer identification results |

Shape-Simulation Approaches

Shape-simulation approaches for handwriting synthesis model the shapes of handwriting units rather than the movements that produce them. Hence, they are more practical when online data is not available, i.e., when data acquisition means are not restricted to PC-tablets.

Figure 12:
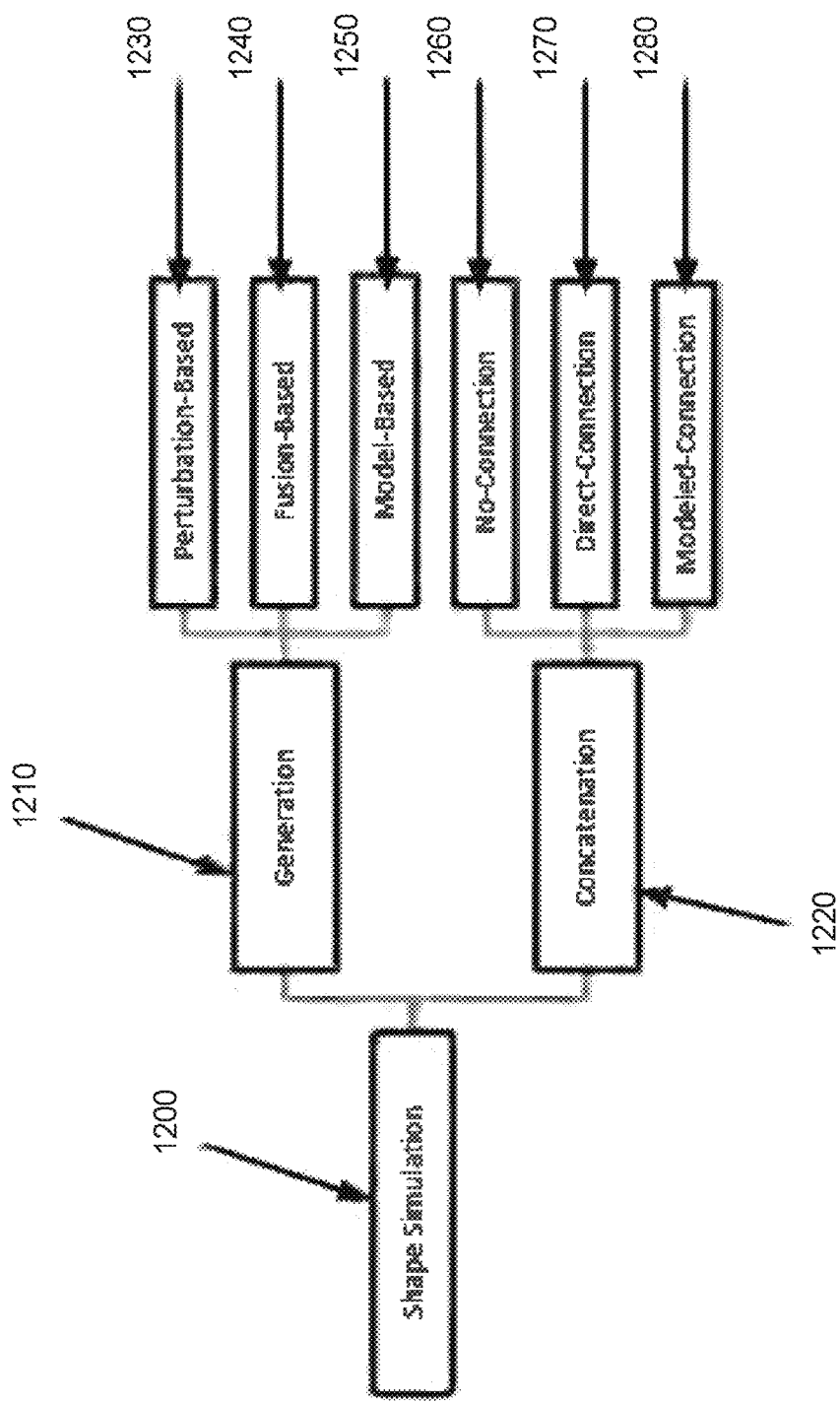
FIG. 12 illustrates classification of shape-simulation synthesis techniques according to an exemplary embodiment.

There are generation and concatenation techniques for shape-simulation. Generation techniques synthesize new instances for a given writing unit while concatenation techniques connect smaller scripting units into larger ones. FIG. 12 shows a classification of shape-simulation techniques 1200 under the generation 1210 and the concatenation 1220 techniques.

Generation techniques 1210 are subdivided into: perturbation-based 1230, fusion-based 1240, and model-based techniques 1250. Perturbation-based techniques 1230 generate new synthesized text by altering geometric features such as the thickness and slant of one input sample. Fusion-based techniques 1240 take two-to-few input samples and fuse them into new outputs that take patterns from each input sample. Model-based techniques 1250 capture the variations in writing from many samples of a desired unit into models.

Concatenation techniques 1220 are subdivided, according to the concatenation means they adopt, into no-connection 1260, direct-connection 1270, and modeled-connection 1280. No-connection techniques 1260 juxtapose writing units into text lines. Direct-connection techniques 1270 take writing units and position them such that the ending ligature from one unit directly connects to the starting ligature of the next unit (also referred to as head or suffix segment) to form a text line. Modeled-connection techniques 1280 add new connection ligatures synthesized by parametric curves.

For character synthesis, generation techniques are more popular although concatenation was used to synthesize from characters from sub-characters. On the other band, cursive PAWs are mainly concatenated except when they are part of complete lines which are generated using perturbation. For text line synthesis, both concatenation as well as generation techniques are commonly used although no work is reported on online synthesis of text lines using generation techniques.

Generation Techniques

As mentioned before, there are perturbation-based 1230, fusion-based 1240 and model-based 1250 generation techniques. Perturbation-based techniques 1230 can disturb a single handwritten sample into several variations of it. Fusion-based techniques 1240 fuse two or more samples of a unit shape into novel samples. Model-based techniques 1250 rely on large numbers of samples to generate models of a writing unit. Except for perturbation-based techniques 1230, the two other techniques require shape-matching operations.

Perturbation-Based Generation

Perturbation-based techniques 1230 generate new samples by altering geometric features such as the size, thickness and slant of a given sample. Perturbation-based operations can be seen as the inverse of the preprocessing steps employed in text recognition. Perturbation-based techniques are easy to apply, but the results may be unnatural due to random and non-calibrated parameter settings.

Stroke-wise rotation and scaling perturbations are applied to online strokes with high curvature points in. Perturbations are added to text lines in order to generate additional training data to increase the variability within the dataset. Non-linear geometric perturbations can be applied on complete text lines and connected components of offline images. Perturbation model parameters may be chosen randomly from predefined ranges. This approach can be useful in improving hungry-for-data OCR recognition performance by adding synthesized data to otherwise small training sets. Other approaches include calibrating the parameters of the perturbation-based model and use those perturbation models for writer identification on Arabic handwritten data.

Fusion-Based Generation

Fusion-based techniques take few input samples and combine them into new synthesized outputs. They differ from concatenation techniques in that they generate scripting units at the same level as their inputs; e.g. characters generate new characters. Shape-matching algorithms are necessary for fusion-based techniques to make sure that segments are properly aligned. The number of unique outputs is limited in fusion-based techniques as compared to that of other generation techniques.

A point-matching algorithm can be applied to generate online Latin characters by displacing the points in the range between two samples. Additionally, different partitions of samples of offline images can be combined into hybrid images while fixing their shared components.

Model-Based Generation

Model-based techniques 1250 capture the statistics of natural handwriting variations into models. Model-based techniques 1250 may be challenging to implement due to the large number of samples they require. Models resulting from these techniques can also be utilized in recognition systems. Synthesis via model-based techniques 1250 can be seen as a decoding process after a lossy-compression encoding of many natural samples.

Model-based generation may process sampled points of data often chosen for their structural features e.g. maximum curvature or zero-velocity, by spatial sampling e.g. equidistance or by drawing them from a generative statistical recognizer e.g. a Bayesian network. One exemplary modeling scenario is that statistics on displacements of the sample points from a template sample are captured. New sample points are then drawn from the statistical model to generate shapes.

Techniques adopted for model-based generation depend, again, on the target applications and data types.

Techniques that Use Online Data

As for online data, different techniques are used to sample the drawn coordinates. One can extract straight graphemes within online characters and select them to be control points. From these control points, more significant ones can be selected using Gabor filters or Principle Component Analysis (PCA). Sampling of points can be avoided by generating the coordinates directly.

Once control points are selected from the online data, characters can be synthesized by using polynomial splines by connecting the control points. One approach is to match the control points to a template that is computed from all the sample characters and draw the control points according to a generative model of their displacements from the template and then using curves (splines) to connect them into a character-shape. Eigen vectors may also be used instead of splines.

Techniques that do not directly rely on the extraction of control points from sample characters, define generative models from which new samples can be synthesized. Generative statistical systems may be used to synthesize handwriting through sampling from estimated joint distributions. The online x- and y-sequences of single-stroke character-shapes may consider the impulse response of an online signal. Characters are sampled into fixed sized vectors and match the points by using the Modified Newton Method. Finding the character synthesizing filters may be achieved by solving the optimization problems of the transfer functions for each pair of inputs and matched outputs.

Techniques that Use Offline Data

These techniques work on the images of handwritten texts. A natural idea is to derive some template patterns from the offline data and then generate new samples from the templates. All the points from a sample of training data are matched with its class template and their displacements are recorded. Then generation of new samples is done by selecting new points within the pre-calculated displacements. A similar approach of generating samples from templates with displacements may be implemented using characters from standard fonts as templates. To calculate the displacements, the outlines of font templates are sampled equidistantly to match it with the offline images.

Another approach applies fractal decomposition and synthesis as a lossy encoding-decoding process to offline character images. This requires defining reference bases that are repeated in an alphabet and then used these to model characters of the alphabet.

Techniques that Use Mixed Online and Offline Data

Using online and offline data can be beneficial. In one example, affine-perturbed online data are thickened into offline data. All online samples of the Hiragana character set may be optimally matched to a selected template sample by dynamic programming. The differences between the template and the other samples are modeled by PCA and the highest Eigen valued vectors were used for online sample synthesis.

In another example, training Hidden Markov Models (HMMs) as generative statistical models to synthesize handwritten samples can be used. The HMMs are trained as handwriting recognizers using handwritten and calligraphic-font samples. Pressure and ink data provided online and offline flavored outputs.

Concatenation Techniques

Concatenation 1220 refers to any synthesis approach that combines input samples into outputs of higher semantic levels. One common example is the concatenation 1220 of character-shapes into words or text lines. Concatenation 1220 can be seen as the reverse of character segmentation in a text recognition system. It encompasses tasks such as baseline detection, horizontal space modeling, connection part segmentation and modeling, and segment joining and trimming. The input units for concatenation techniques are usually characters but can also be sub-characters, character groups or connected components.

Concatenation techniques depend on knowledge of the rules of a writing script. Some scripts, such as Arabic, enforce most characters to be joined in a continuous flow while other scripts, such as the composite style of Latin, allow the writer to connect or disconnect characters. Others, such as Chinese, do not usually connect characters together.

The shape of the segments connecting characters, referred to as ligatures in, also relies on the script. In Latin, they often ascend in a curvy line to connect the suffix segment of a character to the prefix segment of the subsequent character. The Arabic connection (Kashida) is usually horizontal with occasional vertical ligatures. Concatenation techniques 1220 can be classified into no-connection 1260, direct-connection 1270, and modeled-connection 1280.

No-Connection Concatenation

No-connection techniques 1260 concatenate scripting units by aligning them in juxtaposition without connection. In one example, simple juxtaposition of selected character strings may be used to synthesize semi-cursive text. Character groups are selected based on their frequency in a linguistic corpus. In the training phase, a sample of each of the character strings is collected from the writer whose handwriting is to be imitated on an online tablet. In the synthesis phase, the text to be synthesized is parsed into a sequence of available character strings and the corresponding character string images are placed, as text lines and paragraphs. This approach works well in subjective tests at the first glance. However, the trained eye may soon notice abrupt pen lifts between glyphs, repetitions of glyph appearance, and too regular pressure or inking. Geometric transformations are introduced to reduce such effects. Non-connecting PAWs (Parts of Arabic Word) are thus aligned without any connection.

Direct-Connection Concatenation

Direct-connection techniques 1270 take writing units and position them such that the ending ligature from one unit directly connects to the starting ligature of the next unit to form text lines. These techniques are suitable for inherently cursive scripts like Arabic. Arabic online handwritten samples have been segmented and later concatenated to produce new samples. Samples of offline Arabic segmented characters may be conditionally selected and later connected directly using the horizontal connection stroke (Kashida).

Modeled-Connection Concatenation

Modeled-connection techniques 1280 add new connection ligatures synthesized from models such as parametric curves. In one example, modeling the connection between the suffix segment of a character to the prefix segment of the subsequent character using polynomial and Bezier curves may be beneficial. This results in character to character concatenation that appear natural, provided the segments of characters are adequately extracted.

A character concatenation model that concatenates the tail segment of a character to the head segment of the subsequent character (corresponding to the suffix and prefix segment in Rao's work, respectively) may be used to minimize energy in a deformable model.

Style preserving concatenation suggests connecting English characters according to some probabilities that reflect the writer's style. Whenever it is decided that characters should be connected, the extensions (probably trimmed) are connected with interpolation. If it is decided that characters should not be connected, an ending-position, rather than a middle-position, sample of the character is used (i.e. a no-connection technique).

Cursive handwritten CAPTCHAs are produced by the concatenation of skeletonized characters at the level of the baseline. They define their connection ligatures by looking at the derivative of the vertical projection. They parameterize ligatures and join them from the end of a character to the body of the next character. Table 6 summarizes some key shape-simulation works.

TABLE 6

Summary of the specifications of shape-simulation systems.

| Technique | Input unit | Output unit | Online/offline | Applications | Evaluation | Script |
|---|---|---|---|---|---|---|
| Concatenation | Characters | Cursive writing | Online | OCR Data compression | Subjective and analysis by synthesis | Latin |
| Model-based | Sub-characters | Characters | | | | |
| Model-Based | Character | Character | Online | OCR, Writer-imitation & identification | Test of completeness for the model | Latin |
| Concatenation | Glyphs | Semi-cursive writing | Online + inking | Personalization, Pleasant view | Subjective | Latin |
| Model-based | Digits | Digits | Offline | OCR | — | Digits |
| Concatenation | Ligatures | Cursive writing | Online | Pen-based computers | Subjective | Latin |
| Model + some Perturbation | Characters | Characters | Online | | | |
| Concatenation + sampling | Character with extensions | Cursive writing | Online | Pen-based computers | — | Latin |
| Model-based | Segmented samples | Characters | | | | |

TABLE 6-continued

Summary of the specifications of shape-simulation systems.

| Technique | Input unit | Output unit | Online/offline | Applications | Evaluation | Script |
|---|---|---|---|---|---|---|
| Concatenation | 1. Isolated characters 2. characters form text 3. n-tuples of characters | Cursive writing | Offline | OCR | OCR | Latin |
| Model-based | Characters | Characters | Online | Personalization | Subjective | Hangul & Digits |
| Perturbation | 1) text line 2) connected components | 1) Text line 2) connected components | Offline | Training data for HMM-based OCR | OCR training | Latin |
| Fusion-based | Characters | Characters | Offline | Nearest Neighbor Classifier | Nearest Neighbor Classifier | Digits |
| Fusion-based | Characters | Characters | Online | OCR, Writer Identification | Deformation error | Latin |
| Model-based | Text line | Text line | Offline | Scripting system recognition, Compression | Language and Script Recognition | Latin Arabic Cyrillic |
| Model-based | Online characters | New offline characters | Online | Offline OCR | OCR training | Hiragana |
| Model-based | * font character *handwritten samples | Characters | Both | Human-like behavior, personalized PC | Errors of recurrent neural networks | Hiragana |
| Concatenation + sampling | Characters | Cursive writing | Online | Aesthetical & personal view, forensics, For disabled, OCR CAPTCHA | Subjective | Latin |
| Perturbation | Characters | Characters | | | | |
| Concatenation | Characters | Cursive writing | Offline | CAPTCHA | Subjects and OCR performances | Latin |
| Perturbation | Characters | Characters | | | | |
| Concatenation + sampling | Segmented characters | Text lines | Offline | OCR, Word-Spotting | Comparison between best and worst synthesis | Arabic |
| Concatenation | Segmented characters | Connected components | Online | Holistic OCR | OCR training | Arabic |
| Perturbation | Text line | Text line | Offline | OCR | Subjective | Latin |
| Perturbation | Text line | Text line | Offline | Writer identification | Writer Identification | Arabic |
| Model + Concatenation | Characters | Characters and words | Online | OCR, personalization, study of human style | Subjective | Indian (Hindi, Tamil, Malayalam, Telugu) |
| Generation & concatenation | Character | Cursive writing | Offline | Calligraphy | Subjective | Japanese (Kana) |
| Generation & concatenation | Text | Novel cursive text | Unspecified | Personalization | NA (Patent) | Latin |
| Model | One or more characters | Characters probably with inking | Online→ offline-like | Personalization & artistic view | NA (Patent) | Latin |
| Concatenation | Character positions | Text line | Online | Training OCR | NA (Patent) | Latin |

Other Synthesis Approaches

Techniques are presented for handwriting synthesis which is non-shape simulation approaches. The most common of the non-shape simulation approaches are the group of techniques which can be termed movement-simulation approaches. Movement simulation is a top-down approach to handwriting synthesis where the neuromuscular acts of writing are simulated. One approach to synthesizing handwritten data is to model strokes as oscillatory components where the character formation is a result of horizontal and vertical oscillations (i.e. constrained modulation); the horizontal oscillation and its modulation controls the stroke/character-shape and the vertical oscillation and its modulation controls the character height. A neural network mode of handwriting strokes may be used, where the stroke velocities are expressed as oscillatory neural activities. The architecture has stroke selection as the input layer and the estimated stroke velocities are represented by the output layer.

The strokes are defined from the context of Kinematic Theory of Rapid Human Movement as primitive movement units which can be superimposed to construct word patterns. A stroke model describes the essential characteristics of the pen-tip trajectory. The main idea behind the Kinematic Theory is that a neuromuscular system involved in the production of a rapid movement can be considered as a linear system made up of a large number of coupled subsystems and the impulse response of such system converges toward a lognormal function wider certain conditions.

There are many models derived from this lognormal paradigm. These models can be broadly categorized into two:

(i) Delta-Lognormal, which involves two neuromuscular systems (each described by a lognormal impulse response and timing properties), one agonist to, and the other antagonist to, the direction of the movement. This model generates straight strokes and predicts all the velocity patterns observable in a set of strokes.

(ii) Sigma-Lognormal model, where the assumption is that the two neuromuscular systems do not work in exactly opposite directions and thus the resultant velocity is described by the vectorial summation of the contribution of each of the neuromuscular systems involved. Further in sigma-lognormal models, there are two versions: a straight vector (the simpler version) and a curved vector (a more complex but precise version where it is assumed that the input command vectors are not straight but curved). The curved sigma-lognormal models can be used to generate single strokes with almost any required precision, depending on the number of parameters used.

All the different models differ in their stroke generation quality depending on the number of parameters used in a given model (the simple one with three parameters to the more complex ones having up to 11 parameters).

Estimating the parameters robustly is one of the issues in using these stroke models for handwriting synthesis. Moreover, the variability of handwriting, as a result of varying the parameter values, to generate realistic text needs further investigation. There are many methods proposed to estimate the initial parameters of the log-normal stroke models. The INFLEX algorithm exploits the characteristics of the tangent lines at the inflexion points of a single lognormal to estimate the initial parameter values. Later, it uses non-linear regression to optimize the initial solution (minimizing mean square error). The INITRI algorithm uses analytical methods to estimate the initial parameters. Two points are selected along the rising velocity curve (it is assumed that mainly the agonist component contribute during the increasing part of the velocity curve) along with the time occurrence of the maximum velocity and the relationships between the parameters to estimate the initial values. This is later optimized using non-linear regression. Further, a third algorithm named XZERO is proposed that exploits the analytical relationships existing between three points of the lognormal profile i.e. maximum (the first order time derivative is zero) and two inflexion points (the second order time derivatives are zero). Each of the above three algorithms has its advantages and limitations, and using a hybrid versions of them is a way to create additional synergy as they algorithms seem complementary to each other.

A system may be developed for synthesizing a large database of handwriting from few specimens using the Sigma-Lognormal model. The system can be used to generate writing samples for a single writer, as well as in multi-writer setup. The variability observed in handwriting data can be regenerated by varying the Sigma-Lognormal parameters around their mean values within the limits fixed by their standard deviations. The factor of variability needs to be carefully fixed so as to get intelligible samples.

In another approach, time trajectories of the English alphabet were modeled using oversampled reverse time delay neural network (TDNN) architecture to generate outputs that can control the writing of characters with a pen. The neural network may be trained on character glyphs as a sequence of successive points in time. Three outputs provided the time sequences of signals that controlled the X and Y positions of the pen and up/down pen control.

Analogical proportion may also be used to synthesize new examples from an existing limited set of real examples. Each character is represented as a sequence of Freeman chain codes including a set of anchorage points. Experiments evaluated the improvement in the training of a set of classifiers on character recognition rate as a result of increasing the size of the dataset. The results confirmed that the proposed approach is as effective as character synthesis through knowledge-based approaches in the form of image-based (scant and slat) distortions and online (speed and curvature) distortions.

The handwriting process of few Arabic characters may be modeled using electro-myographic signals (EMG) generated by muscles in the forearm. An RBF neural network with feedback and time delay learns to associate the EMG signals generated, as a character is drawn, with the sequence of pen displacements recorded in the X and Y directions. Inverse models are also described for generating the EMG signals from the recorded position signals.

Synthesis for Text Recognition

Synthesis based on the kinematic theory and on shape-simulation can be used to improve text recognition in terms of recognition accuracy, stability with new classes, and speed performance. In one example, the training set of a recognition system may be expanded to achieve improvements on the character recognition rate for their online test set.

Shape-simulation via perturbation-based, fusion-based and model-based generation are also used to enhance recognition accuracy. For example, geometric perturbations may be applied on handwritten text-lines to supplement training sets of recognition systems. Similarly, affine transformations and local perturbations may be applied for the same goal, respectively. Fusion-based techniques combine two samples into shapes that take features from both inputs. Fusion-based techniques can be adopted for the expansion of training sets. Model-based techniques are used for online recognition and for offline recognition in.

Concatenation operations can be performed, with or without connecting the aligned units, for the same goal and may be used without to form words and lines for a training set. Direct-connection techniques connect character tails to their heads. More sophisticated concatenation may be achieved by connection-stroke interpolation which is based on polynomial-models, modeled-models or probabilistic-models.

In one example, 300 synthesized versions of the 26 English characters are injected into the training set and increase the character recognition rate (CRR) by up to 13%. Recognition rates of Latin handwriting can be improved by around 16% by injecting perturbed data. Similarly, synthesized samples may be injected to reduce the error rates of a set of 11 online gestures by 50%.

Arabic Handwriting Synthesis

Movement-simulation for cursive handwriting, including Arabic words, is performed by superimposing velocity beta profiles of basic writing strokes. Neural networks may be propose to model curvilinear velocity beta profiles for Arabic and Latin.

As for shape-simulation, offline Arabic synthesis is presented wherein the idea of sample selection and concatenation is introduced. Online concatenation, after PCA reduction of the samples space, can be used to generate and concatenate offline Arabic character-shapes from online data. Perturbation models can also be used for writer identification from Arabic handwriting.

As such, for Arabic recognition enhancement, concatenation-based synthesis may have advantages over generation-based synthesis; since concatenation-based synthesis can provide arbitrary vocabulary. Additionally, when offline data is concerned, shape-simulation becomes handier than movement-simulation. Arabic concatenation requires no-connection techniques between PAWs and direct-connection or modeled-connection within them. Table 6 highlights the useful conclusions recited and an open vocabulary and offline data for shape-simulation and concatenation may be a preferred embodiment of data design.

TABLE 6

The adequate specifications of synthesis systems per technique.

| Technique | Movement-Simulation | Shape-Simulation |
|---|---|---|
| Generation | Closed Vocabulary, Online Data | Closed Vocabulary, Offline Data |
| Concatenation | Open Vocabulary, Online Data | Open Vocabulary, Offline Data |

Arabic Handwriting Analysis and Dataset Design

Handwriting synthesis necessitates the acquisition of samples that cover a writing system. Coverage, here, refers to the presence of sufficient samples to be capable to generate any arbitrary text in a given scripting system. Moreover, the samples may need preprocessing and preparation to enhance their usage. Arabic typographic models and ligatures are analyzed and a design and collection of a covering dataset for Arabic script is implemented. In exemplary embodiments, digital text may be received and synthesized to produce hand written text associated with a user. From such synthesized text, arbitrary vocabulary for training and testing handwritten systems may be produced. In one example, different configurations or style versions of each word may be produced. Because Arabic language is different than other languages in styles and text, different styles of illustration of different words may be completely different. For example, the same letter may be portrayed in any number of different styles, including how it connects to another letter via Kashida. In another example, the length of the Kashida may also play a factor in the style of the word presented.

As will be described further in FIG. 72, exemplary embodiments of the present disclosure may create any number of versions of each word synthesized from handwritten text. Parts of words may be arbitrarily elongated using the synthesized Kashidas as described herein after. The synthesized Kashidas may also be used to determine curvatures of written Kashidas to influence handwritten styles and synthesis of the handwritten styles. Furthermore, the system described in the exemplary embodiments may be personalized through hardware and software configurations to make words that resemble a specific writer's style. This allows a user to digitally portray their own handwriting, for example.

Further exemplary embodiments may include training and testing data for handwriting optical character recognition (OCR) including word spotting and holistic recognition. Once data is generated, by means of training and testing of the system or by other means, and the word is input into the system, the aspects of the disclosure may be utilized to make an enhanced determination regarding writer imitation and authentication, as well as to make a determination as to whether a handwritten document is a forgery. Furthermore, exemplary aspects of the disclosure may be used to enhance handwritten CAPTCHA determination uses in computer networks and internet authentication. Other applications of exemplary aspects of the disclosure include steganography which includes transferring of information through the shapes/lengths of the synthesized Kashidas as well as personalized font generation and aesthetical calligraphy generation used in word processing and digital art production.

Analysis of Arabic Typographic Models

The traditional Arabic typographic model contains a large number of character-shapes that may combine to create hundreds of ligatures. In order to reduce these numbers, other models may be used to merge resembling character-shapes into groups. For example, the dot-less model divides Arabic character-shapes into groups that share identical character bodies with different stress marks (dots ".", Hamza " ء " and Madda "~"). FIG. 13 illustrates a dot-less character group and some characters that participate in the group for the (B) and (M) character-shapes only. Some characters differ only in dots/Hamza in some character groups. For example the use of a Hamza or selecting the number of dots used may change the character type.

The 2-Shapes model represents the (B) and (M) shapes of a character by the (B) character-shape for most characters. It does so as the (M) shape resembles the (B) shape of the same character, except for an additional small extension to its right. Looking at (B) box 1302 and (M) box 1304, it appears that letter 1306 gains an additional extension on the right 108 to connect the letter to a previous character on its right. Similarly, it represents the (A) and (E) shapes of most characters by the (A) character-shape for the same reason. The only exception for such resemblances occurs with the Ain and Heh Arabic character groups.

The 1-Shape model benefits further from some core resemblances between all of the positioned-shapes of a character. In many cases, characters excerpt a similar root part, and the positions are only indicated by some leading and tailing parts. A root shape is the part of the character that is independent from its position in a word. The tail shape is a curved extension that follows some root shapes (i.e. (A), (E)) at word-ends. If the tail shape is removed from the root shape, many characters can be represented with the single root shape. Table 7 as illustrated in FIG. 74, shows one example of a character that only fits in the 4-Shapes model (Isolated shape (A), Ending Shape (E), Middle Shape (M) and Beginning Shape (B)); a character that fits in 2-Shapes model, and a character that fits in the 1-Shape model.

Figure 14:
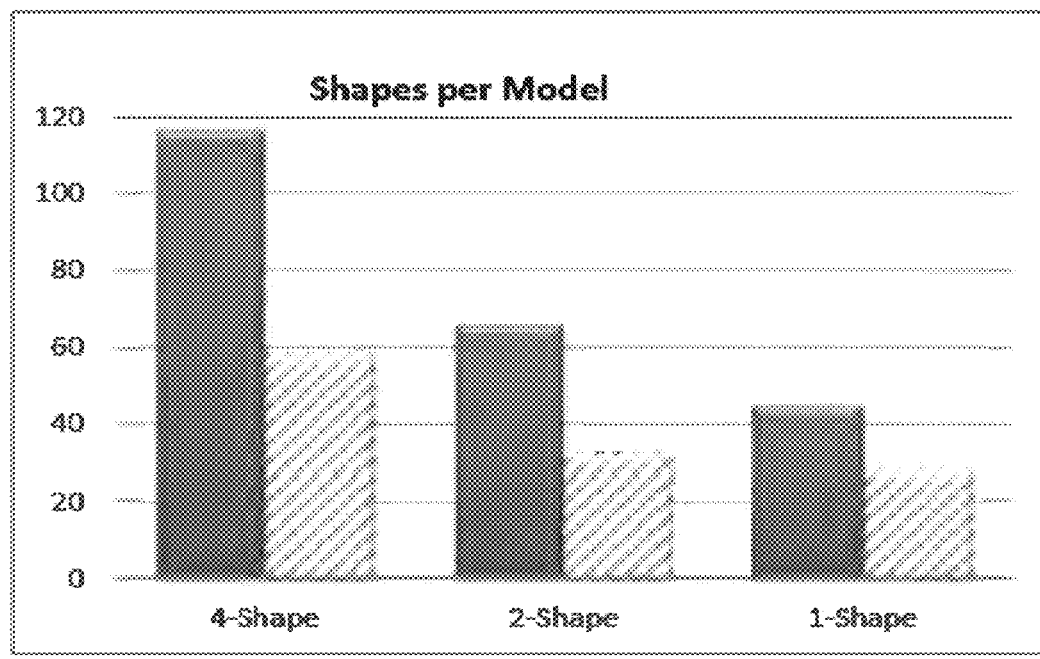
FIG. 14 illustrates numbers of shapes in different models in the Arabic writing according to an exemplary embodiment.
Figures 75, 76:
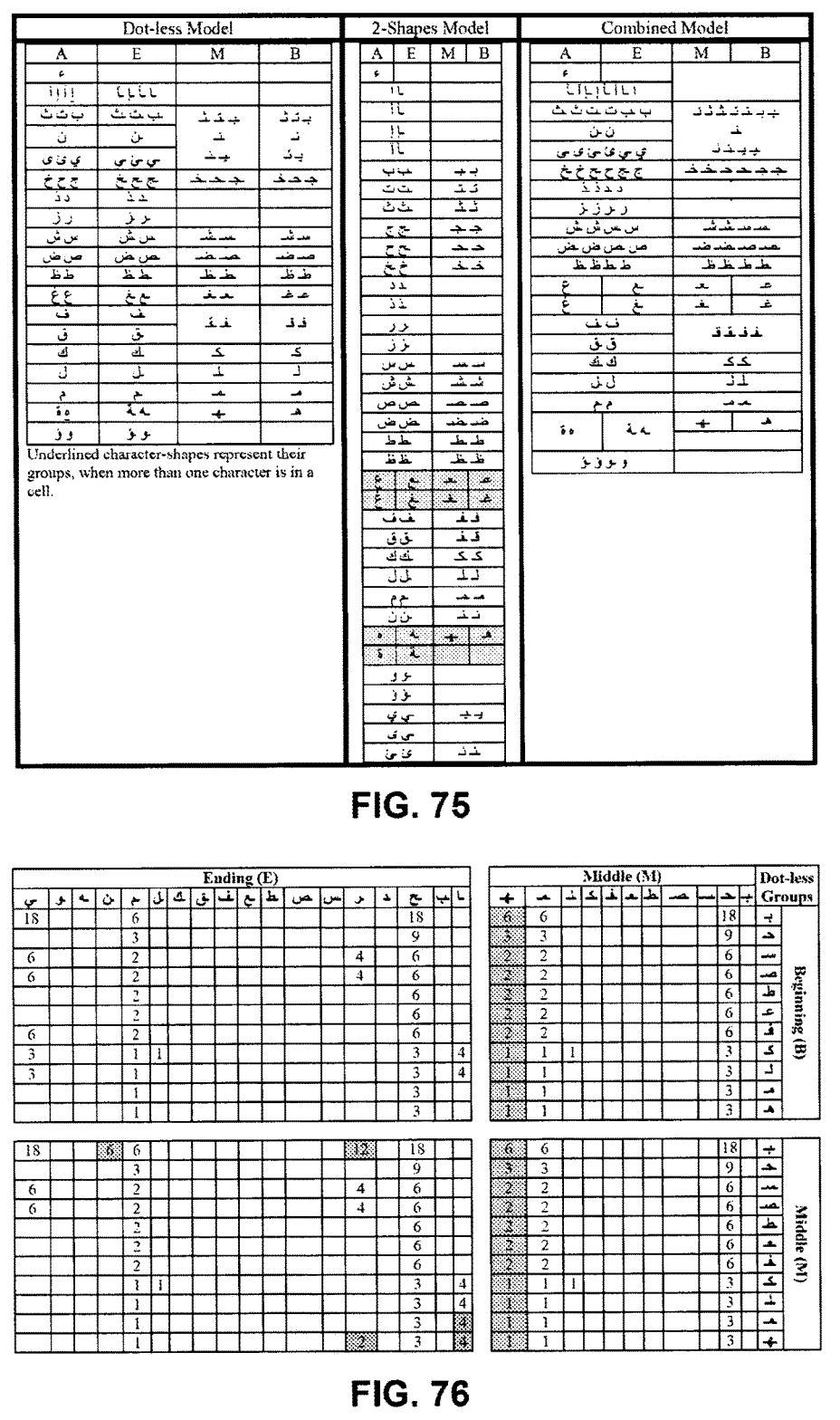

FIG. 14 visualizes the reductions in the different glyphs models. The hashed bars show the number of shapes if the dot-less models is applied in addition to a shape-model. The dot-less model exploits resemblances among characters; whereas the 2-Shapes model exploits resemblances among shapes of characters. These two reduction-models are orthogonal; i.e. they can be combined. The three reduced typographic models are shown in Table 8, as illustrated by FIG. 75.

The counts of character-shapes for the traditional and reduction-models are displayed in Table 9. These counts are later considered in the design of the ligative and unligative forms.

TABLE 9

Numbers of character-shapes for different typographic models.

| Model | Isolated Shape (A) | Ending Shape (E) | Middle Shape (M) | Beginning Shape (B) | Total |
|---|---|---|---|---|---|
| Traditional | 36 | 35 | 23 | 23 | 117 |
| Dot-Less | 19 | 18 | 11 | 11 | 59 |
| 2-Shapes | 35 + 5$^a$ | | 23 + 3$^b$ | | 66 |
| Combined | 18 + 3$^c$ | | 11 + 2$^d$ | | 34 |

$^a$Corresponding to the extra (A) shapes of Hamza, Ain, Ghain, Heh and Teh Marbuta.
$^b$Corresponding to the extra (M) shapes of Ain, Ghain and Heh.
$^c$Corresponding to the extra (A) shapes of Hamza, AM and Heh.
$^d$Corresponding to the extra (M) shapes of Ain and Heh.

The use of reduced typographic models is especially handy when designing ligative datasets. This is because the ligative dataset covers bigram combinations of character-shapes, the number (2,622) is of quadratic order of the underlying alphabet whereas the unligative dataset covers single character-shapes.

Analysis and Design of Dataset

Part of this work is to design an Arabic handwritten dataset suitable for synthesis and improved accuracy. In one exemplary embodiment, a dataset is designed that consists of parts, each of which aims at ensuring some kind of coverage. The covering units of the different parts of the dataset range from isolated characters to paragraphs and contain units like isolated bigrams, words and sentences. In general, the design of all dataset parts emphasizes on their conciseness and adequate level of naturalness. Hereinafter, the acronym(s) PoD(s) will be used to abbreviate "Part(s) of the Dataset".

In one example, a systematically designed set of separate ligative and unligative texts used for the collection of handwriting samples is used as well as two other dataset parts that are aggregately collected.

The Ligatures Part of Dataset

Using ligatures may significantly change the shape of one or more characters. Hence, ligature identification and distinction is useful. Comprehensive datasets of aligned text and images, which are necessary for the development of automatic text recognition and handwriting synthesis systems, include ligature information in their ground-truths. The modern Arabic dataset recognizes the importance of ligature identification in ground-truths by assigning some of the common ligatures distinct encodings. However, ligature identification necessitates laborious human intervention. As such, one exemplary embodiment separates ligative from unligative texts to ease ligature identification in the datasets.

Arabic script calligraphic workbooks suffer from the absence of an explicit and comprehensive list of ligatures. Such a list is useful for font development, dataset design, text recognition, and text synthesis research. It is not unusual to encountering more than 200 distinct bigram and trigram Arabic ligatures, which is a sizable number. However, these ligatures are not systematically documented. The Unicode standard contains more than 300 ligatures. However, it often lacks consistency as the Unicode standard frequently defines a ligature for a pair of character-shapes while ignoring similar cases for character-shapes that may only differ from the defined pair by dots (i.e. they share a dot-less model).

Optional ligatures may occur when characters connect into a shape that differs from the horizontal Kashida concatenation of their shapes. The ligatures part of the dataset (PoD) is dedicated to gather isolated bigrams and words that can optionally contain ligatures. Ligatures are n-grams in essence; hence, the number of their possible combinations grows exponentially with the number of their composers.

A ligature may only occur if a character connects to a subsequent character. Hence, bigram ligatures can be formed by either a (B) or an (M) character-shape followed by either an (M) or an (E) character-shape. In regular expressions, these are denoted as: <(B)(M)>, <(B)(E)>, <(M)(M)>, and <(M)(E)>. These bigrams can be considered as (B)-ligature shapes, (A)-ligature shapes, (M)-ligature shapes and (E)-ligature shapes, respectively.

Comprehensiveness of the Ligative Part

In one example, a comprehensive list of bigram ligatures is developed and analyzed followed by the development of a rule algorithm that extends its application to n-gram ligatures. Bigrams occur when a (B) or an (M) shape is followed by an (M) or an (E) shape. Table 10, as illustrated by FIG. 76, shows Arabic bigrams. Each row corresponds to a (B) or an (M) character group, identified by a representative character, according to the dot-less model. Similarly, each column corresponds to an (M) or an (E) character group. This generates four expressions for bigrams: <(B)(E)>, <(B)(M)>, <(M)(M)>, and <(M)(E)>, each of which is located in a quadrant in the table. The numbers shown in Table 10 are the counts of ligatures according to the traditional model. These are computed as the products of the group cardinalities of the row and columns to which they belong. In one example, the numbers in the table illustrate the 4-shapes model counts of the bigram combined by prefixes to the right with suffixes of the top.

In one example, n-gram ligatures require a PAW to contain n−1 overlapping ligatures. Overlapping ligatures refer to consecutive ligatures that share a connecting (M) character. For example, the word " محمد " has a trigram ligative " محمد " that is formed by combining the bigram " حم " with the bigram " مح " using Table 10, with character " ح " being the connecting character.

Compactness of the Ligative Part

When designing a dataset, a compact, yet comprehensive dataset is beneficial. The compactness of an Arabic dataset can be achieved by reducing the numbers of character-shapes and PAWs; since PAWs are the smallest scripting units that bear information on character connections. In one example, the character- and PAW-bounds (abbreviated as CB and PB) are defined as the minimum numbers of character-shapes and PAWs required by a comprehensive dataset, respectively.

Figure 77:
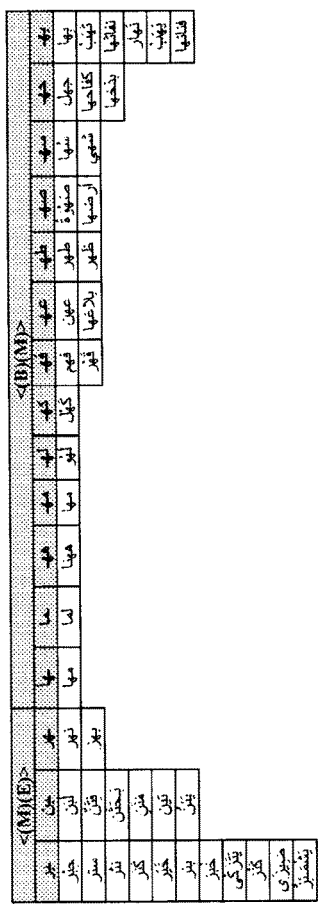
FIG. 77 illustrates Table 11, containing example words containing ligatives that do not have standalone bigrams.

Ligatives taken from the topmost left quadrant of Table 10 viz. <(B)(E)>, are standalone-ligatives as they are written without being connected to previous or subsequent characters. It is more natural to write standalone bigrams in isolation than it is for other bigrams. Therefore, one example uses standalone bigrams to represent all bigrams in the other quadrants, which corresponds to the 2-Shapes reduction-model. The ligatives that are highlighted in Table 10 are those that do not have standalone representatives. Hence, they are inserted into words, as shown in Table 11, as illustrated by FIG. 77, to be naturally collected in the dataset. Again, <(B)(M)> bigrams are used to represent corresponding <(M)(M)> bigrams, in conformance with the 2-Shapes model.

Figure 78:
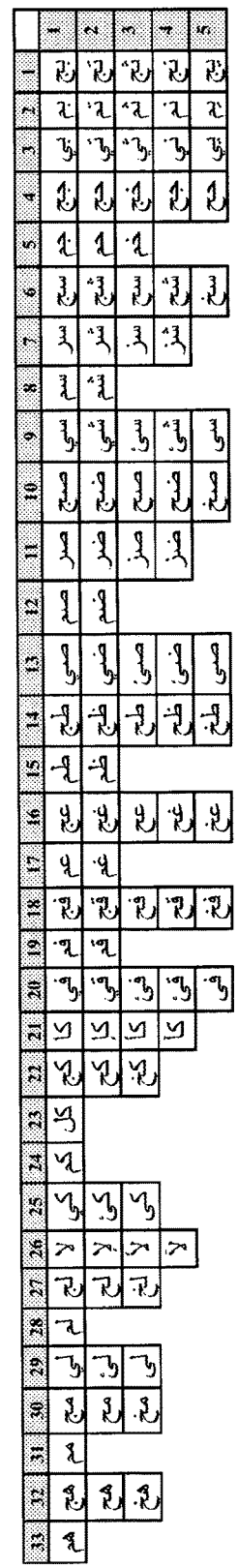
FIG. 78 illustrates Table 13, containing an expanded list of isolated-ligatures.

Table 12 displays PB and CB parameters under the four typographic models. PB is computed from Table 10 as follows: In one example, all the numbers in the table are summed in the traditional model; in the dot-less model, the number of filled cells is counted; in the 2-Shapes model, the numbers in the <(B)(E)> quadrant are summed, and expanded in Table 13, as illustrated by FIG. 78, to those that are highlighted in the other quadrants; finally, in the combined model, the number of highlighted cells and the filled cells in the <(B)(E)> quadrant are counted. In one example, the quadrants indicate the number of connections and similar bigram character-shapes, and can be used to identify/make chain ligatives of arbitrary numbers of character shapes.

Figures 16A, 16B:
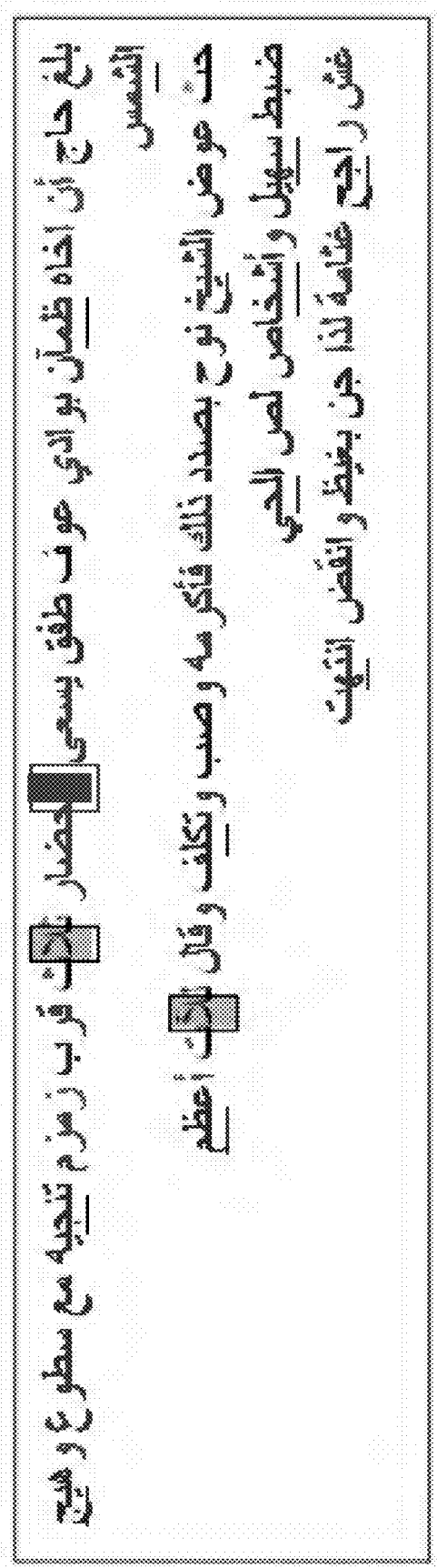
FIGS. 16A-16B illustrates selected Arabic character-shape pangram with obligatory (highlighted) and complementary set of character shapes according to an exemplary embodiment.

Several character-shape pangrams can be implemented. FIGS. 16A and 16B describe all unlegative forms of sentences and character shapes. The separation of the eight character-shapes of FIG. 16B helps reducing the total number of words in the dataset since these shapes can exist only once per word, at most. The pangram contains 43 words with 163 shapes that are shown in FIG. 16A. FIG. 16A further illustrates selected Arabic character-shape panagram with obligatory legatives (shown in boxed selection) and optional legatives (shown as underlined) while FIG. 16B further illustrates a set of complementary (A) character-shapes. In one example, the ligatives may be optional in, giving a writer the option write words/sentences with or without ligatures. The ligatives may be optional because they are omni-ligative such that the second letter in the bigrams always has the ability to form ligatures with whatever letter precedes them.

Comprehensiveness of the Unligative Text and the Isolated Letters Parts

A special kind of written pangrams are needed that would have the capability to accommodate the occurrence of every character-shape in the writing. In one example, a pangram condition can be asserted by ensuring that every instance of the 4-shapes model is included in the dataset. The pangram may be manually generated or semi-automatically, by aids of the tool in FIG. 15, or automatically by a program searching for the pangram with a size and content restrictions if any that may be applicable within the corpus. In one embodiment, the 4-shapes model may be used to pose a condition on a new kind of grapheme-based pangram that may be used to assure that all character shapes are present in a dataset.

The pangram will also need to conform to a special lipogram condition: to avoid the ligative bigrams of character-shapes. A lipogram condition is assured by avoiding the usage of the ligative bigrams of Table 12. In some instances, the two conditions cannot be fulfilled together because of the occurrence of omni-ligatives. Omni-ligatives are character-shapes that have the potential to ligate with every previous character. An omni-ligative is evident when a column of a character-shape is fully-populated. From Table 12, it can be seen that fully-populated columns correspond to five omni-ligative dot-less character-shape groups (e.g., ح, ـﻤ, ء, ـﻢ, and ـﻂ, ).

The pangram selection problem is formulated as a Set Covering Problem and follows a greedy approach to find a (probably suboptimal) solution to it. To do so, a Character-Shapes Covering algorithm (CSC) is devised, and illustrated in FIG. 17. CSC algorithm selects a pangram for a given alphabet from a parsed corpus. A lipogram option can be set to ignore character-shapes that appear in ligative bigrams but are not omni-ligatives.

TABLE 12

Bounds of ligatives for the four typographic models.

| | Model | | | | | | | | |
|---|---|---|---|---|---|---|---|---|---|
| | <(B)(E)> | | <(B)(M)> | | <(M)(M)> | | <(M)(E)> | | Total |
| Bound | PB | CB | PB | CB | PB | CB | PB | CB | PB | CB |
| Traditional | 151 | 302 | 116 | ≥348 | 116 | ≥348 | 165 | ≥495 | 548 | ≥1493 |
| Dot-Less | 34 | 68 | 34 | ≥102 | 34 | ≥102 | 34 | ≥102 | 136 | ≥374 |
| 2-Shapes | 151 | 302 | 23 | ≥69 | 23 | ≥69 | 28 | ≥84 | 225 | ≥524 |
| Combined | 34 | 68 | 11 | ≥33 | 11 | ≥33 | 5 | ≥15 | 61 | ≥149 |

Character-bounds in Table 12 can be found from the corresponding PB by the following relations: The character-bounds of <(B)(E)> bigrams are twice as much as their PAW-bounds. The character-bounds of the <(B)(M)> and <(M)(E)> ligatives are at least three times as much as their PAW-bounds. The character-bounds of <(M)(M)> bigrams are at least four times as much as their PAW-bounds. The bigrams may be used to measure and control the sizes of the dataset. For example, the time and effort needed to fill every form of the dataset may be estimated and minimized for efficiency using the bigrams.

The Unligative Text and the Isolated Characters Parts of Dataset

A comprehensive unligative dataset covers all character-shapes while avoiding ligatures. Pangrams, in logology, are texts that contain every character of an alphabet. Lipogram are writings constrained to avoid sets of characters. Hence, a comprehensive unligative dataset may be a special pangram with a special lipogram condition.

The unligative text (UT) PoD and the isolated characters (IL) PoD, together, cover all Arabic character-shapes and some obligatory ligatures. The idea of making minimal but meaningful texts that cover all possibilities of an Arabic writing unit can be used by selecting single words that cover all character-shapes. However, some of the words may be provided awkwardly to ordinary writers. Additionally, sentences and short stories can bear more features of the natural writing than single words (e.g. how writing inclines at different positions of a page). For these reasons, the UT and the IL parts were designed.

Figure 15:
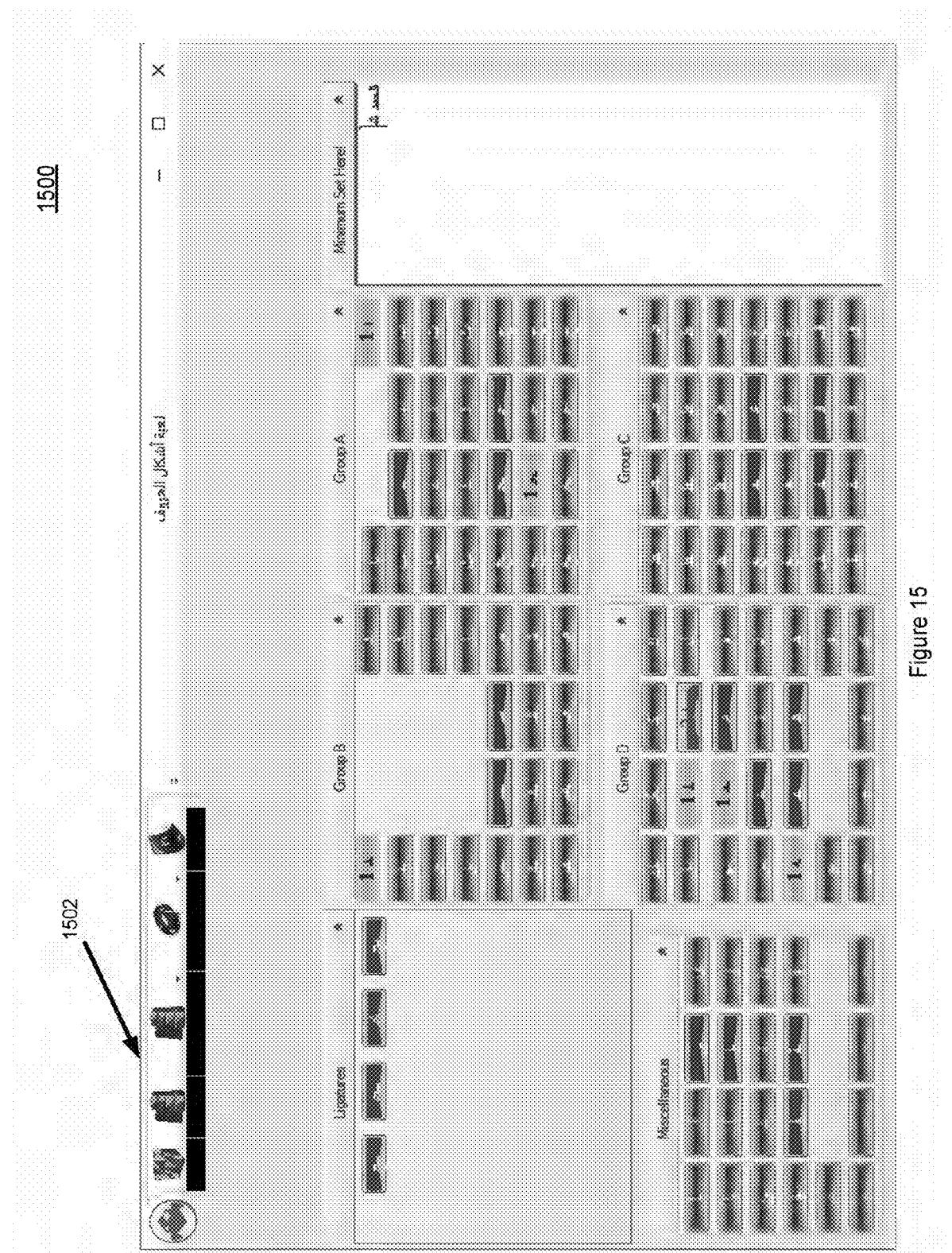
FIG. 15 illustrates a snapshot of a graphical user interface (GUI) tool that counts character shapes to analyze text and ease shape referencing according to an exemplary embodiment.

FIG. 15 describes a graphical user interface (GUI) tool 1500 designed and implemented to ease keeping track of the numbers of the Arabic character-shapes in a text. GUI tool 1500 distinguishes with colors the character-shapes that are used zero, one, or more times. The tool has a batch processor as well as a design window 1502 that displays statistics of the text that is edited. It also includes an option to exclude character-shapes that occur in a form that is ligaturisable from character-shape counts.

Moreover, a heuristic is used to help making such pangram compact. The heuristic favors the early coverage of character-shapes with few occurrences in the corpus. Iteratively, CSC computes a cost function for each input sentence based on the occurrence of the least frequent character-shape in it. The cost function considers the uncovered character-shapes that a sentence can add. The sentence with the minimum cost and fewest characters is added to the pangram and its character-shapes are overlooked in subsequent iterations. Eventually, if the corpus contains all character-shapes, the algorithm halts with a pangram.

To seek alternative pangrams for the unligative dataset, an online competition is conducted on character-shape pangram composition. The semi-automatic GUI tool 1500 was provided to competitors. The texts were evaluated for the pangram condition, lipogram condition and compactness. The winner text is shown in FIG. 18. It contains 851 characters from Arabic proverbs and clichés. It covers character-shapes so that only omni-ligatives are not asserted to be unligative. In one example, the liporgram condition assures that legative character sequences are avoided. Furthermore, by trial and error with help of the GUI tool in FIG. 15 and the CSC algorithm of FIG. 17, a candidate collection of statements (in this case proverbs and cliches) is presented to a CSC program to select a subset of the collection, and the resulting subset is tested using the GUI tool for human evaluation. The pangram may be divided into three sections for compactness of presentation. Ligatives may distort the shapes in grapheme-based pangram. The underlying characters of a ligative can be written in a way that is not desired. Hence, the underlying characters of a ligative may be avoided by choosing character-shapes that do not allow the underlying characters. Such undersired ligatives may be considered noise in the input text.

Compactness of the Unligative Text and the Isolated Letters Parts

Character-bound (CB) and the PAW-bound (PB) unligative text are studied for two hypothetical PAW-based unligative datasets. The two datasets derive from extreme assumptions on the level of ligativity of an alphabet (or font), e.g., the high-ligativity (HL) and the low-ligativity (LL) assumptions. High-ligativity assumes that all character-shapes are omni-ligative except for one (B), one (M) and one (E) instances. Low-ligativity depicts a case where a distinct unligative character-shape can be found for a set of PAWs that form a pangram. Low-ligativity can become more probable if character-shapes that ligate frequently are used earlier in the CSC algorithm.

The HL and the LL assumptions lead to worst and best-case scenarios with respect to CB and PB, regardless of the underlying alphabet. The following observations facilitate the derivation of CB and PB for the HL and LL assumptions. Denote the number of (A), (B), (M) and (E) character-shapes in a given model by $|A|$, $|B|$, $|M|$ and $|E|$, respectively. Then, (A) character-shapes may appear only as a single character PAWs. Hence, CB and PB equations must include one $|A|$ term.

(B) and (E) character-shapes appear exactly once per PAW.

(M) character-shapes can only exist within PAWs of at least three characters.

$|E|$ is larger than $|M|$ and $|B|$ in all typographic models, as revealed by Table 11. Hence, $|E|$ PAWs are needed to include all (E) shapes in the dataset, repeating some (B) character-shapes.

Equation (3.1) formulates PB under the LL assumption. In addition to the $|A|$ single-character PAWS, many multi-character PAWs are needed as the maximum of $|B|$ and $|E|$.

$$PB_{LL}=|A|+\text{MAX}(|B|,|E|)=|A|+|E| \quad (3.1)$$

Equation (3.2) derives a CB expression for the LL assumption from Equation (3.1).

$$CB_{LL}=|A|+|M|+2*\text{MAX}(|B|,|E|)=|A|+|M|+2*|E| \quad (3.2)$$

The 2*MAX($|B|$,$|E|$)+$|M|$ terms of Equation (3.2) account for the minimum number of characters in MAX($|B|$,$|E|$) PAWs that may include up to $|M|$ character-shapes.

Equation (3.3) reveals that PB under the HL assumption is of the order of the total count of character-shapes.

$$PB_{HL}=|A|+|E|+|B|+|M|-2 \quad (3.3)$$

$|B|$ PAWs are needed for all (B) character-shapes to appear with their unique unligative neighbor. Similarly, $|M|$−1 and $|E|$−1 additional PAWs are needed to cover the (M) and (E) character-shapes with their respective unligative neighbors. The 1 is subtracted in order to avoid double-counts of the unligative placeholder character-shapes.

Equation (3.4) maps PB of Equation (3.3) into CB.

$$CB_{HL}=|A|+2*|E|+2*|B|+3*|M|-4 \quad (3.4)$$

In one exemplary scenario, one in which low-ligativity indicates that there is high reusability of the middle character and no need to repeat characters for the pangrams to be obtained, thus reducing the size of the dataset, the $|B|$ and $|E|$ PAWs of Equation (3.3) are bigrams that contribute 2*$|B|$ and 2*$|E|$ character-shapes, respectively. (M) character-shapes may appear in PAWs of length 3 or more. Assuming ternary PAWs are used, 3*$|M|$ character-shapes are needed to make $|M|$ PAWs, Thereafter, 4 is subtracted from the sum to account for repetitions of character-shapes used as placeholders.

Table 14 shows character and PAW bounds under the LL and HL assumptions for the typographic models of 8.

TABLE 14

Character and PAW bounds under the low-ligativity and the high-ligativity assumptions.

| Model | $PB_{LL}$ | $CB_{LL}$ | $PB_{HL}$ | $CB_{HL}$ |
|---|---|---|---|---|
| Traditional | 71 | 115 | 129 | 217 |
| Dot-Less | 37 | 57 | 66 | 106 |
| 2-Shapes | 40 | 64 | 78 | 126 |
| Dot-Less & 2-Shapes | 21 | 32 | 11 | 63 |

Figures 79, 80:
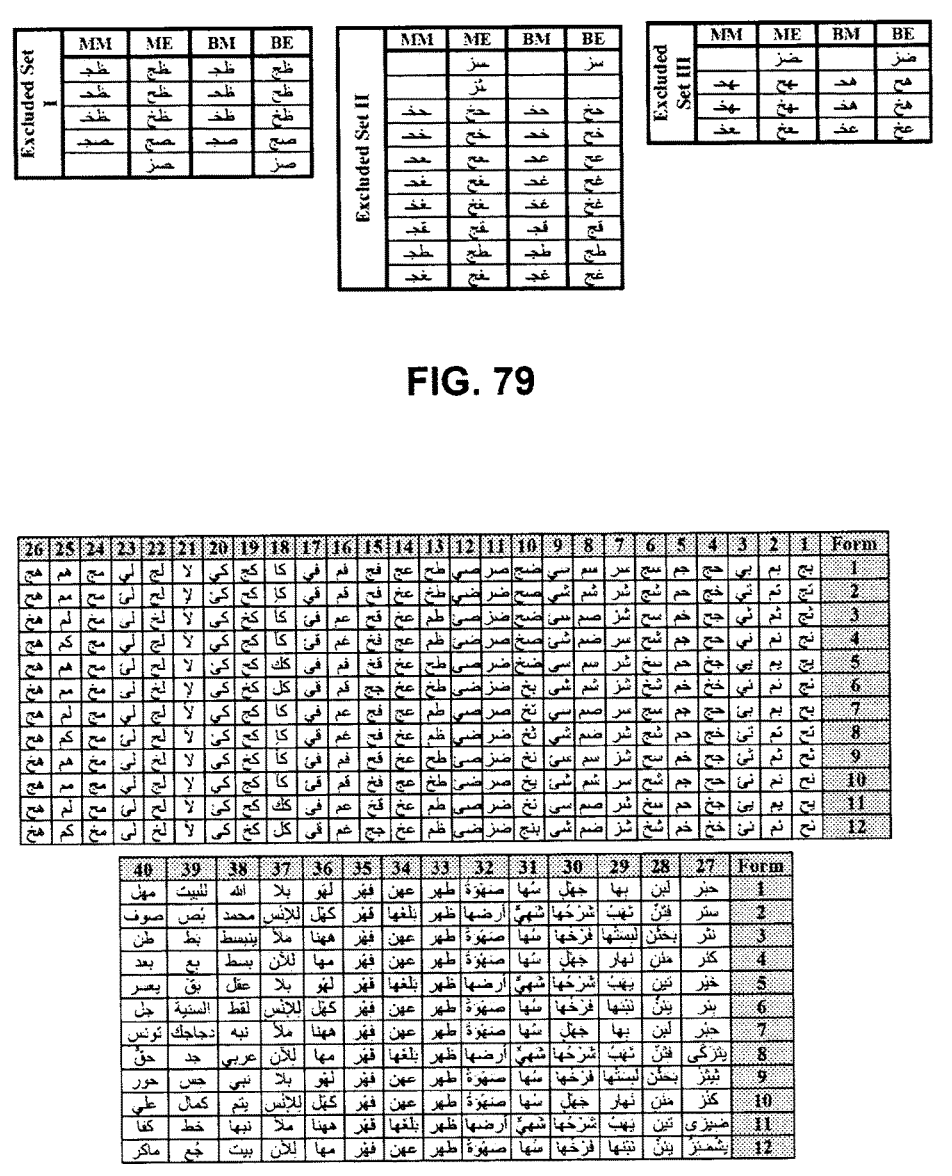

Further reductions in the size of the ligative dataset can benefit from linguistic analysis. In Table 15, as illustrated by FIG. 79, illustrates 67 ligative bigrams of a stop-list designed to be character sequences that cannot appear in a given word. Discarding some or all of these reduces the size of dataset forms. The stop-list can also be applied in error detection for text recognition. The combination of Dot-Less and 2-shapes models may be used to improve performance and efficiency. In one exemplary embodiment, a work in series may be implemented such that a first listing of the characters of one model is implemented, then, followed by further filtering by the other model.

The Passages Part of Dataset (PoD)

The passage PoD aims at heaving a distribution of character-shapes near to natural. Natural distribution of a dataset has provides advantages in training and testing. Training on data that is abundant in natural language should improve the system on such data; hence reduces the overall error. On the other hand, testing on near-to-natural data distributions gives clearer insight to real life error rates.

The passages PoD consists of semi-automatically selected news text from the Gigaword corpus. Texts of around 50 words long are automatically chunked from the corpus. A human reader then asserts that the content of the paragraphs is suitable for the dataset forms. Probabilities of character-shapes of the selected paragraphs, calculated by counting their occurrences and dividing by the total number of character shapes, are compared to those estimated from the Gigaword corpus. If they don't match, some paragraphs are replaced by more representative ones. The dataset, as a whole, should ensure a level of natural distribution of character-shapes, but without guarantee on larger n-grams. The character-shape probabilities are shown side-to-side with the corresponding Gigaword probabilities in Appendix E.

The Repeated Phrases Part of Dataset

The repeated phrases part consists of a set of commonly used phrases that are to be written six repeated times per form. This part is the only part where the distribution of the covered units per form uniformly goes above one. It is designed with writer identification research in mind.

Form Collection

Figure 20:
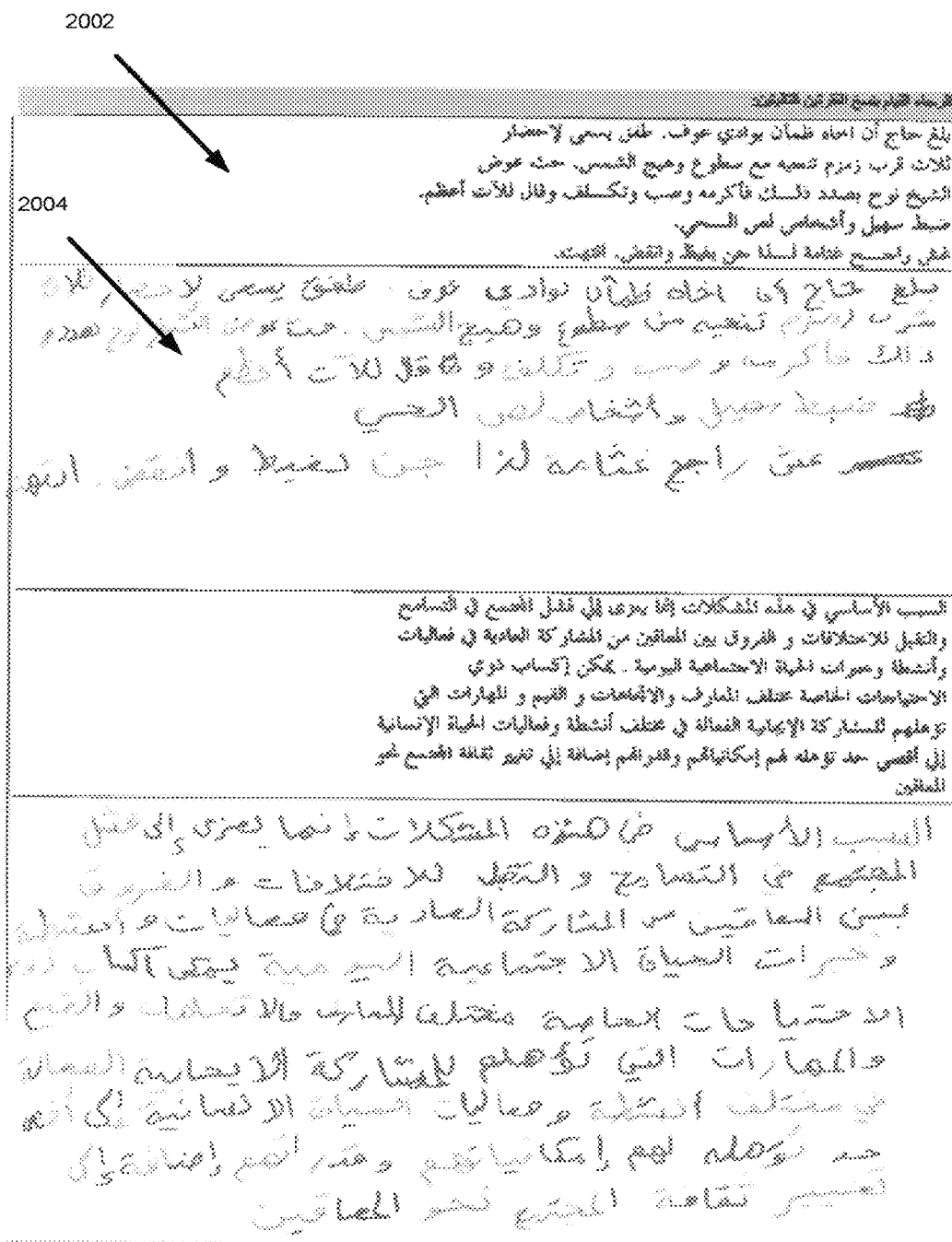
FIG. 20 illustrates a scanned sample of a second form collection page where an unlegative text part and a natural statics part are filled according to an exemplary embodiment.
Figure 21:
FIG. 21 illustrates a scanned sample of a third form collection page concerned with a ligatures part according to an exemplary embodiment.
Figure 22:
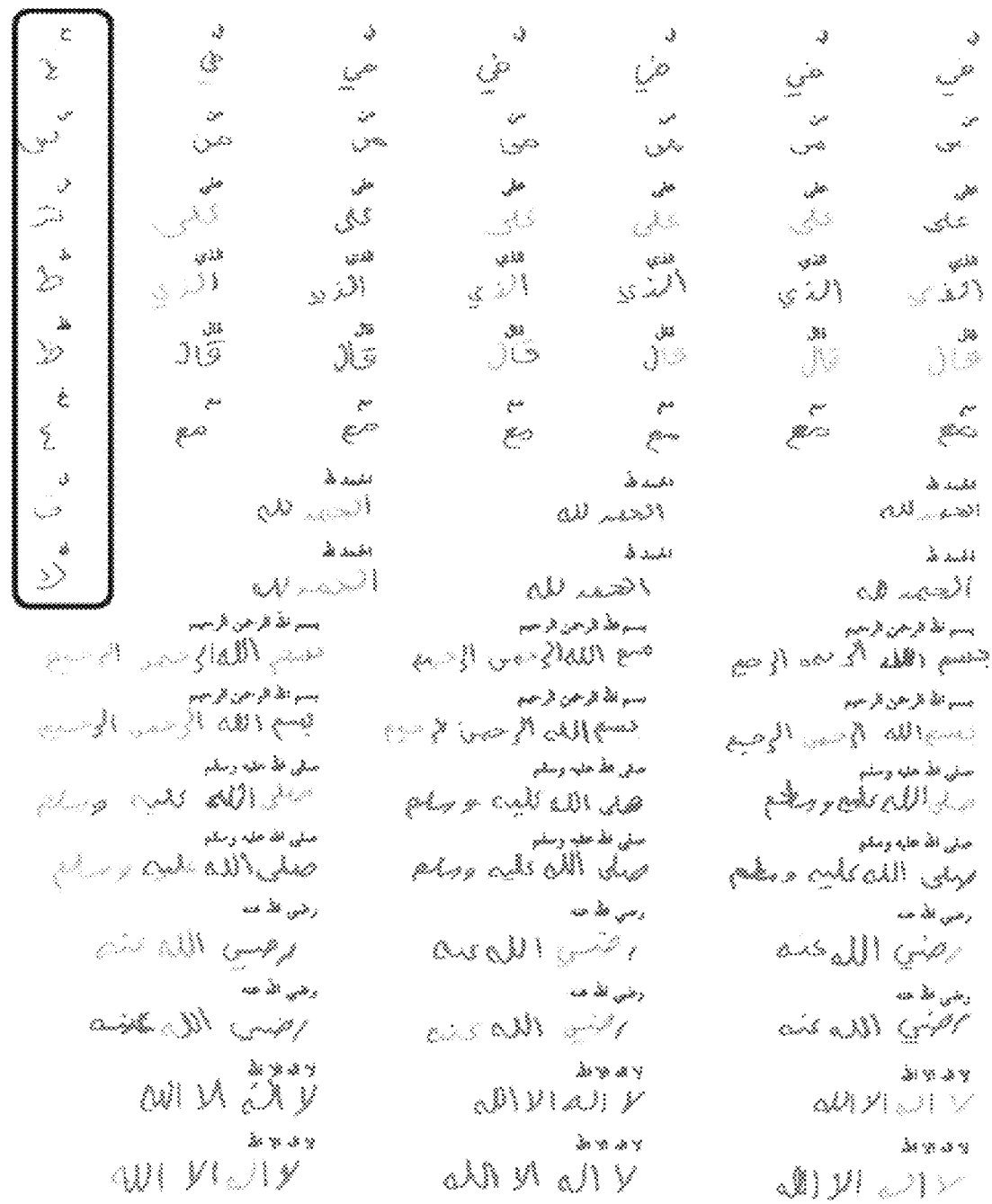
FIG. 22 illustrates a scanned sample of a fourth form collection page including some isolated characters that is marked in a box according to an exemplary embodiment.

A form is an instance of the dataset intended to be filled by a single writer. Each form contains four pages. A four-paged sample form is shown in FIGS. 19-22. Each form contains ligative and unligative parts and is intended to be filled by a distinct writer. The forms were printed and distributed mainly among the community in King Fahd University of Petroleum & Minerals. After discarding incomplete forms, 450 forms were selected. More than half of the forms were scanned into TIFF colored images with a resolution of 300 dpi. FIG. 19 is an illustration of a scanned sample of the first form-collection page where writers' information is filled in. Information includes the writer's name, age, upbringing country, qualification, gender and handedness. FIG. 20 describes a scanned sample of a second form-collection page where the unligative text part 2002 and the natural statistic part 2004 are filled. In one example, the chosen teof this part is carefully chosen to avoid all but a few omni-ligative sequences of characters, while still containing all character-shapes. FIG. 21 describes a scanned sample of the third form-collection page concerned with the ligature part. Fields 2102 and 2104 illustrate the selection of different small ligature words that can be selected, from the filled in text and compared between unligative and natural statistic part. In one example, the text that is chosen in the ligature form are all noticed to be legative bigrams. That is, they all can be optionally written in a form that differs from the shape resulting from direct concatenation of the constituents. Accordingly, they are bigram, in most cases, because the two-lettered beginning-ending form is chosen to represent a set of other similar combination. FIG. 22 describes a second sample of the fourth form-collecting page. The isolated characters part is marked in a box 2202. The rest of the text, including words and phrases, that are repeated are collected in the remaining part of the form. In one example scanned sample of a fourth form collection page is described including some isolated characters that is marked in a box. These character-shapes are not included in FIG. 20 to reduce the total size of the forms. Accordingly, the rest collects repeated words and phrases according to an exemplary embodiment. For example, these character shapes may appear at word endings of Arabic sentences if the penultimate letter is unconnecting. In one example, the significance of collecting isolated characters is that they naturally appear in Arabic writing. As such, for more efficient processing, they may not be included in the unlegative paragraph to reduce the size. Accordingly they would need 8 words to appear there.

Statistics of the regions, genders, writing-hands, and qualifications of the writers are collected and presented in Table 16, where considerations of the region of the writer as one of the following three:

the Arab Peninsula: containing the Gulf countries, Yemen and Iraq,

North Africa: containing Egypt, Sudan, and the countries of Northwest Africa, and Levant: containing Syria, Jordan, Palestine, and Lebanon

TABLE 16

Numbers of writers in the collected dataset per region, gender, handedness and qualifications.

| | | |
|---|---|---|
| Region | Arab Peninsula | 417 |
| | North Africa | 22 |
| | Levant | 11 |
| Gender | Male | 398 |
| | Female | 52 |
| Writing Hand | Right Hand | 416 |
| | Left Hand | 34 |
| Qualification | Intermediate School | 4 |
| | High School | 386 |
| | B.Sc./BA | 53 |
| | M.Sc./Ph.D. | 7 |

Figure 23:
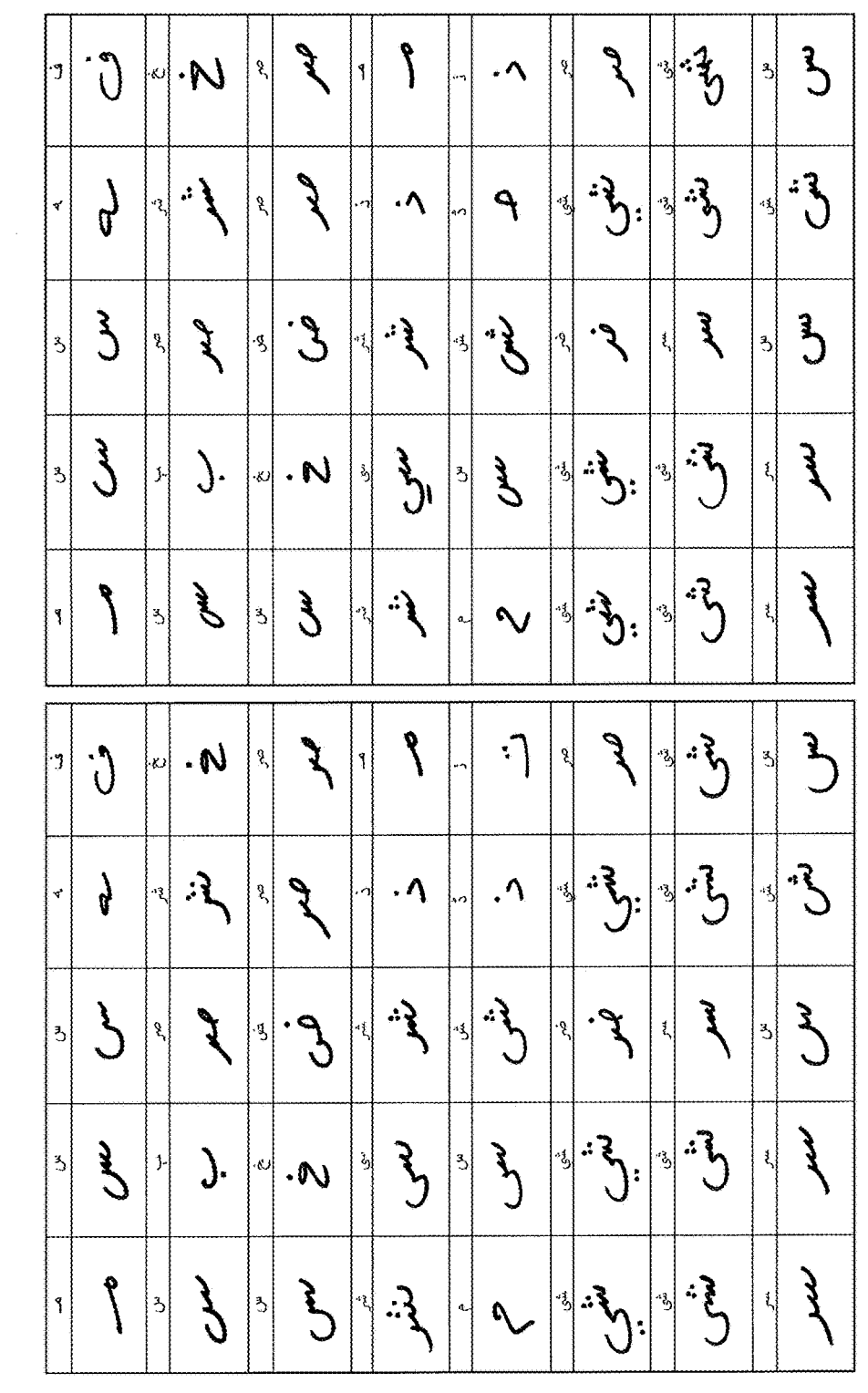

The forms of the ligative dataset are designed to accommodate 40 words/PAWs in single-paged grids like the ones shown in FIG. 23. For example, these are two samples of the ligative forms illustrated in FIG. 21. In one example they only intend to show how different writers' forms collectively cover character combinations although each writer alone only covers the dotless model. Each form covers ligatives under the combined reduction-model. Collectively, twelve distinct forms were needed to cover the 2-Shapes model. This is achieved by making forms that contain the different dot-less representatives of each ligature, as shown in Table 17, as illustrated by FIG. 80. In FIG. 80, Table 17 further shows ligatives per form wherein arch form contains approximately 120 character-shapes. The last three columns of the table contain some unligative patterns for other objectives.

TABLE 18

Units and coverage criteria and designs of the different forms of the dataset.

| Parts | Covering Units | Covered Unit Model | Coverer | Frequency of the covered unit | FIG. Number |
|---|---|---|---|---|---|
| Unligative text (UT) | Paragraphs | all character-shapes | form | Uniform (1 per form) | FIG. 20 (Top) |
| Isolated characters (IL) | Isolated Characters | | | | FIG. 22 (Left-Top) |
| Passages | Paragraphs | all character-shapes | dataset | Natural per dataset | FIG. 20 (bottom) |
| Ligatures | Isolated ligatures and words | dot-less, 1-shape 1-shape ligatures | form 12 forms | Uniform (almost 1 per form) Uniform (less than 1 per form) | FIG. 21 |

TABLE 18-continued

Units and coverage criteria and designs
of the different forms of the dataset.

| Parts | Covering Units | Covered Unit Model | Coverer | Frequency of the covered unit | FIG. Number |
|---|---|---|---|---|---|
| Repeated phrases | Words and sentences | Selected words/ sentences | form | Uniform (more than one per form) | FIG. 22 |

Data Preparation

Pages of the dataset forms are scanned at a resolution of 300 dpi. The scanned images undergo preprocessing steps.

Form-Page Deskew and Classification

To ease skew detection and correction (deskew) and to ease page classification of the forms pages, three aligned black boxes are printed on the corners of each page. The boxes are printed in positions so that if their centers of gravity are connected, a right angle with sides parallel to the original reference coordinates of the page is formed. The skew angle θ, taken between the current, say x-axis and the corresponding original axis can be estimated from the arctangent equation:

$$\tan^{-1}\theta = \frac{y2 - y1}{x2 - x1} \quad (3.5)$$

where (x1, y1) and (x2, y2) are the centers of gravity of the two boxes on the short side of the scanned image. Deskew is done by rotating the image in the direction of −θ.

The black boxes of the pages are automatically recognized by conditioning the area—and aspect ratio—(height/width) features of all foreground objects against pre-set thresholds. Box positions help in classifying a page into one of the 4 pages a form can have. Each page category has the head of the right angle formed by the three black boxes at a different corner of the page.

Block of Handwriting Extraction and File Naming

The extraction of blocks of handwriting (BoHs) from form pages is eased by providing boxes for the printed text and for the handwriting. For all except Page 3 of the forms, the boxes were printed on the front of the form pages. For every third page, the frames were printed on the back side of the page so that its shadow appears when scanning. This was suggested to avoid constraining writers with boxes. By knowledge of the page structure, specialized tools to extract BoHs are implemented.

Figure 24:
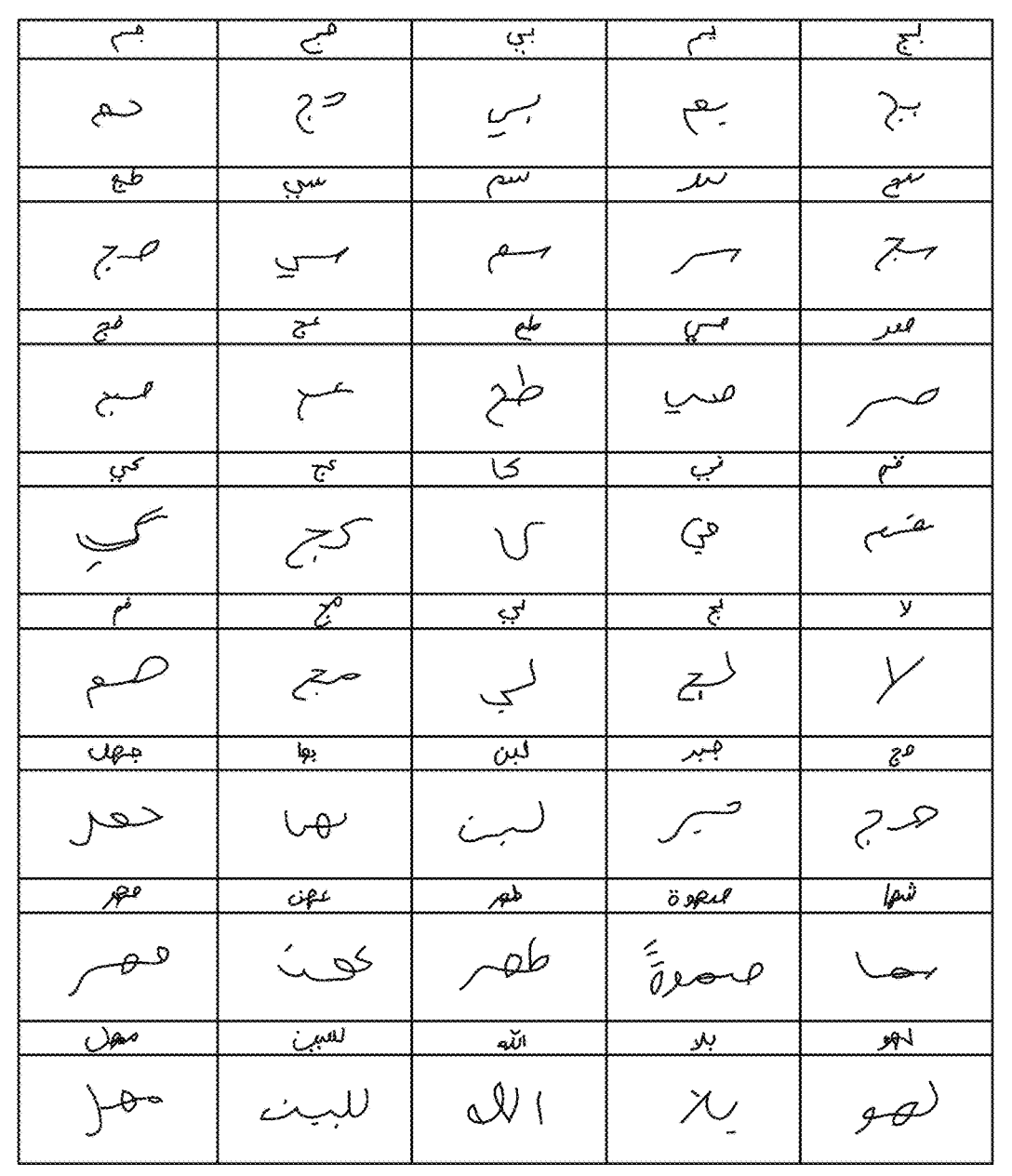

For example the ligatures part has a grid that can be recognized as the biggest foreground object in terms of height and width FIG. 24. Borders of each box in the grid are defined by high horizontal and vertical profile values (detailed next chapter). Vertically, printed and handwritten texts appear alternating in every column. Column, row and form numbers are used to identify the correspondent GT of each handwritten ligature to provide adequate naming.

Segmentation and Ground-Truthing

The blocks of handwriting (BoHs) extracted from the Unligative Text (UT) part of the dataset (PoD) need to be segmented into character-shapes and aligned with the corresponding ground-truth (GT). The segmentation and alignment process is often called ground-truthing (GTing). GTing is usually a semi-automatic process. Pixel-level GTs assign a distinct label to all pixels that contribute to a unit in the image. This is not to be confused with character-level GTs, where the image and the corresponding text are provided without character-shape-distinction in the image.

The ultimate level of text ground-truthing is the character level. Character-level ground-truths associate a distinct label to the pixels that correspond to a character in a document image. They provide a powerful resource for the development of character segmentation and recognition systems. However, character-level ground-truths are scarce, mainly because of the human efforts and time required to generate them. The dataset of the University of Washington, UW-III, for example, has 979 document images with known text, but only 33 of them contain character-level ground-truths.

Character-level ground-truths and character segmentation algorithms engage in a "chicken and egg" relationship. If characters were segmented, obtaining automatic ground-truths would have become an easier task, and if character-level ground-truths were available, the evaluation of character segmentation algorithms would have been easy. One way to break this recursion is by human intervention. Fortunately, most writing occurs with some spatial and temporal sequence and Arabic is not an exception. Hence, character-level ground-truthing can be performed by only identifying the borders of each character. Semi-automatic tools that determine such borders can be deployed to ease the task.

Figure 25:
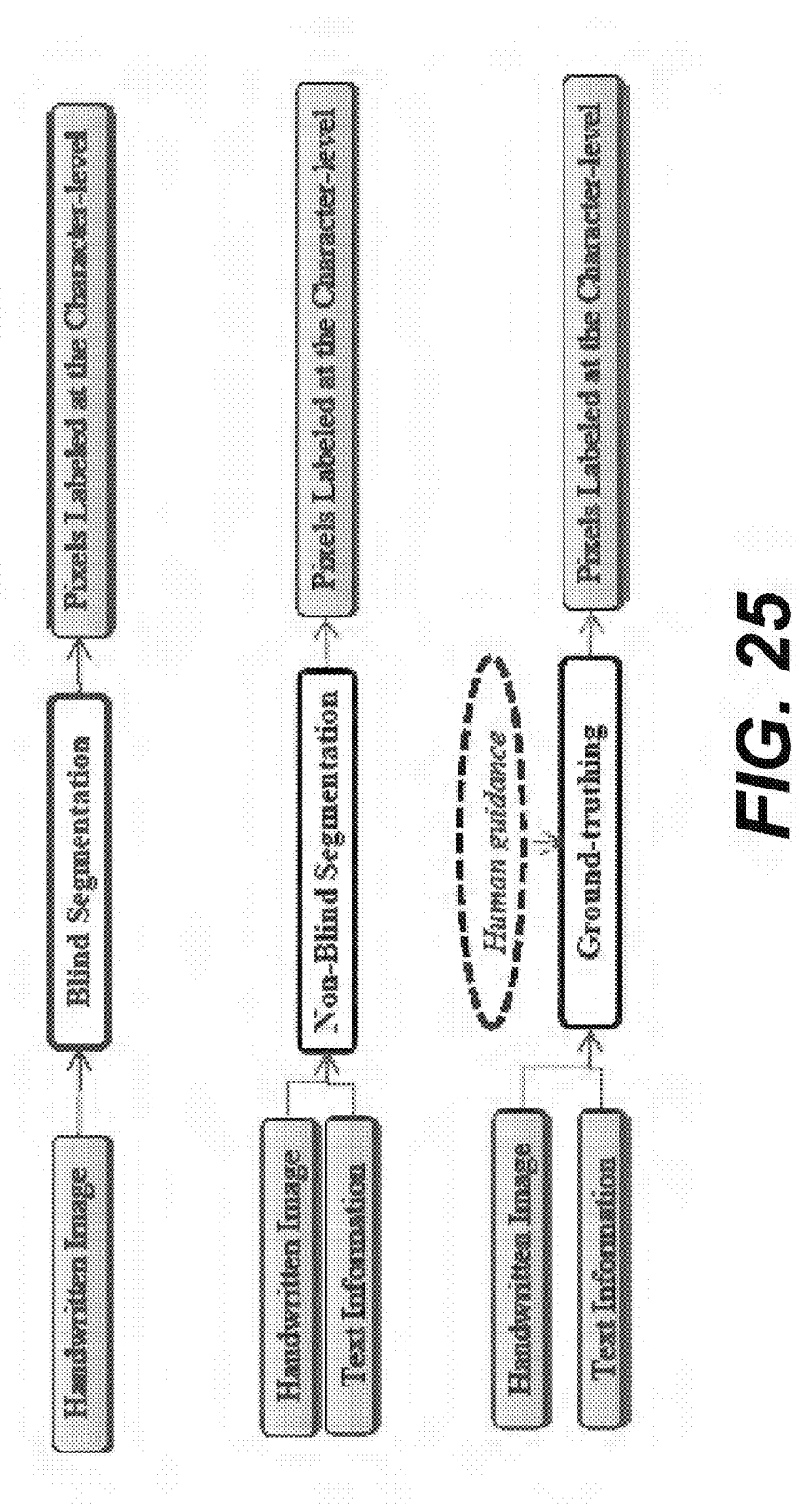
FIG. 25 illustrates block diagrams of blind segmentation, non-blind segmentation, and ground truthing methods according to an exemplary embodiment.

Hereafter, the term segmentation is reserved to indicate the automatic labeling of characters in handwriting and the term ground-truthing to their human-guided labeling. Segmentation can be performed either blindly or non-blindly. Blind segmentation relies solely on information from an image to label text components. Non-blind segmentation, also known as text-alignment, exploits information about the corresponding text. FIG. 25 shows the block diagrams for ground-truthing, blind-segmentation, and non-blind segmentation.

Figure 26:
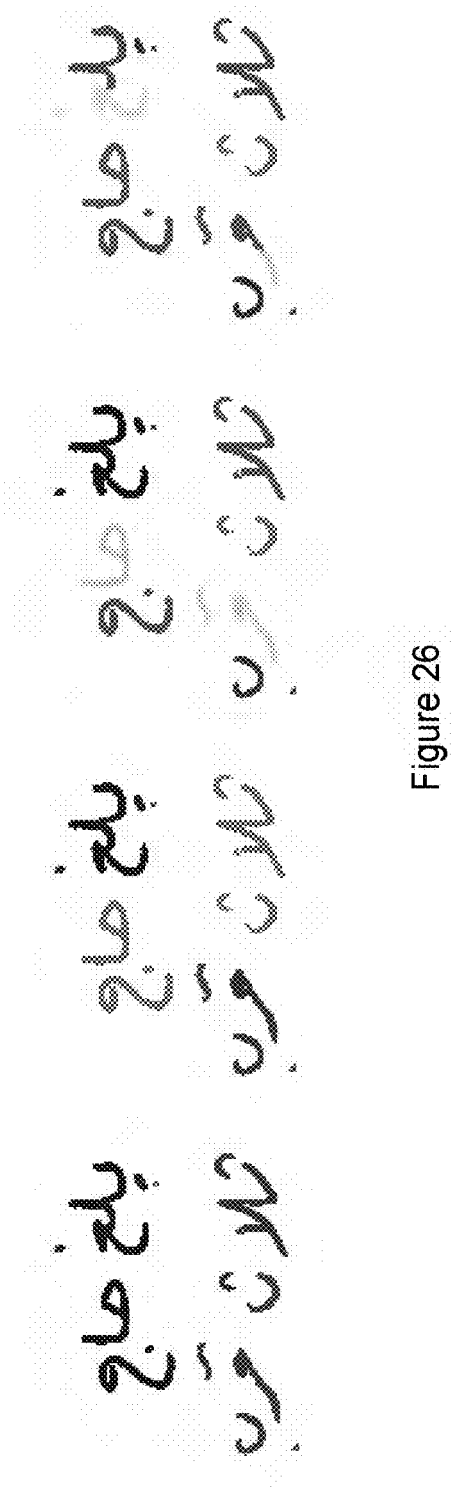
FIG. 26 illustrates ground truths at a text line level, a word line level, a PAW level and a character level, shown from left to right; according to an exemplary embodiment.

In one example, different approaches to GT, segment and align the UT PoD are presented. Initially, GTing for the following twofold benefits: GTs can be used in segmentation evaluation; and they provide clean inputs to synthesis algorithms to prevent error propagation. Furthermore, reporting line segmentation and intents to blindly segment lines into character-shapes. Since lines are not aligned with GT, non-blind segmentation is not a choice. GTed words are used to make a word-dataset from the current UT PoD and apply non-blind segmentation and alignment algorithms on it. Additionally, a new entropy-based evaluation method for Arabic segmentation from words to PAWs and to character-shapes is introduced. FIG. 26 shows Arabic samples from the UT PoD ground-truthed at the levels of text-lines words, pieces of Arabic word (PAW) and characters.

Arabic character segmentation is an open research problem; especially that Arabic script is inherently cursive and that PAWs may vertically overlap. Lack of character-level benchmarks and objective evaluation methods are among the most important causes for the tardiness of the solution to the character segmentation problem in Arabic. In this example, automatic and semi-automatic character-level ground-truthing for Arabic characters is introduced. Furthermore, a quantitative evaluation method for Arabic handwriting segmentation is utilized.

Preprocessing and Common Tools

The BoHs extracted from the UT PoD undergo some conventional conversions from colored space to binary space passing through the gray-level space. Connected components (aka blobs) and projections of the binary images are then prepared to be used in later stages. Blobs that are smaller than pre-specified height and width thresholds are filtered out as noise. Deskew is performed on the extracted BoHs and then repeated on single lines.

Projections

An image projection, or profile, maps the 2-D space of a binary image into a numerical vector. The vertical projection (VP) assigns the number of foreground-colored pixels of a column to an entry in the output vector that corresponds to that column. Similarly, the horizontal projection (HP) generates a vector of the same size of the image height where each entry contains the count of foreground-colored pixels of the row that they correspond to. Some of the algorithms rely on vertical and horizontal projections; however, other examples, such as smoothed versions of the projection profiles may further be used.

The smoothed projection assigns the average number of foreground-colored pixels in m consecutive columns/rows to the output entry corresponding to their centers. At the image borders, zero-padding is assumed. Equations (4.1) and (4.2) represent the smoothed vertical and horizontal projections, respectively.

$$VP^m[c] = \sum_{cols=c-\lfloor\frac{m}{2}\rfloor}^{c+\lfloor\frac{m}{2}\rfloor} \sum_{r=1}^{img\,height} img(r, cols)/m \quad (4.1)$$

$$HP^m[r] = \sum_{rows=r-\lfloor\frac{m}{2}\rfloor}^{r+\lfloor\frac{m}{2}\rfloor} \sum_{c=1}^{img\,width} img(rows, c)/m \quad (4.2)$$

where img(x,y) denotes the value of a pixel at Row x and Column y, which is 1 if it has the foreground color and 0 otherwise, and $\lfloor\ \rfloor$ denotes the truncation operation.

For simplicity, the smoothed vertical and horizontal projections are hereafter referred to as VP and HP, respectively, whenever m, c and r do not need to be specified.

Block of Handwriting Deskew

Block of handwriting deskew simplifies line segmentation. BoH deskew aims at maximizing the sum of the squares of the horizontal projection values (HP) of the BoH. It empirically tries a set of angles around zero and selects the HP-maximizing one. Algorithm Deskew is a classical algorithm described in and outlined in FIG. 27.

Figures 28A, 28B:
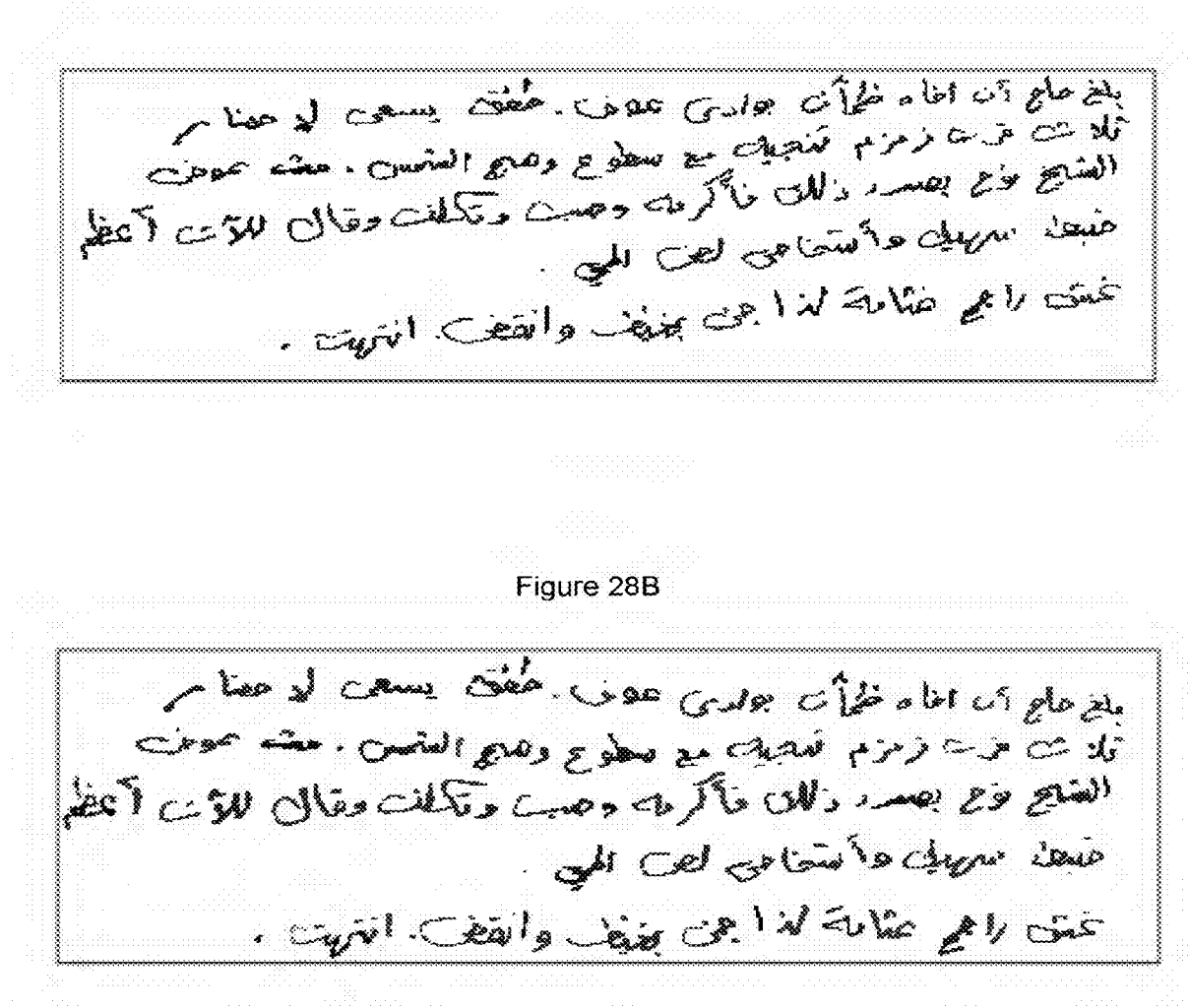

The algorithm favors lengthy horizontal text-lines over shorter ones due to the squaring operation. This is adequate to the Arabic script where the abundance of horizontal Kashida is ideally high. Skew correction rotates the image line with accordance to the chosen angle. FIG. 28 shows a paragraph before (FIG. 28A) and after block skew correction (FIG. 28B). Visual inspection revealed no failures when the range was defined from −5° to 5° with a step of 0.1°.

Baseline Estimation

The term baseline (BL) is used here to refer to the range of rows containing the row with the highest foreground pixel count and all its neighbor rows with pixel counts above a fraction, factor, of the maximum pixel count. BL is usually computed on a word or chunk of words in a single line. The chunks should neither be too short nor too long. FIG. 29A shows an example of BL miss-estimation in a chunk that is of 3 character-shapes only. The BL range surrounds the descendent of a character-shape that happens to exceed in HP the Kashida level. This would be less likely if the text had contained a representative amount of character-shapes.

FIG. 29B shows a case where BLs on chunks would be more accurate than a unified BL, due to a wavy writing style over and under the estimated BL.

Two baseline-range estimation algorithms are presented: the Single Baseline-Range Estimation algorithm (SBRE) that estimates a single baseline-range for a text-line image and the Multiple Baseline-Range Estimation algorithm (MBRE) that estimates localized baseline-ranges. SBRE is simpler and needs fewer inputs while MBRE is more complex but adequate for wavy long text-lines.

The SBRE algorithm, listed in FIG. 30, assigns as a baseline-range the maximal set of contiguous rows containing the row with maximum HP but no rows with HP values less than a specified factor of it.

The MBRE algorithm, listed in FIG. 31, assigns a baseline-range to different segments. Text-line segments are horizontal partitions of the text-line image. MBRE defines them as maximal contiguous parts of the text-line image where VP is greater than or equal to a certain threshold. Segments that are above-average in width are assigned their baseline-ranges via SBRE. Narrower segments are assigned interpolated values according to the nearest right and left segments with assigned ranges. The interpolated to ranges may differ according to their order of computation; which is computed from right to left.

Figure 32A:
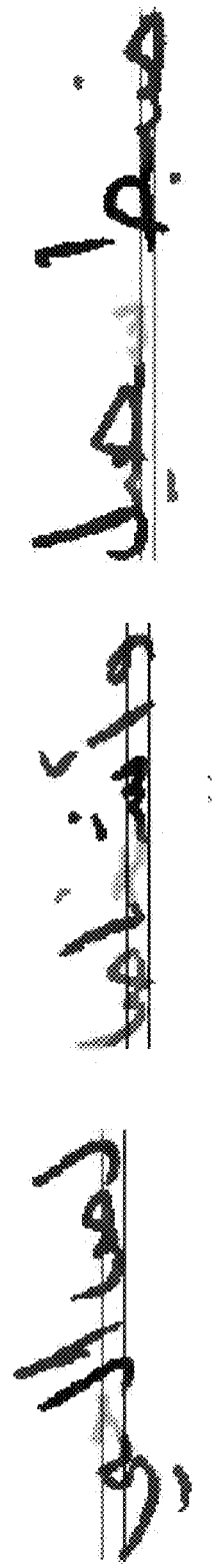
FIGS. 32A-32B illustrate chunks of words for non-blind and blind baseline estimation according to an exemplary embodiment.
Figure 32B:

BL estimation can be made more accurate if local estimations are done on chunks of lines with tuned lengths. In one example, BL-estimation on chunks of words containing 5 or more characters taken from GTed data is examined, like the ones in FIG. 32A. In the absence of GT data, chunks are chosen with aid of VP. FIG. 32B shows vertical lines whenever the VP grows above (start preliminary chunk) or drops below (end preliminary chunk) a pre-specified threshold. Widths between starts and ends of preliminary chunks are averaged and chunks larger than a factor of the average are chosen for SBRE. BL for chunks that are not chosen in the previous step are interpolated from BLs of their neighbors. The computed BLs are shown for different line-chunks with the lighter pairs of horizontal lines in FIG. 32B and the interpolated ones are shown with darker pairs.

Figure 81:
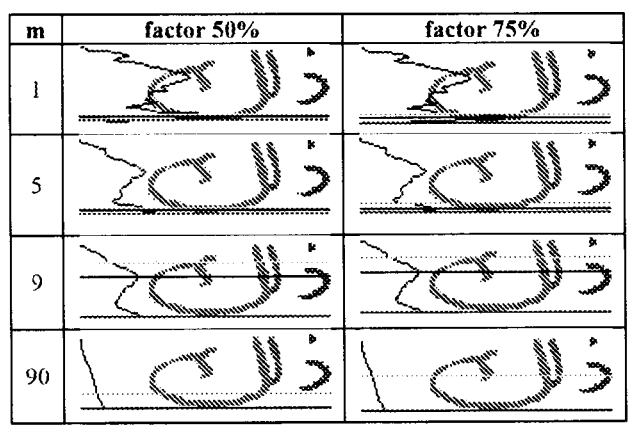
FIG. 81 illustrates Table 20, containing a word with HP and upper and lower baseline borders for different m and factor values.

All thresholds that were introduced in the algorithms of this section, along with the range of values that they may take, are reported in Table 19. The impact of m and factor for different values are pictorially displayed in Table 20, as illustrated by FIG. 81, along with the upper and lower baseline borders and the peak of HP. The that factor affects the thickness of the range of the baseline.

TABLE 19

Threshold description and values used in baseline estimation.

| Threshold | Algorithm | Description |
|---|---|---|
| M | VP, HP | Smoothing factor for VP and HP |
| Cut | MBRE | Maximum number of pixels considered as a white cut in VP |
| threshold | MBRE | Factor to adjust the threshold on computable vs. interpolation text-line segments when compared with the average width of all segments |
| factor | MBRE, SBRE | Percentage of the maximum of HP not breaking the baseline zone |

Ground-Truthing and Analysis on the Pixel-Level

The scanned paragraph images are semi-automatically ground-truthed in two levels: the text-line level, and the character level. Words and PAWs can be obtained by the automatic reassembly of ground-truthed characters based on the underlying text.

Line-Level Ground-Truthing

Figure 33:
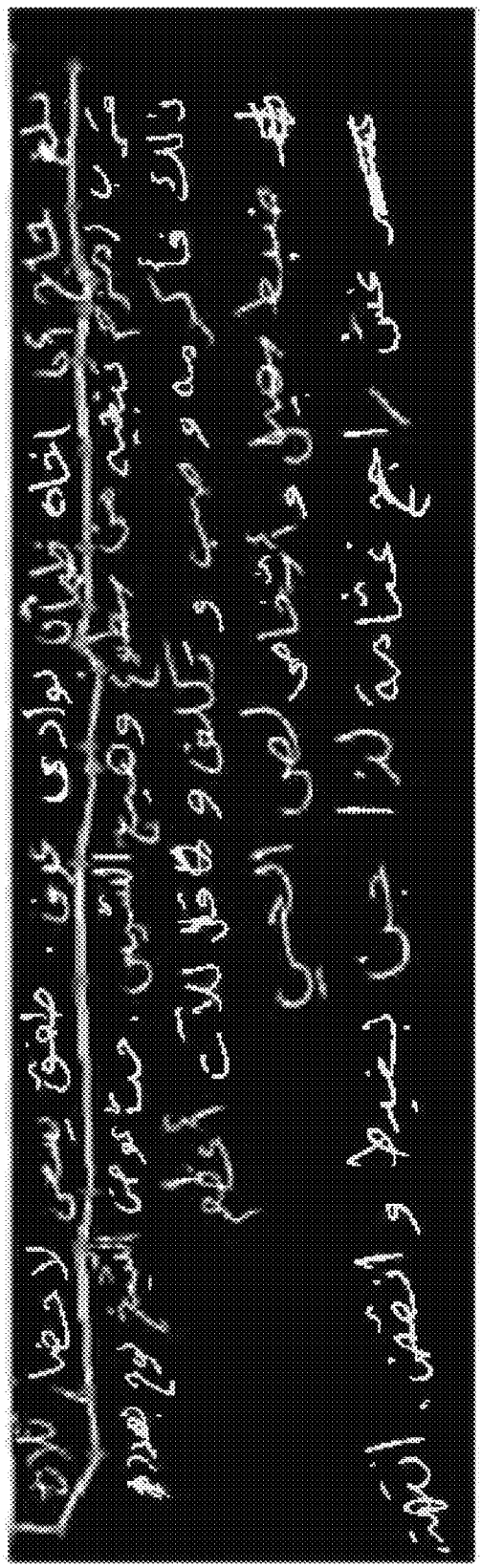
FIG. 33 illustrates a snapshot of the textline ground truthing tool with some control points shown according to an exemplary embodiment.

Line-level ground-truthing is performed by means of the semi-automatic tool with the interface shown in FIG. 33. Native Arab users were asked to set/edit vertex points for a polygon that surrounds only the components of the topmost text-line displayed in the interface. Upon closing the polygon, all surrounded pixels are cropped to a separate text-line image and the user is allowed to request the next samples.

Character-Level Ground-Truthing

Figure 34:
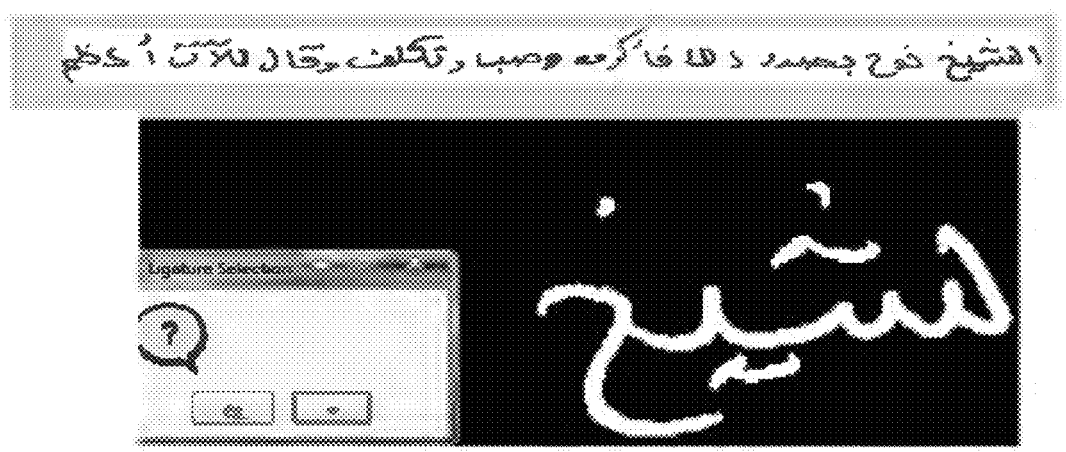
FIG. 34 illustrates a snapshot of the character ground truthing tool with confirmation request on a ligature according to an exemplary embodiment.

The GUI tool, shown in FIG. 34, aims at character-level ground-truthing with confirmation request on a ligature according to an exemplary embodiment. The tool sequentially displays segments of text-lines, as defined by the VP in the MBRE algorithm, and allows the user to surround characters and ligatures with polygons. Upon closing a polygon, the enclosed pixels are labeled with a sequential number. Users are expected to choose characters in strict right-to-left order. The tool also shows the complete text-line on top of the display area to help removing ambiguities. In addition, it allows merging segments if the user demands it. In one example, a program may be implemented that would recognize main glyphs from secondary dots and diacritics and display what it recognizes as main glyphs from right to left, one at a time, along with all the overlapping and near secondary parts.

Foreground pixels are labeled in the output image based on the order of their selection. Foreground pixels that are left out the polygons are labeled as Kashida. Ligatures need special treatment: By knowing the positions of the possible omni-ligatives in the corresponding text and by keeping track of the number of labeled characters per paragraph image instance, the tool requests the user to indicate whether some polygons corresponds to a single character or to a ligature of two characters, as shown in FIG. 34.

Words, Pieces of Words, and Extended Character-Shapes Reassembly

Figure 35:
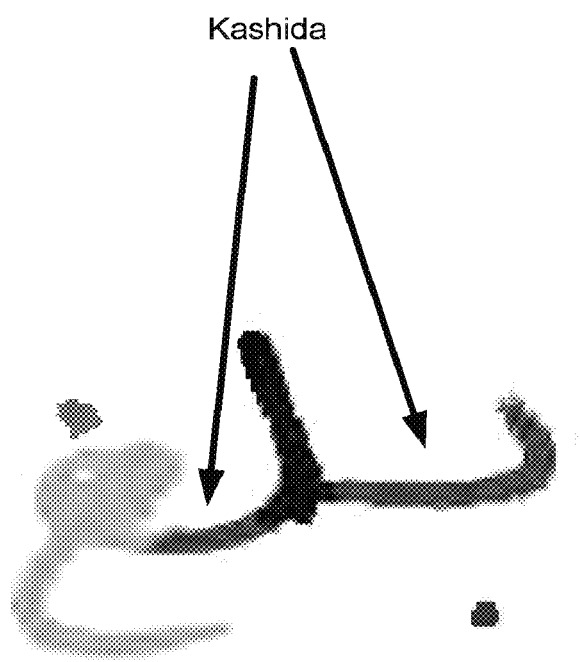
FIG. 35 illustrates a GTed word with contrasting parts representing different labels according to an exemplary embodiment.

A word-reassembly tool is developed that copies the characters of words together into separate images. This enables reporting of results on isolated words assuming they are somehow obtained from the dataset. Word images have an advantage in limiting error-propagation. However, they can be negatively affected by their short widths when it comes to baseline-range estimation and localized deskew. FIG. 35 shows a GTed and re-assembled word with Kashida.

GTed data is expensive and scarce. A total of 103 BoHs of UT PoD forms were GTed. Manual and automatic inspection filtered out mistakenly written or GTed data to remain with 54 acceptable BoHs for this work. From the discarded BoHs, 17 at least can be repaired with reasonable programming intervention. Appendix A shows statistics that can be extracted from GTed data.

Extended character-shapes are automatically assembled from labeled character-shapes by taking Kashidas which are touching to them. FIG. 36 shows an example for reassembling a word and its corresponding extended character-shapes.

Ground-truthing needs human intervention, and hence is not fully automatic. To automate writing units labeling, different segmentation algorithms are discussed and evaluated in the following sections.

Blind Line Segmentation

Arabic is written in horizontal text-lines that are stacked downwards. A line either ends by a semantic stop or by reaching near the left border of the page; hence, text-lines may vary in length. Line segmentation aims at grouping pixels that belong to a line together. Line segmentation is important mainly because errors in it propagate to subsequent steps. This section presents and discusses a line segmentation algorithm for Arabic.

Line Segmentation Algorithm an Adaptive Line Segmentation Algorithm for Arabic (ALSA) is presented. ALSA, listed in FIG. 37, is used to obtain lines from BoHs of the UT PoD.

A local minimum on $HP^m\{r\}$ refers to a row with less or equal number of foreground pixels than both of its neighbors. The average of local minima, LTh, is used as a heuristic threshold that defines what a valley is. A valley is a maximal chunk of $HP^m\{r\}$ where values are less than or equal to LTh. Valleys narrower than half of the average valley width are merged with their nearest neighboring valleys.

Figure 38A:
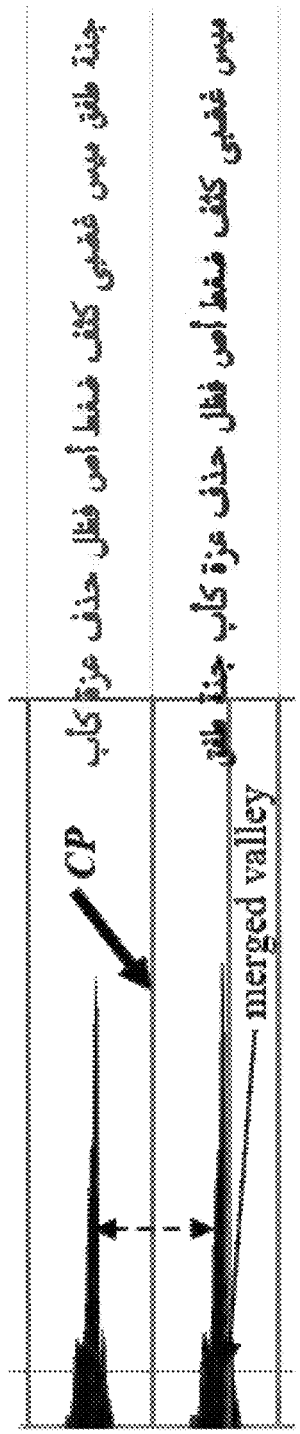
FIGS. 38A-38B illustrate a CP and merged valley and local minima in HP1 and LTh according to an exemplary embodiment.
Figure 38B:
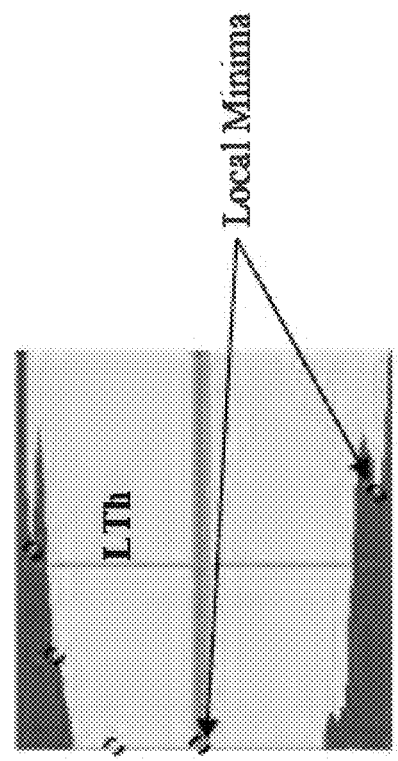

The usage of LTh instead of a fixed threshold secures not dropping below the global minimum of any horizontal projection. Its disadvantage is that it is affected by the fluctuations of $HP^m\{r\}$, not only on its values. This disadvantage can be reduced by using larger smoothing factors. Within a valley, the row with minimum $HP^m\{r\}$ is declared as a cut point CP. In case of a tie, the center of the longest run of contiguous CPs is taken as the CP of the valley, as in FIG. 38A, which represents a CP and merged valley and 38B which represents local minima in HP1 and LTh. In one example, the local minima is determined by examining the local minima at every point belonging to the HP with no smaller y-value separating it from the nearest points (distance taken on the x-axis only) of higher x-values. In the case of a continuous minima points with the same y-value, only the mid-positioned minima, on the x-axis, is chosen to represent the continuum. If the separating HP value between consecutive local minima is less than a given threshold, the valleys containing these minima are merged.

Finally, each connected component in the input image is mapped to a line based on the y-coordinate of its center of gravity (COG). If the coordinates fall between two CPs, i.e. in a valley, the corresponding connected component is assigned a distinct label of that valley. This approach avoids cutting connected components among lines.

Line Segmentation Evaluation

Line segmentation was subjectively evaluated on 100 document images distributed among three categories: printed (provided by), modern handwritten, and historical manuscripts from. Twenty images from each of the following groups are evaluated: Printed Naskh font, printed Akhbar font, printed Thuluth font, modern handwriting, and historical manuscripts.

FIG. 39 shows some results of ALSA on printed, handwritten and historical scripts. The results are displayed in FIGS. 39A-39C illustrate how ALSA works on three kinds of Arabic lines: printed, handwritten and historical manuscripts such that components that belong to a line take a color from the repetitive set red, blue and green. $HP^1$ is displayed to the left of each output image. FIG. 39A illustrates printed output samples, FIG. 39B illustrates handwritten output samples, and FIG. 39C illustrates historical manuscript ALSA algorithm. In one example, the thresholds for vallies are computed adaptively on each sample of the printed, handwritten and historical manuscript datasets.

Output images are subjectively ranked on a scale from 1 to 5, where 1 refers to results without errors and 5 to severely merged or divided lines. The rankings, along with the expected value of the ranking of a category of input pages, are shown in Table 21.

TABLE 21

Subjective ranks of the output images of ALSA along with the expected rank per input category.

| Rank | 1 | 2 | 3 | 4 | 5 | Average Rank |
|---|---|---|---|---|---|---|
| Printed Naskh font | 20 | — | — | — | — | 1 |
| Printed Akhbar font | 70 | — | — | — | — | 1 |
| Printed Thuluth font | 19 | 1 | — | — | — | 1.05 |
| Modern Handwriting | 12 | 7 | 1 | — | — | 1.45 |
| Historical Manuscripts | 5 | 10 | 2 | 1 | 2 | 2.25 |

Figure 40A:
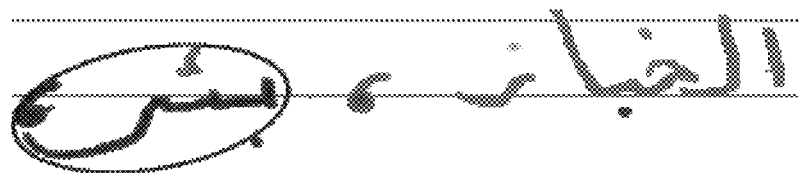
FIGS. 40A-40D illustrate error sources such as skew, short lines, touching components and margin writing according to an exemplary embodiment.
Figure 40B:
Figure 40C:
Figure 40D:
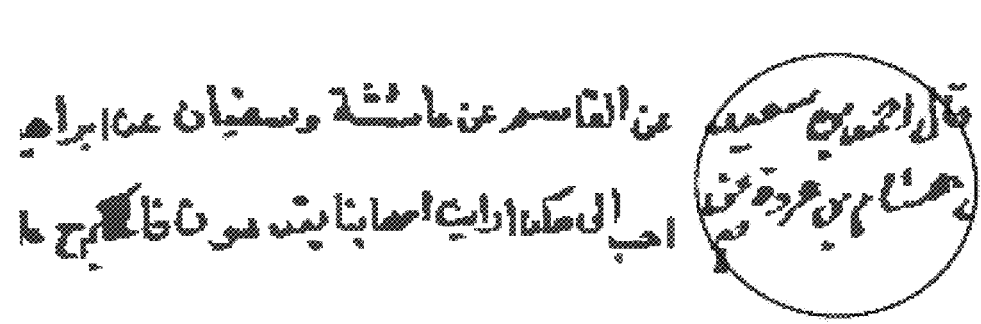

Most errors consist of dots and diacritics miss-line-classification as illustrated in FIGS. 40A and 40B. Line segmentation mainly fails with skew, whether caused while writing or while scanning. Inter-line touching components, as in FIG. 40C are quite abundant in manuscripts. Similarly, margin writing, as encircled in FIGS. 40A, 40B, 40C and, may cause confusion to ALSA. Short lines may constitute a source of errors if not identified, or if not containing enough ascender and descender components to cover their range properly, as in the example of FIG. 40B.

Figure 41:
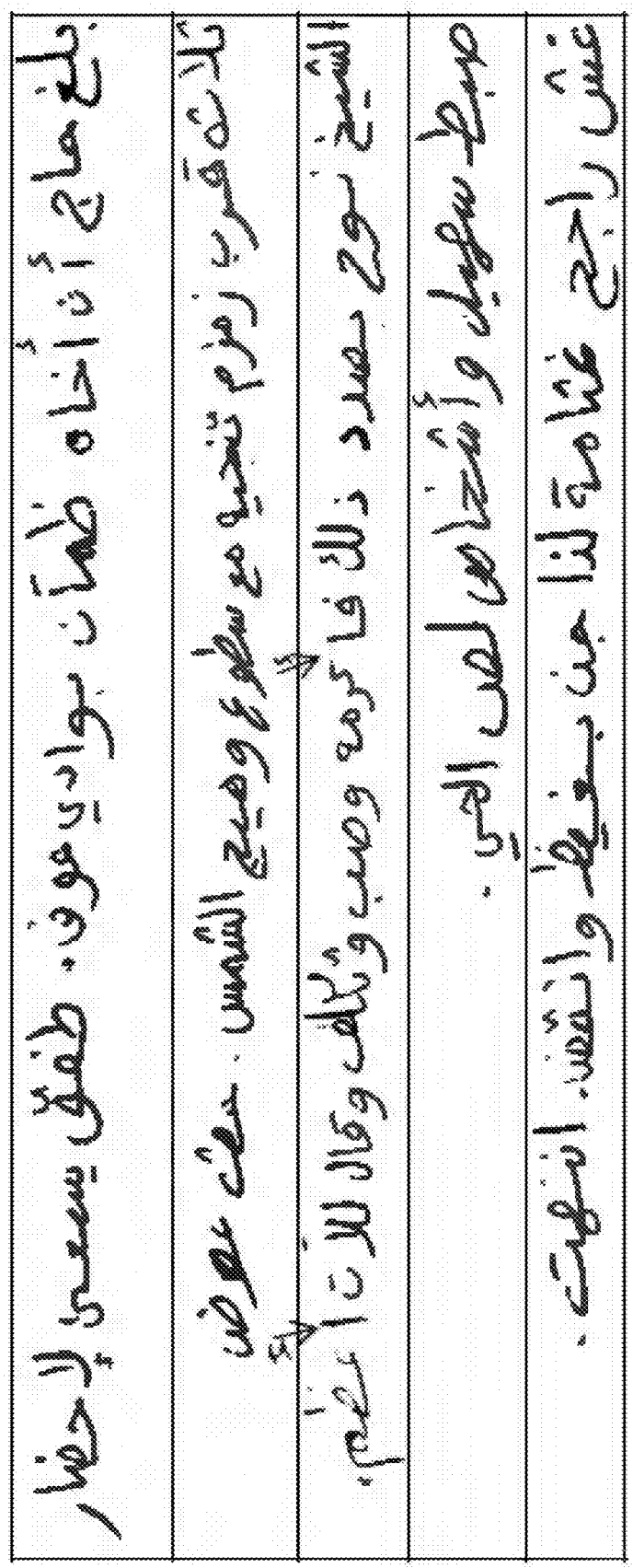
FIG. 41 illustrates output samples from ALSA on the Unified Text part of one writer according to an exemplary embodiment.

FIG. 41 shows some ALSA outputs on the UT PoD of one form. Errors in line character-shape and blind segmentation are avoided if a word-dataset is used instead of a paragraph. Two arrows point erroneously assigned components to their original lines.

Blind Character-Shape Segmentation

Lines need to be segmented into character-shapes. A line can be too lengthy to be restricted to match a GT none-blindly. Hence, a blind character-shape segmentation algorithm is presented for line-to-characters segmentation.

Blind Character-Shape Segmentation Algorithm

Figure 42:
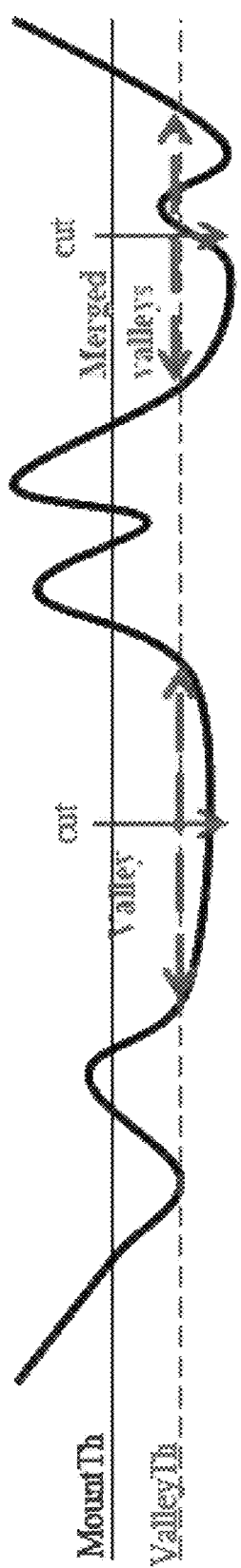
FIG. 42 illustrates a sketch depicting the concept of valleys according to an exemplary embodiment.

The Blind Character-Shape segmentation algorithm dissects an image based on valleys in the VP, in an analogous way to how ALSA dissects paragraphs into lines, but in the vertical direction and with a few other differences. For example, the definition of a valley in Blind Character-Shape segmentation depends on two thresholds: MountTh and ValleyTh. A valley is a maximal chunk with VP values less than MountTh bordered by values that are also less than ValleyTh. FIG. 42 illustrates the concept graphically to depict valleys.

The use of two thresholds for the definition of a valley reduces the possibility of fluctuations near the threshold level. The two thresholds can reduce turbulences (hysteresis) based on their amplitudes while the smoothing factor reduces turbulences based on their frequencies to obtain blind word segmentation. FIG. 43 presents Blind Character-Shape segmentation algorithmically.

Step 3 defines a single cut between each two segmented character-shapes. Alternatively, the starts and ends of valleys can be used in a way similar to that of chunking words, as was shown in FIG. 32B. Single cuts are adequate to the Extended Glyphs Concatenation model while valley starts and ends are more adequate to the Synthetic Kashida Concatenation model.

Smoothing, with factor m as defined in Table 21, reduces turbulences based on their frequency while Schmitt triggers reduce them based on their amplitudes. MountTh and ValleyTh are made dependent on stroke-widths. Stroke-width is computed as the average BL ranges per BL-computed column. Stroke-width is multiplied by two fixed factors to get MountTh and ValleyTh. Furthermore, two fixed thresholds may still be needed, each writer can have a pair of MountTh and ValleyTh thresholds which are adaptive to his stroke width.

Character-Shape Blind Segmentation Evaluation

A blind character segmentation is applied to the original, as well as four variations of, the dataset images. The alterations include: baseline-range and/or dots removal and increased smoothing. Baseline-range removal deletes all pixels within the baseline-range, as assigned by the SBRE or the MBRE algorithms. One rationale behind baseline-range removal is that it enhances differentiating single-stroke characters from Kashida by emphasizing the role of their positions with respect to baseline region. For example, the "ذ" character consists of a descending stroke that resembles a Kashida in the VP. However, if the baseline-range is deleted, such descender would remain unlike typical Kashida that would be removed.

The VP of similar characters may vary because of the different positions of dots on them. This makes it difficult to calibrate the algorithm thresholds. Dots may cause over-segmentation when they result in VP crossing MountTh within a character. They may cause under-segmentation if they prevent a Kashida from going below the valley threshold. Hence, removing dots, and other small connected components, becomes beneficial. Connected components are removed based on area, width, and height thresholds.

A sample of the results along with the ground-truthed version is shown in FIGS. 44A-44B. Segmentation points for characters are shown with limited vertical text-lines for each altered version of the text. Word segmentation points are shown with text-lines that prolong from the top till the bottom of the image.

The range of possible results from character-shape Blind Segmentation depends on: MountTh, ValleyTh, the four BL estimation thresholds displayed in Table 21, and the deletions made to input line. No exhaustive optimizations were made to these thresholds in this work.

Blind segmentation for Arabic handwriting may have issues. The projection approach, for example, assumes that white spaces between words are generally wider than those between pieces of Arabic words (PAWs). This assumption may not always hold for handwriting. Moreover, white spaces may not show in vertical projection because of inter-PAW overlap.

Figure 45:
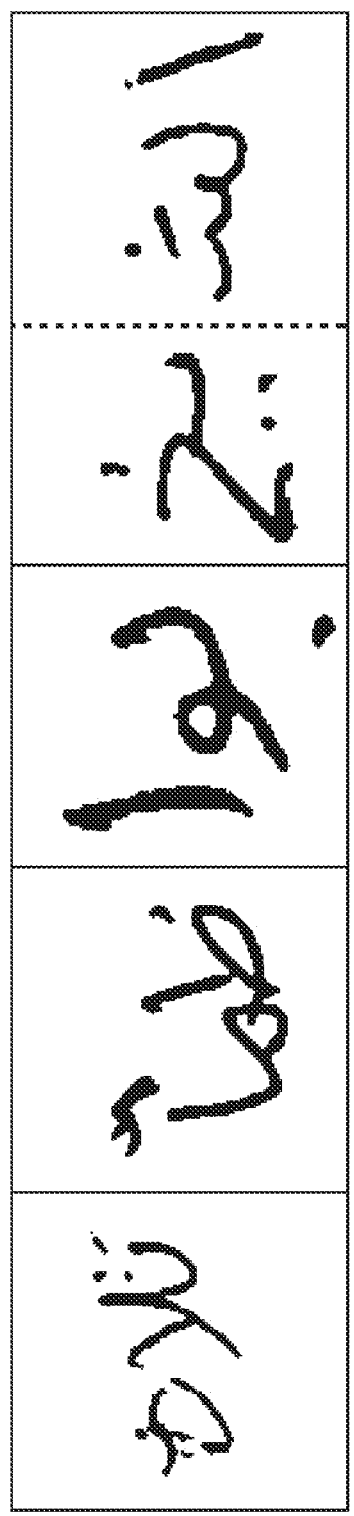
FIG. 45 illustrates sample results from an ALSA run on flipped lines for a word with two PAWs, a single PAW, a proper set of PAWs, and a word with one of its PAWs cut by salt noise according to an exemplary embodiment.

Secondary components and pepper noise may also bridge the vertical projection of the otherwise white Cut regions. On the other hand, it is common to find broken PAWs due to salt noise. FIG. 45 shows results from running ALSA on flipped lines.

An alternative approach that avoids vertical overlap obscuration aims at grouping connected component into PAWs. Main glyphs need to be recognized as PAW glyphs and all corresponding secondary and broken components need to be associated to them. Main glyphs are recognized by three features: position, size and the aspect ratio (height/width).

The position of a main glyph normally touches the range of the BL. Sizes of PAWs are generally expected to be larger than sizes of secondary components. Small PAWs, like single characters, may be smaller in size than some secondary components. In particular, the character "ا" and its Hamza-versions are small characters that tend to be displaced out of (above or below) the BL range. Fortunately, most secondary components can be distinguished from "ا" by the aspect ratio feature and size, probably except for the broken vertical stroke over "ظ" and "ط".

Non-Blind Segmentation

Non-Blind techniques are those that use information of the underlying text to segment images of handwriting, accordingly. Words are segmented in two steps to cope with overlapping PAWs: Word-to-PAWs and PAW-to-Characters.

Words-to-Pieces of Arabic Words Non-Blind Segmentation

Words-to-Pieces of Arabic Words (Word-to-PAWs) segmentation receives word images and their corresponding text and aims at labeling each PAW distinctly. PAW segmentation is important because the overlap between PAWs causes errors in algorithms that intend to dissect words into character-shapes with vertical cuts.

In Words-to-PAWs segmentation, PAWs should include their corresponding dots and diacritics. Therefore, images are first over-segmented into CCs, and then, CCs are regrouped into PAWs. Furtheron the underlying text is used to compute the correct number of PAWs, referred to as correctPAW. The algorithm listed in FIG. 46 intends to identify a number of PAWs equal to correctPAW by classifying and reclassifying connected components into two sets for PAWs, PAWset, and for secondaries, SEC.

Connected components with areas smaller than a threshold "thS", and far from the baseline-range are initially classified into SEC. Others are classified as PAW. The number of elements classified into PAWset can be initially different from correctPAW. It can become larger due to broken characters or because of secondary components being misclassified as PAW. It can be smaller than correctPAW in case of touching characters or baseline-range errors.

If the number of elements in PAWset is less than correctPAW, the baseline-range is gradually expanded till a pre-defined limit is reached. If the number of elements in PAWset remains below correctPAW, even with expansion of baseline-range, then the baseline condition is relaxed under some additional restrictions on size and orientation values where orientation refers to the angle between the x-axis and the major axis of the ellipse that has the same second-moments as the region. It is noticed that small PAWs tend to have more vertical components than similar sized secondaries.

Figure 47:
FIG. 47 illustrates examples of broken PAWs that are corrected according to an exemplary embodiment.

To overcome the effects of broken PAWs, image dilatation is performed, with several structural element dimensions, if necessary. A rectangular structural element is used that favors merging objects vertically rather than horizontally. Iteratively, all connected components may be dilated. A PAW element can be a group of connected components combined when dilated. One drawback of this method is that it can sometimes merge several objects in one iteration; leading the number of elements in PAWset to exceed correctPAW. FIG. 47 shows some examples of broken and corrected PAWs.

Table 22 lists the thresholds used in the Word-to-PAWs segmentation algorithm and their chosen values.

TABLE 22

Thresholds of the Word-to-PAWs segmentation algorithm along with their used values.

| Description | Values |
|---|---|
| Maximum area of a secondary connected component, thS | 65 |
| Maximum orientation of a secondary, thO | 40° |
| Structural Element shape, and dimensions (rows, columns) | Rectangular (30, 16) |
| Baseline thresholds (m, factor) | (9, 0.7) |

Table 23 displays a breakdown of these errors as found in the 2,322 output words. A mistaken result might be reported in more than one category. Touching glyphs are mainly caused by writers using non-standard styles of writing. Most errors (138 errors) were of ground-truthing. Some errors were of the writing or scanning processes. Dots and broken-glyph assignments can be reduced, but not completely eliminated, by the thresholds in the algorithm.

TABLE 23

Words containing errors with frequency counts per error cause.

| Word | Touching glyphs | Secondary assignment | Broken PAW | Total |
|---|---|---|---|---|
| اخاه | | 1 | | 1 |
| الحي | 2 | 3 | | 5 |
| الشمس | 3 | | 2 | 5 |
| الشيخ | 2 | | 3 | 5 |
| انتهت | | 3 | 2 | 5 |
| أعظم | | 1 | 1 | 2 |
| أن | | 2 | | 2 |
| بوادي | 2 | 1 | | 3 |
| ثلاث | | 1 | | 1 |
| حاج | | 2 | | 2 |
| ذلك | | 3 | | 3 |
| راجح | 1 | 2 | 4 | 7 |
| زعم | 2 | 17 | | 19 |
| سطوع | 3 | 1 | | 4 |
| ظمآن | | 1 | | 1 |
| عوض | 2 | | | 2 |
| عوف | 1 | | | 1 |
| فأدرمه | 1 | 9 | | 10 |
| قرب | 1 | 5 | | 6 |
| لذا | | 5 | | 5 |
| للآت | | 5 | | 5 |
| نوح | 1 | | | 1 |
| وانفض | | 7 | | 7 |
| وأشخاص | | 1 | 3 | 4 |
| وتكلف | | 2 | | 2 |
| وصب | 1 | | | 1 |
| وقل | 3 | | | 3 |
| وهيج | 1 | 1 | | 2 |
| Total | 26 | 73 | 15 | 114 |

Pieces of Arabic Words to Character-Shapes Segmentation

Algorithms that segment Pieces of Arabic Words (PAWs) to characters are presented here. PAW-to-Characters segmentation takes some features from the character blind segmentation algorithm and others from the Word-to-PAWs segmentation algorithm. One PAW-to-Characters segmentation algorithm, the Fuzzy Parameters algorithm, listed in FIG. 48, uses statistics on character widths (presented in Appendix A) to integrate fuzzy segmentation. FIG. 48 describes fuzzy parameter algorithm for the estimation of non-blind character segmentation ranges.

Figure 49:
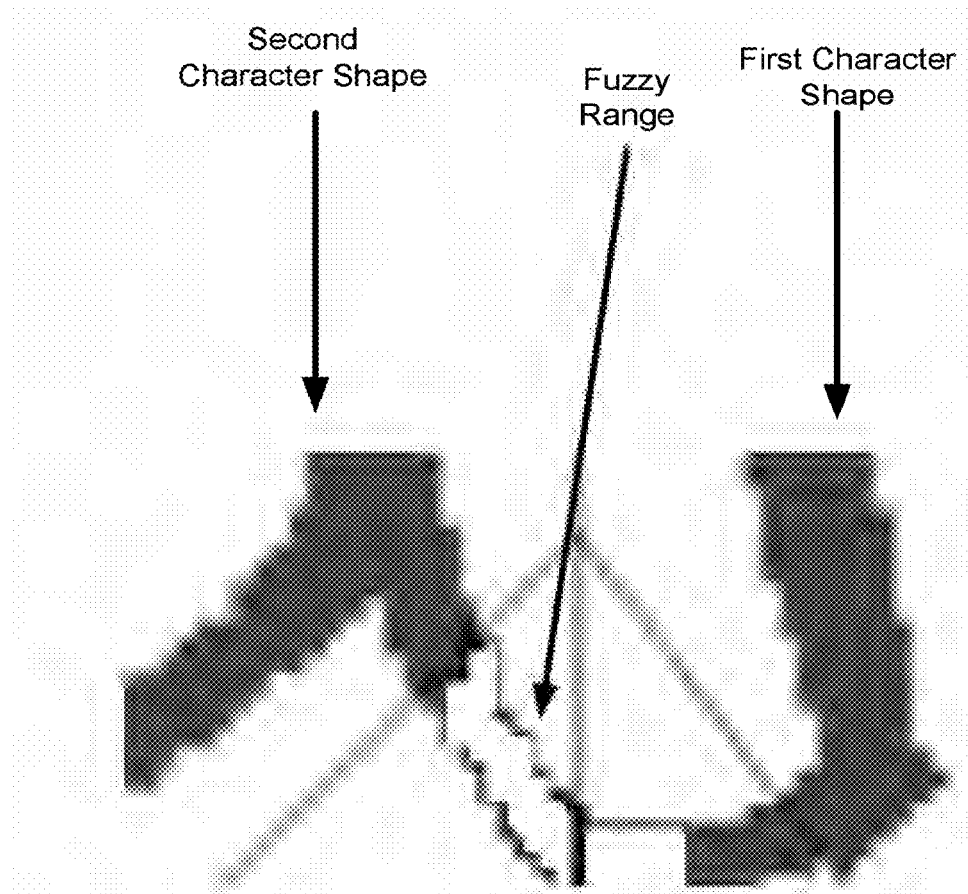
FIG. 49 illustrates Fuzzification of the likelihood of cut-points between two connected characters according to an exemplary embodiment.

Fuzzy Parameters aims at making some points more likely to have cuts solely based on the priori mean and standard deviation statistics of the character-shapes involved in the text. The means help distributing the centers of the cut-points so that their relative positions match the relative values of the respective means. Moreover, the likelihood of a cut at a given position is inversely proportional to the standard deviations of the two neighboring widths. Around each center of cut-point, the likelihood of a cut decreases linearly as a function of the standard deviation of the width of the character to its side. The fuzzy ranges vary proportionally to the standard deviations so that if a character can have a wide range of values, it is given a larger fuzzy range. FIG. 49 shows an example of the fuzzy ranges between two character-shapes, first character shape and second character shape when the attenuation factor, α, equals four.

Figure 51:
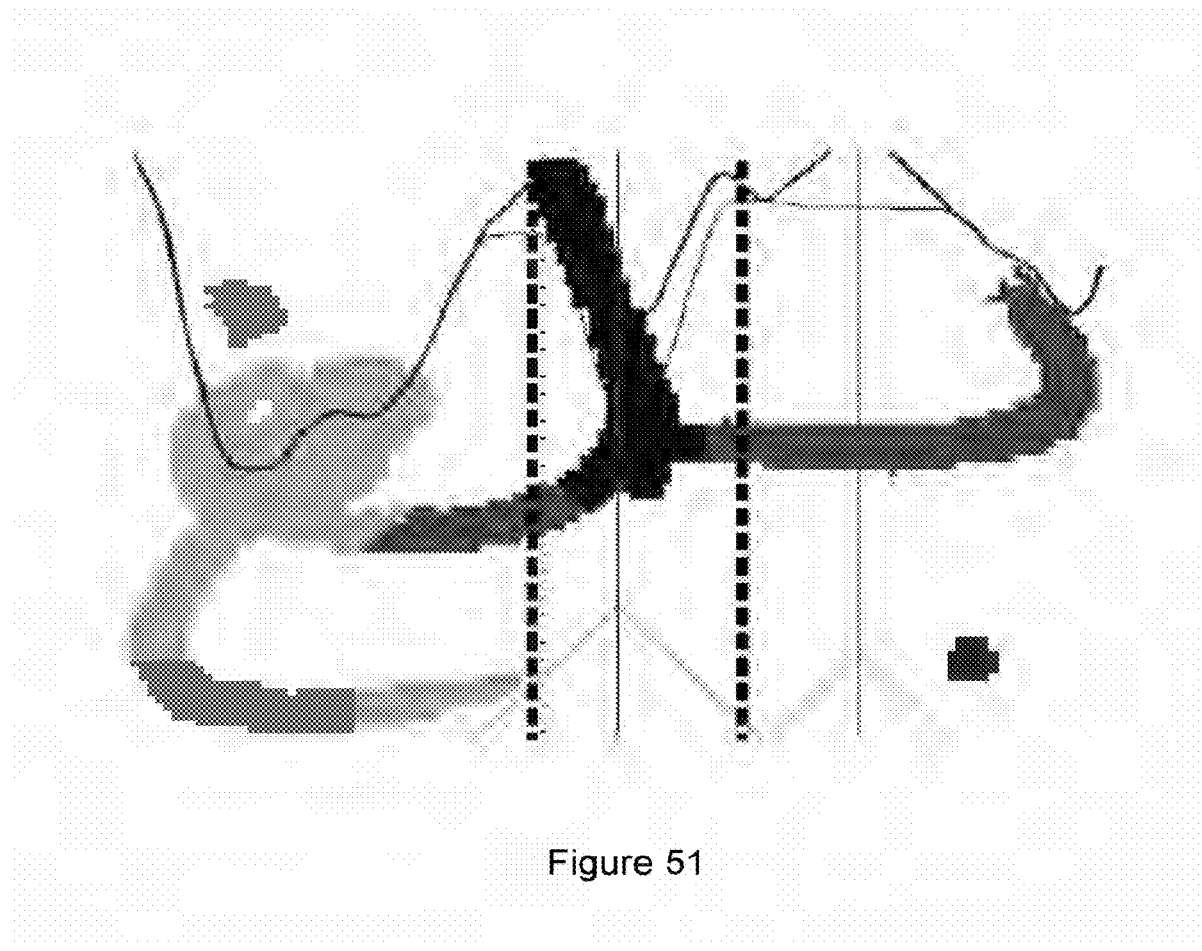
FIG. 51 illustrates an example of several character segmentation results according to an exemplary embodiment.

The fuzzification with the parameters estimated above contributes in the PAW-to-Characters segmentation algorithm are illustrated in FIGS. 50 and 51. First, the approach optimizes the selection of mountain and valley thresholds according to the real number of characters obtained from text information. In case of ties, the corresponding character width means is used to choose more likely cut centers. In all cases, subtracting the fuzzy triangles from the VP to encourage, without forcing, the algorithm is used to find potential valleys near them. The disadvantage is that the subtraction may also affect mountains, which are as necessary as valleys in defining cuts. The subtraction can be constrained to affect only certain values of the VP.

The dotted lines in FIG. 51 are for blind segmentation. Solid lines with triangles at the bottom are for the fuzzy width-segmentation. Thick dashed lines are for the fuzzy hybrid segmentation. The curves on top of the image are upside-down plots for the VP (with more values) and VP-fuzzy (with less values).

PAWs-to-Character-Shapes Segmentation cannot segment ligatures. Table 24 displays potential ligatures along with the ID numbers of writers reported to use any of them. Out of 648 omni-ligatives, 73 are ligatures. Thirty out of the 54 writers never used to any ligatures. Twelve writers have between one and two ligatures in their paragraphs. Ten out of the 12 potential ligatures are used. The maximum number of ligatures one writer has used is seven.

The entropy, H(x), of a discrete random variable X is given by:

$$H(X) = -\sum_X (P(X) \log P(X)) \quad (4.3)$$

where P(x) is the probability of event x for the random variable X.

The conditional entropy of X given Y, H(X|Y), is defined by Equation (4.4) which is equivalent to Equation (4.5)

$$H(X \mid Y) = -\sum_{X,Y} (P(X, Y) \log P(X \mid Y)) \quad (4.4)$$

$$\sum_{y \in Y} (P(Y = y) \log P(X \mid Y = y)) \quad (4.5)$$

where P(X,Y) is the joint distribution of X and Y.

Figure 52:
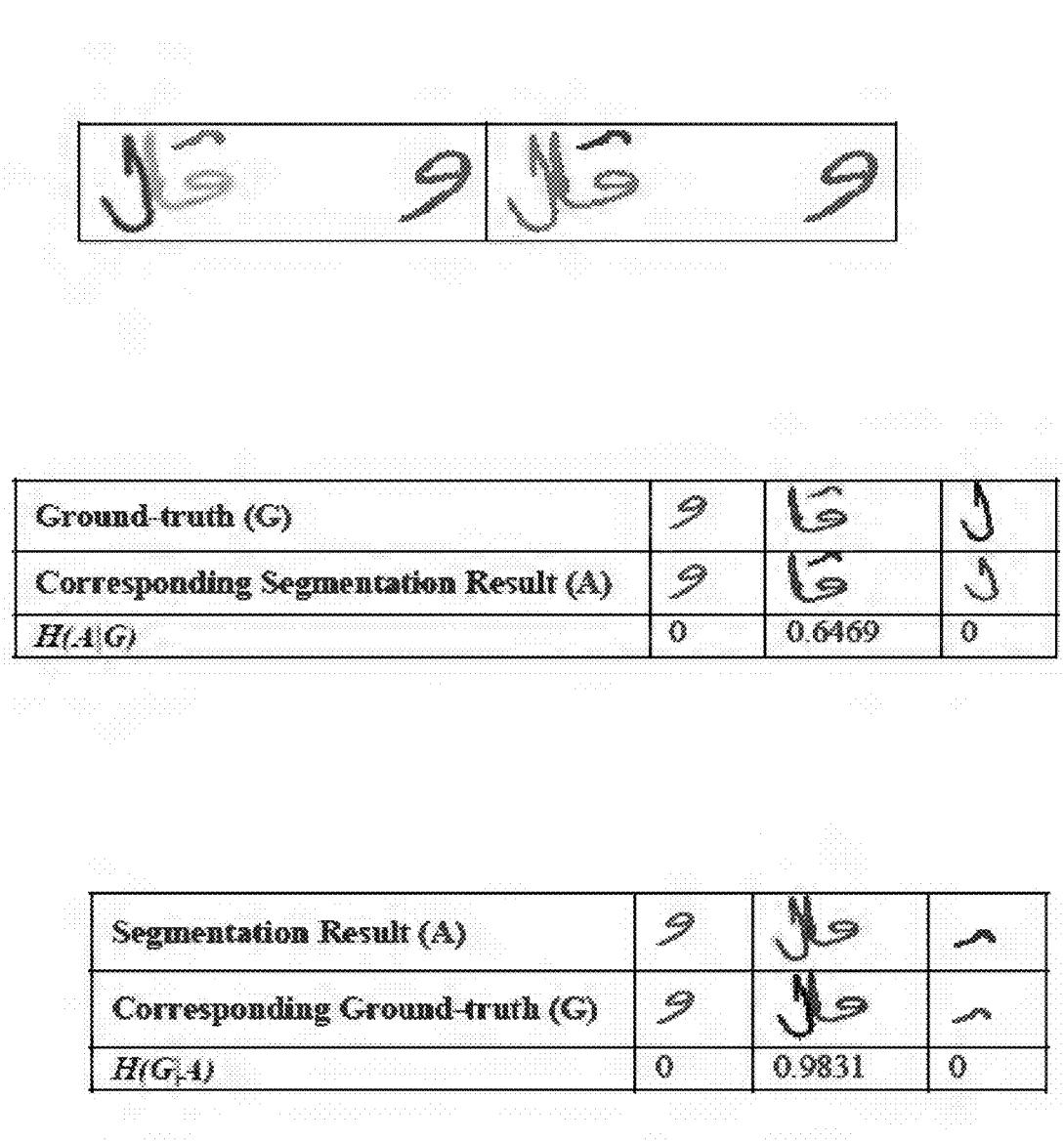
FIG. 52 illustrates labeled ground truth and segmentation to evaluate over segmentation and under segmentation with conditional entropy according to an exemplary embodiment.

Let A be a segmented image and G be its corresponding ground-truth. H(A|G) is the expected entropy of the labels taken from A with pixel locations corresponding to label y in G. It detects under-segmentation errors in an image. The conditional entropy H(G|A) quantifies over-segmentation errors. FIG. 52 helps explaining how over-segmentation and under-segmentation errors are evaluated from the segmentation result and the ground-truth of a word.

Over-segmentation and under-segmentation do not always imply that the resultant number of segments is larger than or lower than that in the ground-truth. Miss-segmentations resulting from the displacement of segmentation cut-points between neighboring characters, as well as those resulting from overlaps that cannot be separated with vertical cuts, are evaluated as over-segmentation in one character and under-segmentation in the other one. Any miss-

TABLE 24

Ligatures per writer as reported while GTing the unligative text part of the dataset.

| Writer ID | ظ | لح | خ | شم | جٮ | ىٯ | شخ | س | جح | نج | ط | كل | Total |
|---|---|---|---|---|---|---|---|---|---|---|---|---|---|
| 5 | 1 | 1 | 1 | 1 | 1 | 1 | 1 | | | | | | 7 |
| 11 | 1 | 1 | 1 | | 1 | 1 | 1 | | | 1 | | | 7 |
| 116 | 1 | 1 | 1 | 1 | 1 | | | 1 | 1 | | | | 7 |
| 199 | 1 | 1 | 1 | | 1 | | 1 | | | 1 | | | 6 |
| 9 | 1 | 1 | 1 | | 1 | | | | | 1 | | | 5 |
| 85 | | 1 | | 1 | | | 1 | 1 | 1 | | | | 5 |
| 119 | 1 | 1 | | 1 | | | | 1 | | | | | 4 |
| 139 | 1 | 1 | 1 | | | 1 | | | | | | | 4 |
| 201 | | 1 | | | 1 | 1 | | | 1 | | | | 4 |
| 16 | 1 | | 1 | | | 1 | | | | | | | 3 |
| 19 | | 1 | | | | 1 | | | 1 | | | | 3 |
| 123 | 1 | 1 | | 1 | | | | | | | | | 3 |
| 6 | 1 | | | | | | | 1 | | | | | 2 |
| 7 | 1 | | | 1 | | | | | | | | | 2 |
| 120 | | 1 | 1 | | | | | | | | | | 2 |
| 2 | | | | | | | | | | 1 | | | 1 |
| 3 | 1 | | | | | | | | | | | | 1 |
| 88 | | 1 | | | | | | | | | | | 1 |
| 105 | 1 | | | | | | | | | | | | 1 |
| 106 | 1 | | | | | | | | | | | | 1 |
| 109 | 1 | | | | | | | | | | | | 1 |
| 140 | | 1 | | | | | | | | | | | 1 |
| 185 | | 1 | | | | | | | | | | | 1 |
| 187 | 1 | | | | | | | | | | | | 1 |
| Total | 16 | 15 | 8 | 6 | 6 | 6 | 4 | 4 | 4 | 4 | 0 | 0 | 73 |

3.1 Segmentation Evaluation with Ground-Truth

Image segmentation suffers from the lack of quantitative validation methods. One exception is when ground-truths are available. As such, an adaptation of an entropy-based image segmentation validation metric is introduced. The metric cross-validates segmented images against ground-truths. Furthermore, the method is adapted for handwriting so that it allows any cut in the connection stroke (e.g. Arabic Kashida) without contributing in over-segmentation and under-segmentation errors.

segmentation can be quantified as a combination of over-segmentation and under-segmentation.

Figure 53:
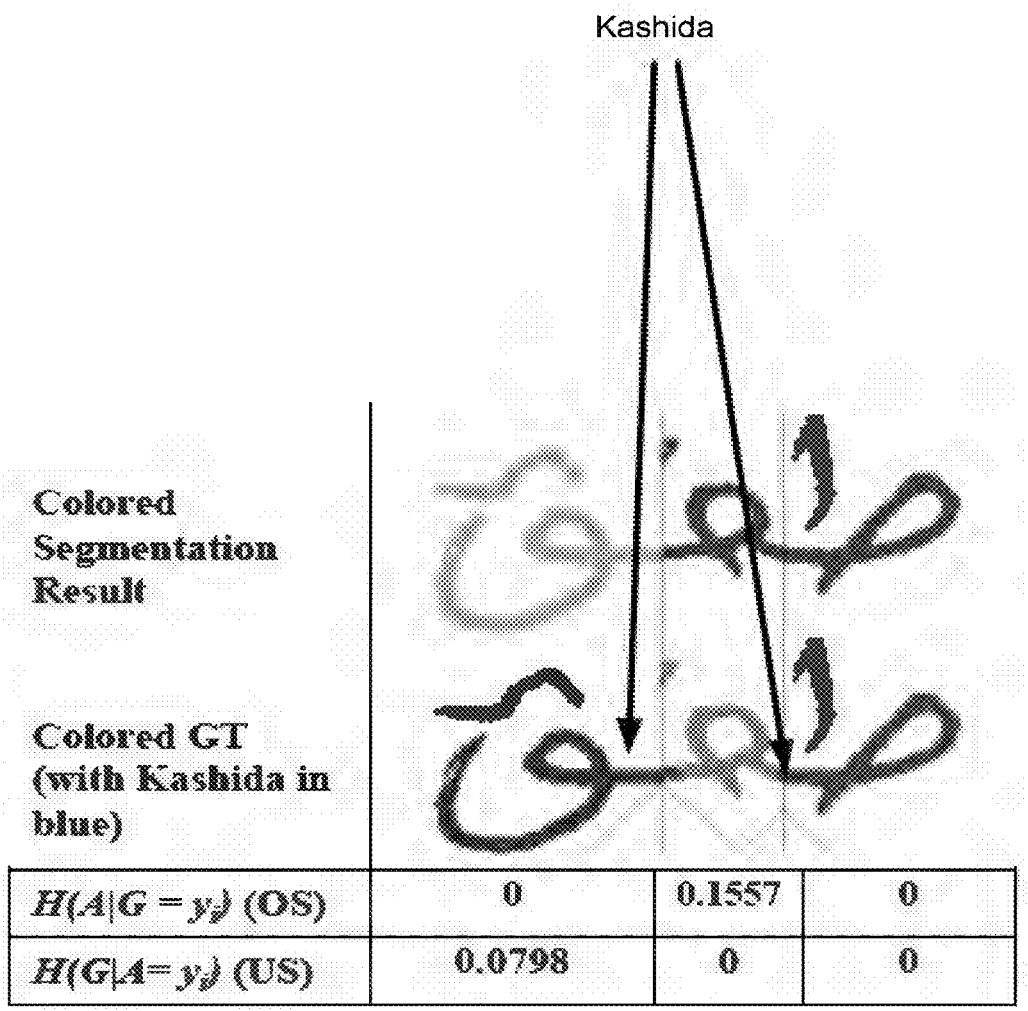
FIG. 53 illustrates segmentation evaluation with Kashida labels according to an exemplary embodiment.

The metric is adapted so that the background and the connection pixels (i.e. white areas as well as Kashida zones, as shown in FIG. 53) do not contribute to the error values. This is performed by giving Kashida of the GT the labels of their nearest connected neighbors.

The combination of errors from several samples is done via weighing each error value by the size of its component and averaging them. The combination of over- and under-segmentation error values, however, is generally not straightforward. It is worth noting, however, that for this metric the weight of under-segmentation is usually higher than that of over-segmentation because of the typical sizes of the erroneous components in each case.

A total of 2,322 words (8,640 character-shapes) are ground truthed to the character-level and the GT is used to demonstrate the process and results on ten segmentation scenarios. The algorithms are divided into:

Blind-segmentation, that does not utilize text-information, and

Non-blind segmentation, or text-alignment, that utilizes certain features of text-information.

Additionally, the input and output levels are segmented into: Text Line-to-Characters, Words-to-PAWs and PAWs-to-Character portions, as in Table 25. The "Th" column contains values for a factor of the stroke-width of each input image. Th shows the values of MountTh and ValleyTh when stroke-width is multiplied by 1.1 and 0.9, respectively.

result in comparable over-segmentation and under-segmentation error rates. Only the best of the reported blind character segmentation results outperformed the worst of the blind character segmentation algorithms in over-segmentation. The one-by-one images, along with their over- and under-segmentation error values, are found in the online dataset samples.

Arabic Handwriting Synthesis

Handwriting synthesis refers to the computer generation of online and offline data that resembles human handwriting. It aims at transforming input text into images of handwritten samples with equivalent script, whereas recognition maps handwritten samples into digital text. A selection-based concatenation method is utilized that selects character-shape samples according to their feature matches and some distance measure.

Figure 54:
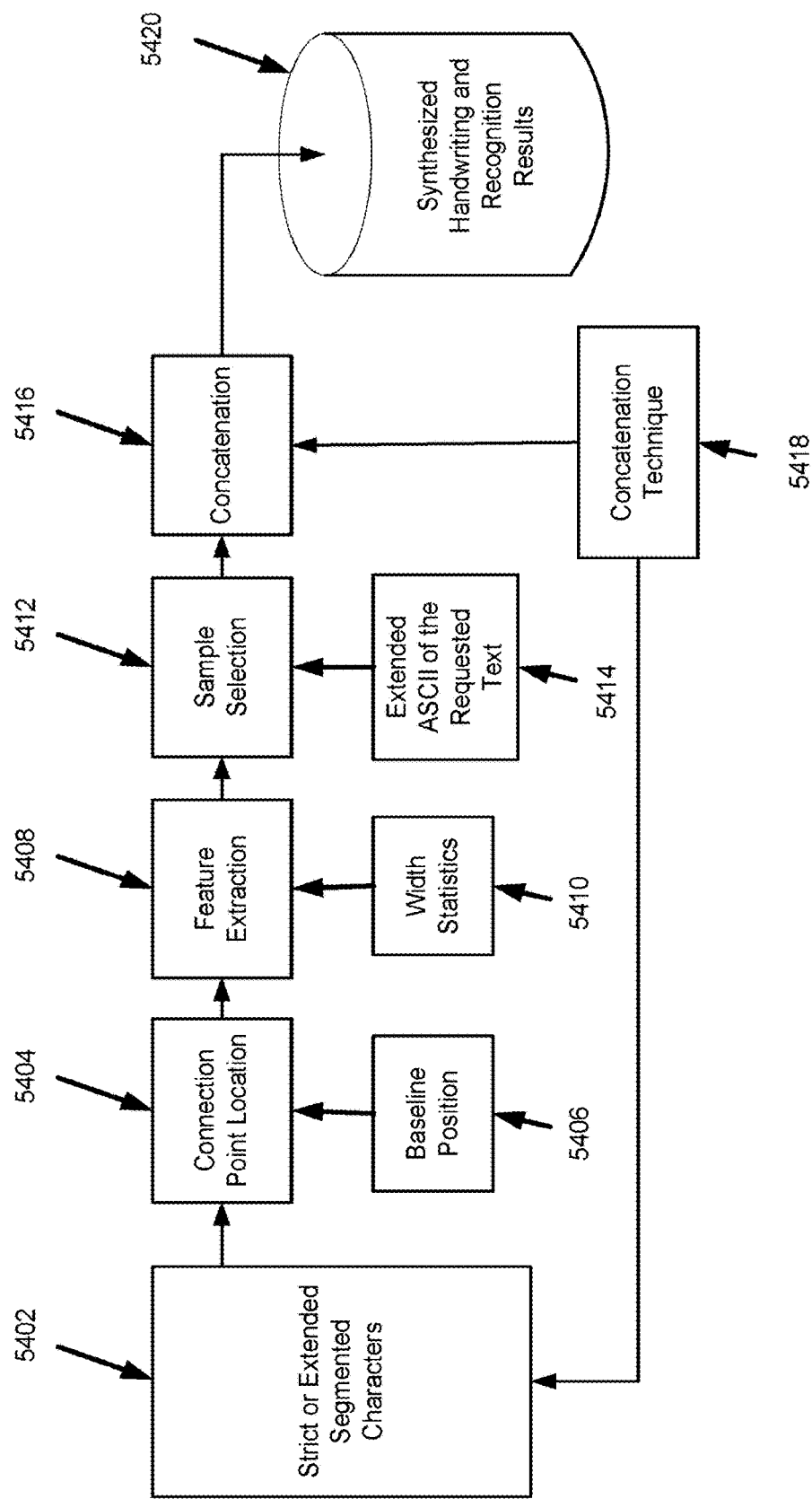
FIG. 54 illustrates a block diagram of steps to obtain an image dataset in filled boxes according to an exemplary embodiment.

The method is outlined in the block diagram of FIG. 54. As an initial step, the method identifies strict or extended segmented character 5402 which are then input into connection point location 5404. In one example, method takes character-shape images as inputs and reshuffles them into instances of any requested text. For each character-shape, features are extracted 5408 at the connection points which have been located to ensure the selection of samples that are most compatible for connection. The filled rectangles in the diagram show the four steps of the synthesis procedure, further including sample selection 5412 and concatenation

TABLE 25

Segmentation experiment details and results using the adapted conditional entropy evaluation method.

| Algorithm Brief Description | Input Details | m | Th/ x= ... | Over-Errors (bits) | Under-Errors (bits) |
|---|---|---|---|---|---|
| Blind | Original text-lines | 5 | 1 | <u>0.3555</u> | 0.6121 |
| Line-to-Characters | baseline-range deleted text-lines | 5 | 0.6 | 0.3373 | 0.6987 |
| | Small connected components deleted text-lines | 5 | 0.65 | 0.3237 | 0.6729 |
| | baseline-range & small connected components deleted text-lines | 5 | 0.6 | 0.3090 | <u>0.8709</u> |
| | Original text-lines | 7 | 0.75 | 0.2579 | 0.6937 |
| Semi-Blind Word-to-PAWs | Words & count of PAWs | Table 24 | | 0.0202 | 0.0402 |
| Count aware only PAW-to-Characters | PAW & count of characters | 5 | — | <u>0.2857</u> | <u>0.3173</u> |
| Image-Blind Text-aware PAW-to-Characters | Widths of characters | 7 | — | 0.2391 | 0.2339 |
| Non-Blind PAW-to-Characters with Lcharacter outputs (see FIG. 50) | PAW & widths of characters | 7 | — | 0.2374 | 0.2500 |
| Non-Blind PAW-to-Characters with Fcharacter outputs (see FIG. 50) | PAW & widths of characters | 7 | α = 4 | 0.2280 | 0.2336 |

Within each portion in Table 25, the experimental results are displayed in their decreasing order of over-segmentation and the best result of a portion are displayed in bold, and the worst result of a portion is underlined. For the blind Text Line-to-Character segmentation portion, a tradeoff between over- and under-segmentation errors can be seen. This trend disappears in the non-blind portion, where the two error-values decrease with the injection of more text-information. Word-to-PAWs segmentation shows results which are better by around an order of magnitude than the segmentation algorithms that target character segmentation directly. The reported blind Text Line-to-Character segmentation experiments suffer less from over-segmentation than from under-segmentation. Non-blind PAWs-to-character segmentation 5416. The information needed for each step of the selection-based method includes baseline position 5406, width statistics 5410, extended ASCII of the requested text 5414 and concatenation technique 5418.

The input dataset contains character-level ground-truthed texts that cover all of the Arabic character-shapes. From the dataset, strictly segmented character-shapes that minimize the extension part out of the character's glyph are extracted, as well as extended character-shapes. These are used for the Extended-Glyphs and the Synthetic-Extensions concatenation techniques. The connection-point location step intends to find the coordinates of the connection edges for each character-shape instance, sometimes with the help of the baseline information obtained before segmentation. Thickness and directions features are computed for connection parts. In addition, the sample-to-average character-shape width ratio is also used as a feature to help choosing character-shapes of similar scales. Based on their features, samples of the text to be synthesized (entered from a keyboard or a file), particular character-shape samples are selected. Finally, the selected samples are positioned on a canvas using one of two connection schemes: extended-glyphs (EG) concatenation and Synthetic Extensions (SE) concatenation.

In yet another example, the process starts by retrieving all the samples of strictly or extendedly segmented character-shapes that are needed in a word, based on the concatenation technique that will be used. The sample baselines are then analyzed in a recognition procedure to identify connection points. Then, feature extraction takes place on the baseline parts near the connection points. Features mainly include relative storoke widths (to the average of the same type) and direction. Then, specific samples of the needed character-shapes are selected based on their connection-point features so that they form smooth word-concatenations in the next step before being added to the database. The baseline position is the part of the connection (Kashida) that was cut in segmentation to separate characters. It is determined by some algorithms using adaptive HP and segmentation information. Furthermore, the width statistics include the average and standard deviation statistics of the widths of the seg-mented characters, per character-shape and are stored in dedicated tables.

Connection-Point Location

Connection-point location is necessary for feature extraction, sample selection, and PAW connection. The connection-point location for two scenarios is investigated: the blind scenario and the ground-truth aware scenario; the former being prone to the baseline zone (BL) errors and the latter to ground-truth errors.

Figure 55:
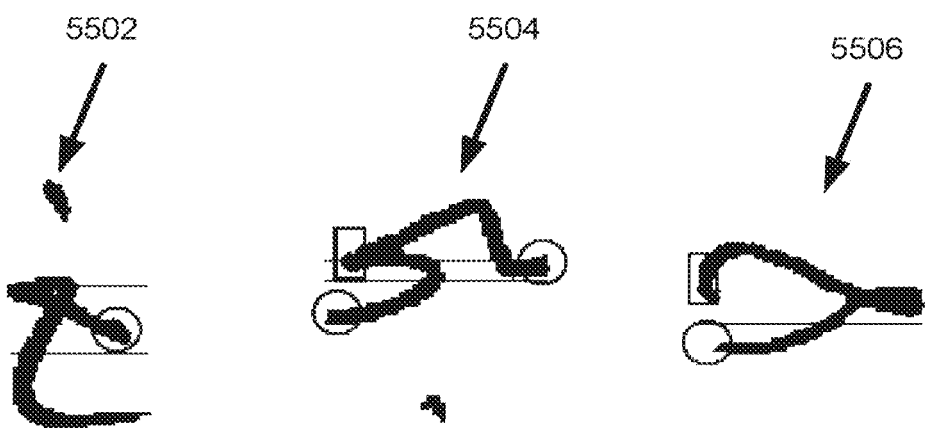
FIG. 55 illustrates correct extensions and erroneous extension location samples for an ending character shape, a middle character shape and a beginning character shape according to an exemplary embodiment.

The extensions can be methodically located from character-shape images based on their right and left edge positions. FIG. 55 describes examples of connection-points at the right side of (E) and (M) character-shapes and at the left side of (B) and (M) character-shapes and further examples of (B), (M) and (E) character-shape extensions. FIG. 55 includes an ending character shape 5502, a middle character shape 5504 and a beginning character shape 5506.

FIG. 55 also shows that not only connection parts, but also character parts, may come at the edges of a character-shape image. This case causes ambiguities in connection-point location. To reduce such ambiguity, points are chosen within the baseline-range (BL). BL cannot be accurately estimated from single character-shapes. Therefore, BL information is received for chunks of characters from the previous steps. An extension is identified as the nearest connected component (CC) to the bounding box edge side of interest within BL and not farther than N pixels from the edge itself. From that CC, the connection level is taken as the y-coordinate of the median of nearest column to the corresponding edge. In one example, the extensions can be methodically located from character-shape images based on their right and left edge positions. An algorithm may search for connection-points at the right side of (E) and (M) character-shapes 5502 and 5504 and at the left side of (B) and (M) character-shapes 5506 and 5504. The process of locating the connection-point intends to find the coordinates of the connection edges for each character-shape instance, sometimes with the help of the baseline information obtained before segmentation.

Error rates are collected for connection-point location based on 1,462 character-shape images that have the Kashida label near their right and left sides. The right and left error rates of this approach are 1.64% and 2.12%, respectively. Some errors are due to inaccurate BL estimations, and some are due to ligatures; a case in which characters connect out of BL.

Feature Extraction

Figure 56:
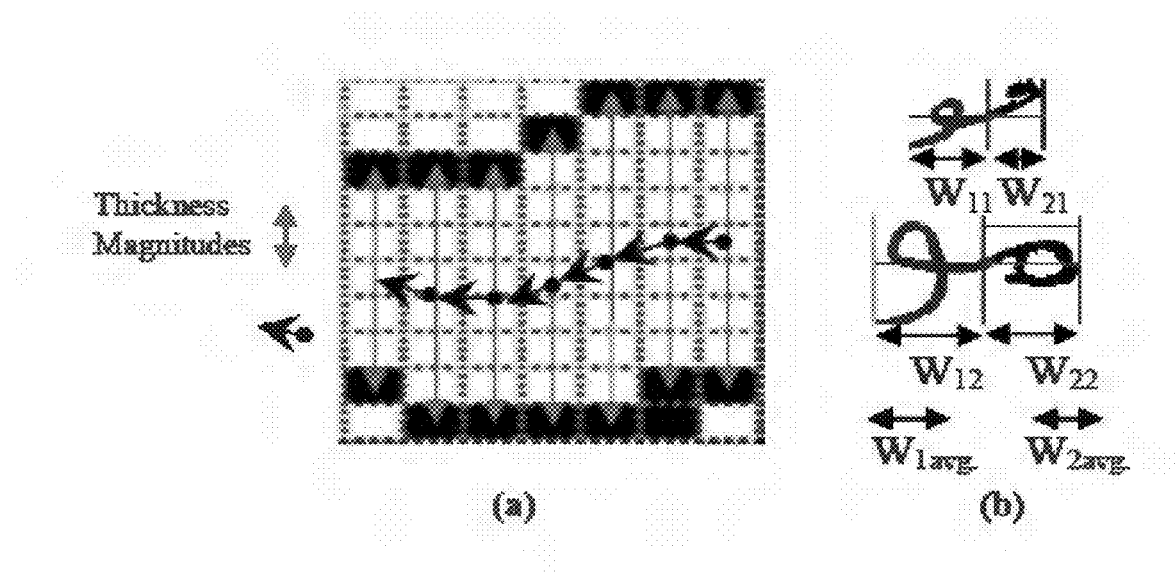
FIG. 56 illustrates the thickness and direction features of the seven left most pixels of a left connection part and the two consistent matches based on a width-ratio feature according to an exemplary embodiment.

Features that describe the connection-parts (Kashida features) and the relative-widths of the character-shapes (Width feature). Kashida features are intended to assure within PAW matching. They measure the thickness and the direction of connection-parts within a window of N pixel-columns from the outer edge of a character-shape. The thickness feature at Column j is taken as the vertical distance between the upper and the lower contours of the connection-part. The direction feature is taken as the difference between the middle y-coordinate of the connection part pixels at Column j and the corresponding value for Column j+1. Hence, N thickness features and N−1 direction features can be computed per connection-part. Kashida features are illustrated in FIG. 56($a$). The Width feature refers to the ratio of the width of a character-shape sample to the average width of its class samples. The average widths per sample are pre-computed and stored for use in this feature. FIG.(b) illustrates the effect of the Width feature.

Features are computed and stored in a 2×N sized structure. Kashida features are stored so that the outer features of the rightmost connection-part are matched with the inner features of the rightmost connection-part. The different Kashida features are stored in different structures to ease taking subsets with window sizes less than N, if needed. The width-ratio features are matched together, regardless of their connection-part sides.

The Width feature typically has smaller values than thickness values. To maintain significant effects for the Width feature, it is multiplied by a pre-specified weight, WT, and the Kashida features are normalized by their respective numbers. Next, representative samples of character-shapes are selected for synthesis. In one example, thickness is taken as the vertical distance between upper and lower Kashida contours. Samples that are consistent in thickness for smooth concatenations are chosen to illustrate two consistent matches based on a width-ratio feature as illustrated in FIG. 56($a$)-56($b$).

Sample Selection

Samples of character-shapes contributing to the synthesis of some text are selected so that they collaboratively pursue a natural look and behavior. The features of neighboring samples are evaluated by the city block distance measure. The collection of samples that minimizes the sum of the measured distances is selected. When synthesizing several versions of a word, it is assured that each selection is unique.

The search space of sample selection is affected by the number of units to be jointly selected. (U) and by the number of samples per character-shape. Units refer to extended-glyphs in EG concatenation and to character-shapes and SE. An estimation step takes place that estimates the number of comparisons required for a selection by Comparisons (U), the number of distance matchings for a unit of U character-shapes. In the following, let $U_i$ be the number of samples of the $i^{th}$ character-shape in the synthesized unit. Equation (5.1) estimates the search space for brute-force selection.

$$\text{Comparisons}(U) = \prod_{i=1}^{U} U_i \tag{5.1}$$

Brute-force search for sample selection is impractical except for small values of U. One solution to this problem is to limit the usage of brute-force selection to PAWs, since more than 99.5% of PAWs consist of 5 or less character-shapes. Then, the different PAWs are linked based on the width features of their two neighboring characters.

Another approach that avoids intractable brute-force selection is the forward algorithm that performs optimal matching for the first pair of the character-shapes and sequentially matches neighboring character-shapes in a chain Equation (5.2) represents the number of vector comparisons for the greedy forward algorithm.

$$\text{Comparisons}(U) = U_1 \times U_2 + \sum_{i=3}^{U} U_i \qquad (5.2)$$

Curtailed and broken connection parts may result in thickness values of zero. When matching features-structures for sample selection, the zero thickness features may undesirably match. For this reason, penalizeing zero-thickness extension parts by replacing their distances by larger values may be necessary.

Concatenation

In this step, images of cursive text are composed from individual character-shape samples. This is accomplished through one of two concatenation approaches: the Extended Glyph approach (EG) and the Synthetic-Extension approach (SE).

Figure 57:
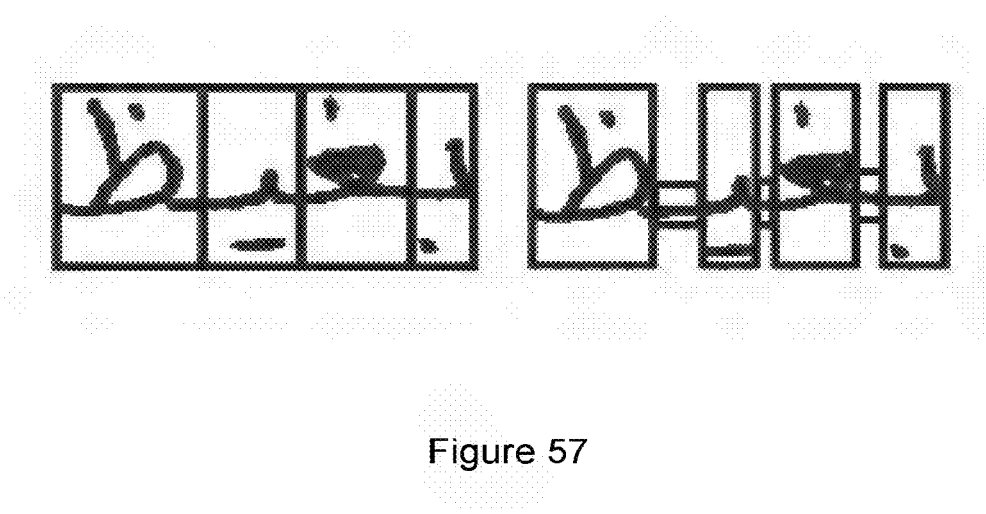
FIG. 57 illustrates examples of extended glyphs connection model and synthetic extensions connection model according to an exemplary embodiment.

The aggregation of the character-shape with part of its attached Kashida, as shown in FIG. 57(a), is referred to as an extended glyph, and it is the basis of the EG approach. Extended-glyphs can be of the beginning, middle or ending shapes, denoted as (Bx), (xMx) and (xE), respectively; where the 'x' prefix/suffix indicates the presence of a Kashida extension before/after a character-shape. The regular expression of a multi-character PAW under this model is given by (Bx)(xMx)*(xE), where the '*' mark indicates zero or more occurrences of the symbol before it.

On the other hand, SE concatenation utilizes synthetic Kashida between strict character-shapes that were extracted with minimal Kashida extensions, as shown in FIG.(b). The regular expression for SE concatenation is given by (B)(K(M))*K(E). The search space of samples can be larger in SE than in EG due to the greater number of units in SE.

The Extended Glyph Approach

Extended-glyphs are extracted from the dataset as the character-shapes along with their neighboring Kashida extensions. Then, the Kashida extensions are trimmed so that they are only few (2-6) pixels out of the extended glyph. Trimming extensions of the extended character-shape model not only keeps the extension length natural, but also leaves the connection-point at a clean cut.

The EG model uses direct-connection concatenation to synthesize PAWs and no-connection concatenation between PAWs. Extended character-shapes are placed in juxtaposition where character-shapes within a PAW are vertically aligned so that their horizontally extensions overlap with N pixels.

Then, spaces are added between PAWs and words. If the text to be synthesized explicitly specifies a space, a gap size from the uniform distribution between 14 and 28 pixels is selected and a corresponding space is inserted in the synthesized image. Displacements in both the gapping and overlapping directions are made between PAWs. The displacement values are selected from a normal distribution centered after (E) and (A) character-shapes by 5 pixels and scaled by a standard deviation of 1.75. Cleary, it favors gaps over overlaps.

The Synthetic-Extension Approach

The Synthetic-Extension (SE) model uses a synthesized connection stroke to concatenate strictly-segmented characters into PAWs. Apart from the strict segmentation and the synthetic extension, the procedure is similar to that of EG.

A statistical model learns Kashida shapes from the dataset. It analyses the features of extracted Kashida and captures them into discrete histograms that are sometimes loosely referred to here as Probability Density Functions (PDFs). These PDFs are later used to draw values for a synthesized Kashida. The following sections elaborate on Kashida extraction, representation and modeling.

Kashida Extraction

Kashida extensions are extracted from the dataset based on their ground-truth labels. All Kashida and noise components share a common label value. Hence, to isolate Kashida from pepper noise components, the extracted components are constrained to be adjacent to two consecutive characters. For some later statistics, the names of the neighboring characters are stored along with their corresponding Kashida.

Figure 58:
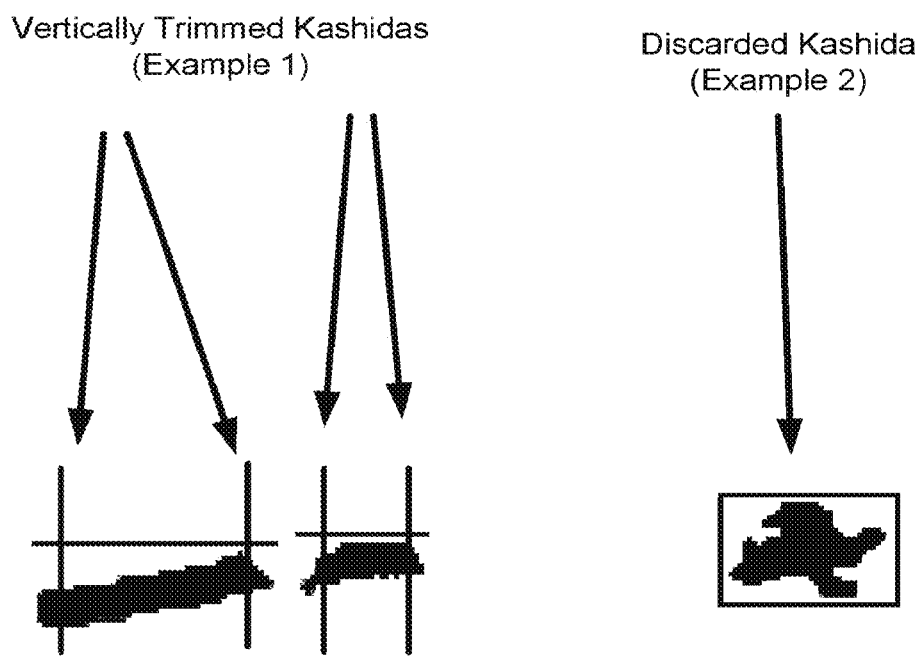
FIG. 58 illustrates samples of trimmed Kashida and discarded Kashida according to an exemplary embodiment.

To assure accurate Kashida analysis, the left and right borders need to be cleanly (vertically) cut. To achieve this, slices are trimmed from both sides Kashida borders. The widths of the slices are adaptively computed based on the Kashida width. Some Kashidas are discarded based on size and aspect ratio thresholds. FIG. 58 illustrates samples of trimmed and discarded Kashida. In one exemplary embodiment, Kashidas that are accepted are vertically trimmed as per example 1 in FIG. 58. In another exemplary embodiment, Kashidas that are not accepted based on a threshold of their aspect ratios are discarded as per example 2 in FIG. 58.

Kashida Representation

Figure 59:
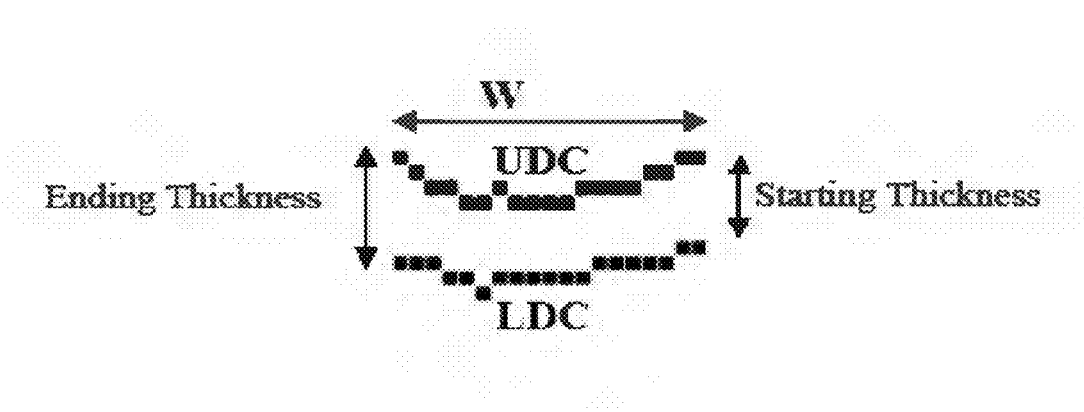
FIG. 59 illustrates a Kashida width, upper contour directions and lower contour directions according to an exemplary embodiment.

Each extracted Kashida is represented by three sets of features: its width (Width), the directions of its upper contour (UCD) and the directions of its lower contour (LCD). FIG. 59 shows these features. Current connection scenarios of the present disclosure do not require modeling Kashida starting or ending thicknesses.

Width, UCD and LCD are identified of the previously extracted Kashidas as in the algorithm that is listed in FIG. 60. Kashidas contribute with more than 1,000 widths and 13,000 pixel-directions (slopes) for each of the UCD and LCD. I Probability Estimation The probability density functions (PDFs) for Width, UCD, and LCD of Kashida are computed for subsets of the Kashida population, as well as for their proper set. Kashida subsets may be taken per writer, per the character they emerge from, or by the character they reach.

Two types of PDFs are estimated: Kashida Width PDFs (KW-PDFs) and Contour Direction PDFs (CD-PDFs). KW-PDFs are estimated based on bins that are eight pixels wide. Strokes shorter than 6 pixels are discarded in the extraction step; hence, the first bin is usually under-populated. CD-PDFs are estimated for the upper and the lower contours. Upper CD-PDFs (UCD-PDFs) for the upper contour of a whole Kashida as well as for each of five equal portions of it. UCD-PDFs are shown that are conditional on the predecessor contour-pixel direction value. Lower CD-PDFs (LCD-PDFs) are either estimated independently or conditionally given the corresponding upper contour direction.

The PDFs presented are first estimated on the complete set of Kashida, and then they are re-estimated on subsets based on the connected characters or the writers. Per-connected-characters' PDFs are presented once per the predecessor character and again per the successor character of a Kashida. The fourth set of Kashida for which the PDF is estimated is the per-writer subset.

Three main types of PDFs are estimated for all of the subsets of Kashida. In particular, KW-PDFs, 5-Portions UCD-PDFs and Conditional-on-Upper LCD-PDFs are considered. CD-PDFs that are conditional on the predecessor contour-pixel are unstable when used to synthesize Kashida because the PDFs choice is determined by a single random value. Table 26 lists all Kashida PDF types per their subsets. Together, these PDFs contribute 2,459 Width and contour values.

Three row sets can be identified in the table: the width PDF, the UCD set, and the LCD. One PDF type is chosen from each of the latter two sets. The 5-portioned UCD was chosen because it is more robust than the conditions UCD, which makes the pixel direction solely conditional on one previous pixel direction. To link LCD to the corresponding UCD, conditional PDFs of LCD given UCD are computed.

TABLE 26

The computed PDFs and their sizes per Kashida subsets and types.

| | Sets | | | | |
|---|---|---|---|---|---|
| PDF | Statistic per Kashida | Proper set | Subset per previous character-shape | Subset per next character-shape | Subset per Writer |
| KW | 1 | 1 × 1 | 42 × 1 | 50 × 1 | 44 × 1 |
| UCD | W | 1 × 1 | 42 × 1 | 50 × 1 | 44 × 1 |
| Conditional UCD | (W-1) | 1 × 5 | 42 × 5 | 50 × 5 | 44 × 5 |
| 5-Portioned UCD | (W/5) | 1 × 5 | 42 × 5 | 50 × 5 | 44 × 5 |
| LCD | W | 1 × 1 | 42 × 1 | 50 × 1 | 44 × 1 |
| Conditional LCD | W | 1 × 5 | 42 × 5 | 50 × 5 | 44 × 5 |

Histograms represent counts of entities per categories. In current embodiments, the columns show counts by referring to the axis that is parallel to the long-side of the longest column and categories by referring to the axis that they originate from. The categories may be numerical in value.

FIGS. 61-66 show examples of the histograms for the proper set of Kashidas. In one example, synthesis can be done by altering some features of the synthesized character (in this case Kashida), or by combining features/parts from different characters. The latter approach has the advantage in terms of the variability of the synthesized shapes. Combining features from different Kashidas into a new synthesized shape involves selection of these feature values.

In view of FIGS. 61-66 and in looking at Table 26, the second column in Table 26 displays the number of statistics that a Kashida can contribute per feature. For example, every Kashida has one width feature (W), W upper-contour direction features, and W/5 contributions to each portion of the 5-Portioned UCD. The third column shows the counts of histograms per PDF. Whenever the feature is dependent on the direction of another feature, the multiplicand would be 5 to represent the 5 different slopes. These multiplicands are shown on all subsequent columns. The three last columns include as a multiplier to the counts of histograms the number of subsets used to form conditional PDFs. For example, there are 42 character-shapes that can be previous to a Kashida and that can affect its shape, 50 character-shapes that may be connected to a Kashida, and 44 writers that a writer-dependent system can benefit from.

Figure 61:
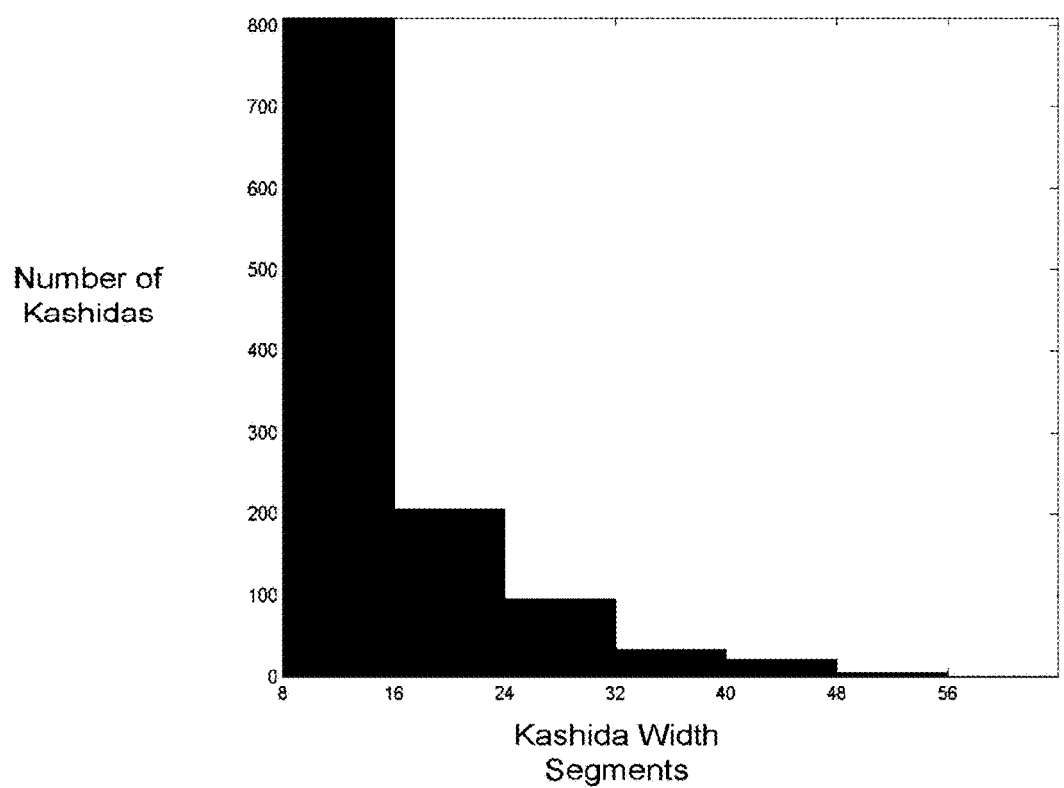
FIG. 61 illustrates Kashida width histogram for the proper set of Kashidas according to an exemplary embodiment.

For example, in FIG. 61, the x-axis represents Kashida widths of categories of: 8-15, 16-23, 24-31, 32-49, 40-47, 48-55, and more than 55. The y-axis represents numbers of Kashidas in each of these categories.

Figure 62:
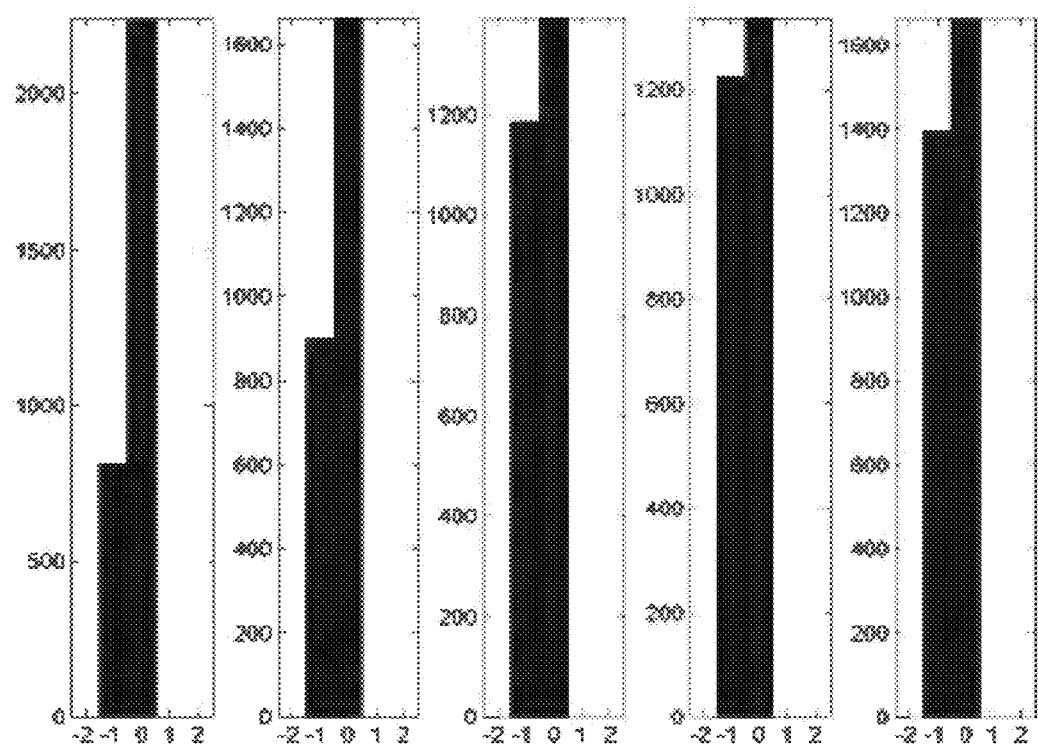
FIG. 62 illustrates 5-portioned upper contour histograms for the proper set of Kashidas according to an exemplary embodiment.

In FIG. 62, 5 histograms are presented, which correspond to the 5 portions that result if vertical-segmentation of each Kashids into 5 non-overlapping parts is implemented, with widths=floor (Kashida Width/5). The rightmost histogram corresponds to the rightmost portion.

In each of these histograms, the categories refer to the slopes of the directions of every two consecutive upper contour pixels. Their ranges, from right to left, are more than 2, 1, 0, −1, and less than −2.

In each of these histograms, the columns show the counts of pixels for the corresponding categories and histograms. The y-axes of each histogram is automatically adjusted to accommodate the highest count of each histogram, hence they may differ in their "tick" values.

Figure 63:
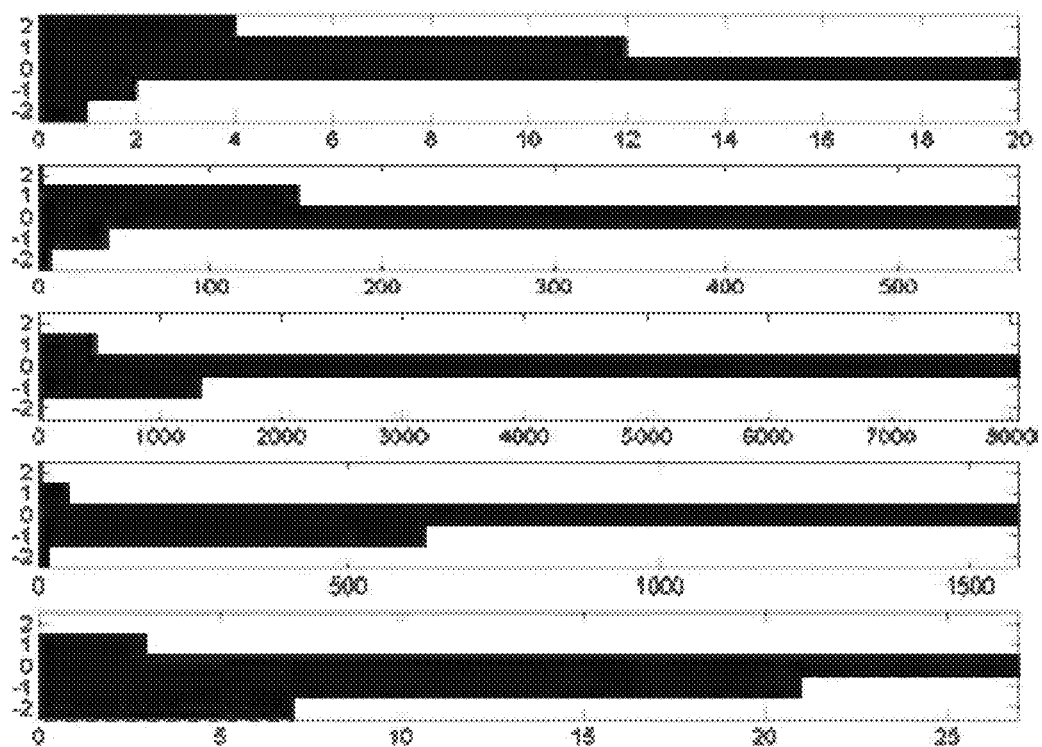
FIG. 63 illustrates conditional lower contour directions histograms for the proper set of Kashidas.

In FIG. 63, we have 5 histograms, which correspond to the lower contour pixels that are in the same pixel-column of an upper contour pixel of slope of 2 or more (in the topmost histogram), of slope of 1 (in the second from top histogram), of slope of 0 (in the middle histogram), of slope of −1 (in the before-bottom histogram), and of slope of less than −2 (in the bottom histogram).

In each of these histograms, the categories refer to the slopes of the directions of every two consecutive lower contour pixels. Their ranges, from right to left, are more than 2, 1, 0, −1, and less than −2.

In each of these histograms, the columns show the counts of pixels for the corresponding categories and histograms.

Figure 64:
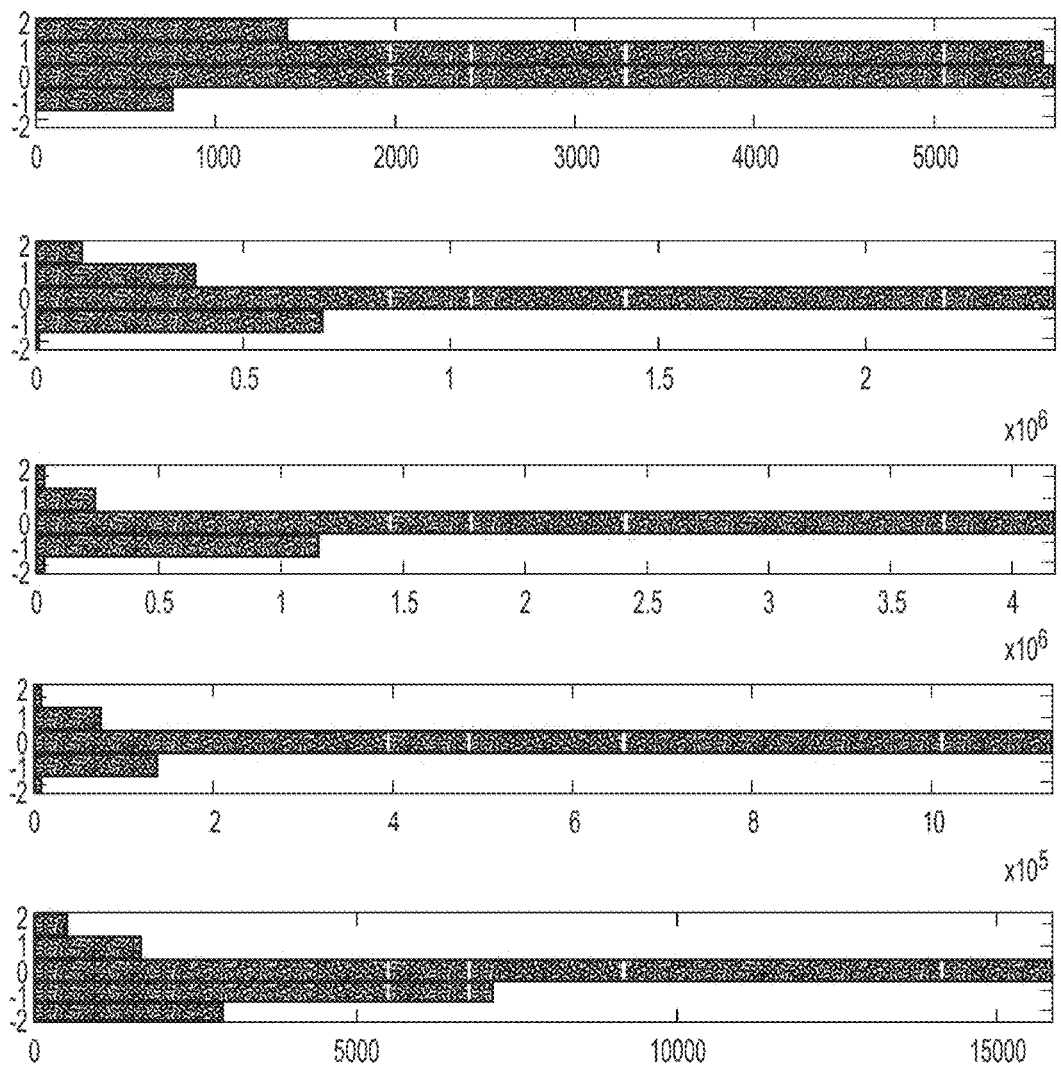
FIG. 64 illustrates conditional histograms for the proper set of Kashidas according to an exemplary embodiment.

FIG. 64 illustrates 5 histograms which represent the counts of upper contour pixels in each slope-category as described in FIG. 63, conditionally to the previous upper contour directions which are: of slope of 2 or more (in the topmost histogram), of slope of 1 (in the second from top histogram), of slope of 0 (in the middle histogram), of slope of −1 (in the before-bottom histogram), and of slope of less than −2 (in the bottom histogram).

In each of these histograms, the categories refer to the slopes of the directions of every two consecutive lower contour pixels. Their ranges, from right to left, are more than 2, 1, 0, −1, and less than −2.

In each of these histograms, the columns show the counts of pixels for the corresponding categories and histograms.

Figure 65:
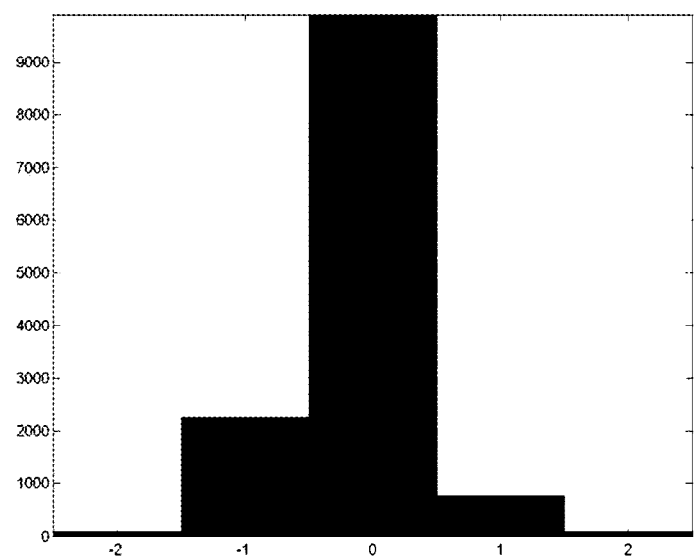
FIG. 65 illustrates upper contour directions histogram for the proper set of Kashidas according to an exemplary embodiment.

In FIG. 65, the categories of the histogram, from right to left, correspond to the of slope of 2 or more, 1, 0, −1, and −2. The counts correspond to the upper contour pixels for all Kashidas in each of these categories.

Figure 67:
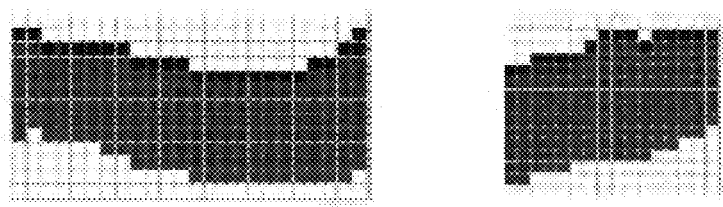
FIG. 67 illustrates synthesized Kashida with the overall upper contour PDF and with the portion wise upper PDFs according to an exemplary embodiment.

In FIG. 66, there is illustrated histograms showing the counts of Kashida widths per 2 character-shapes. We can see the difference in shape in these compared to FIG. 61. This is because of the special way how these characters are written. The contrast illustrates the importance of having "per-connected-character" histograms. FIG. 67 illustrates synthesized Kashida with the overall upper contour PDF and with the portion-wise upper PDFs according to an exemplary embodiment. In one example, pixelated breakdown of possible Kashidas is illustrated such that each pixel width can be a width of a possible Kashida and the width of the overall Kashida may depend on the algorithm or user preferences and detected writing style.

Upon inspection, it is observed that that the "conditional on the next character" column captured writing styles that are calligraphically justifiable. For example, the width-histograms of character-shapes  and , shown in FIG. 66, were non-descending. These two characters are often written in a special way that this subset reflects.

Kashida Synthesis

To synthesize a Kashida, a width, W, is drawn from the KW-PDF and add a random integer ranging from zero to the bin size to it in order to cope for the histogram quantization. Then, W UCD values are drawn from the 5-portioned UCD and W other values for their corresponding values conditional-on-upper LCD and use these as the contours of the Kashida. Minimum and maximum distances are imposed between each UCD and its corresponding LCD values so that the Kashida thickness is always within the pre-specified range. Once the contours are selected, the range between them is filled with black pixels. Two samples are show in FIG. 67.

Experimentation and Results

Synthesis systems should be evaluated based on their intended applications. The aim in this dissertation is to improve a recognition system with natural-looking data. Hence, the results are presented of the handwriting synthesis system by images and by reporting their impact on the performance of a state-of the-art text recognizer. The recognition results of an HMM-based system are presented, on the popular IFN/ENIT benchmark database, with and without the injection of synthesized data.

Synthesis Experimentation and Results

Figure 68:
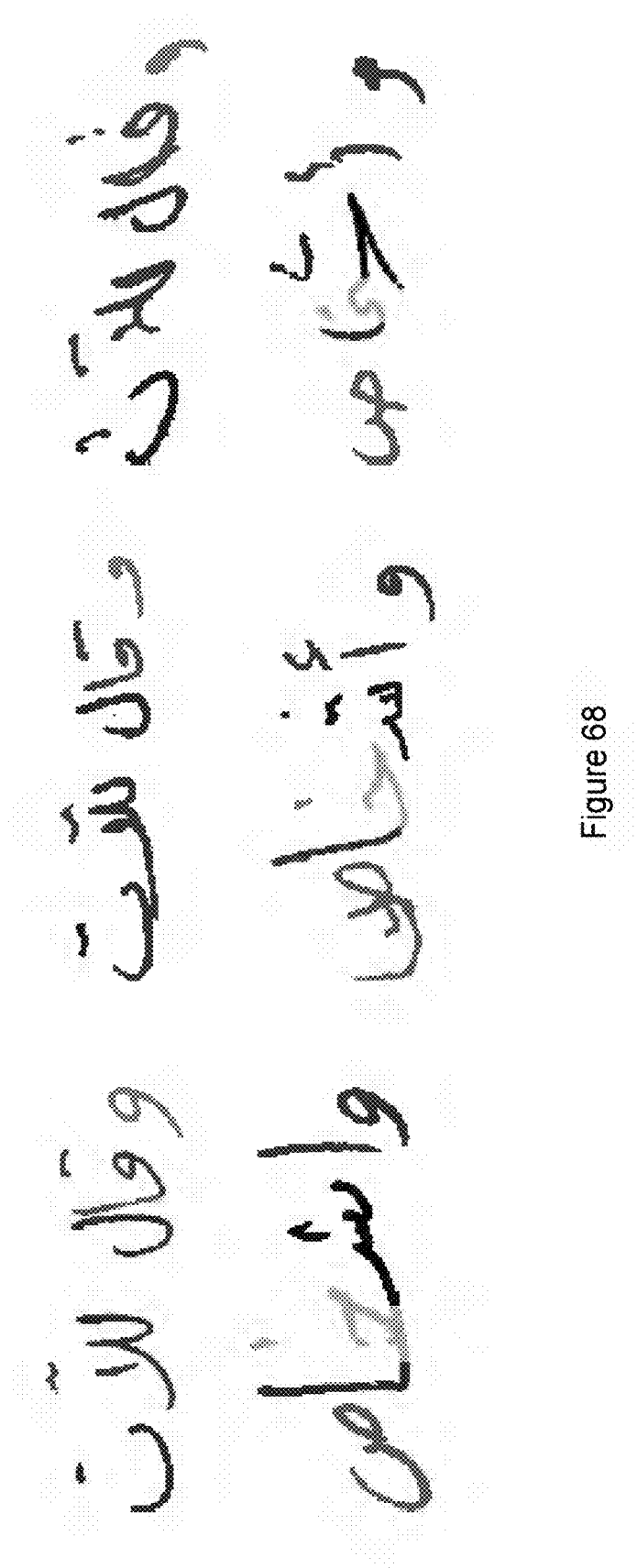
FIG. 68 illustrates text samples of implemented datasets by different writers according to an exemplary embodiment.

To evaluate the natural-looking of the synthesized data, six versions of the possible multi-word names of 721 Tunisian towns/villages are synthesized from the selected dataset. In FIG. 68, it can be shown that some samples of the handwritings of the writers as input samples of one exemplary dataset.

TABLE 27

General statistics on the synthesis test bed.

| Feature | Value |
| --- | --- |
| Total PAW | 1,445 |
| Total character-shapes | 3,847 |
| Avg. number of character-shapes per town name | 5.34 |
| Maximum number of character-shapes in a town name | 13 |
| Avg. number of character-shapes per PAW | 2.66 |
| Maximum number of character-shapes in a PAW | 7 |
| Avg. number of PAWs per town name | 2.00 |
| Number of PAWs with 1 character-shape | 64 |
| Number of PAWs with 2 character-shapes | 709 |
| Number of PAWs with 3 character-shapes | 422 |
| Number of PAWs with 4 character-shapes | 174 |
| Number of PAWs with 5 character-shapes | 55 |
| Number of PAWs with 6 character-shapes | 19 |
| Number of PAWs with 7 character-shapes | 2 |

A set of parameters affects the quality of synthesis and the time it consumes. These parameters are shown in Table 28. To synthesize unique versions of the same word, a selected character-shape combination is kept in a list and prevented from appearing again.

TABLE 28

Setup parameters for the synthesis.

| Setting | Value |
| --- | --- |
| Brute force selection until (in character-shapes) | 2 |

TABLE 28-continued

Setup parameters for the synthesis.

| Setting | Value |
| --- | --- |
| Zero-thickness penalty | Yes |
| WT weight for the $W/W_{avg}$ features | 10 |

Figure 69:
FIG. 69 illustrates samples of extended glyphs and synthetic extension synthesized images for three city names of IFN/ENIT according to an exemplary embodiment.

FIG. 69 shows some samples of the results of the extended-glyphs and synthetic-extension synthesis. In one embodiment, the connections of the EG images are smooth enough to fool the native eye. The images synthesized by the SE technique have more variability in shapes due to the parameters selected from the PDFs.

Recognition Experimentation and Results

Figure 70:
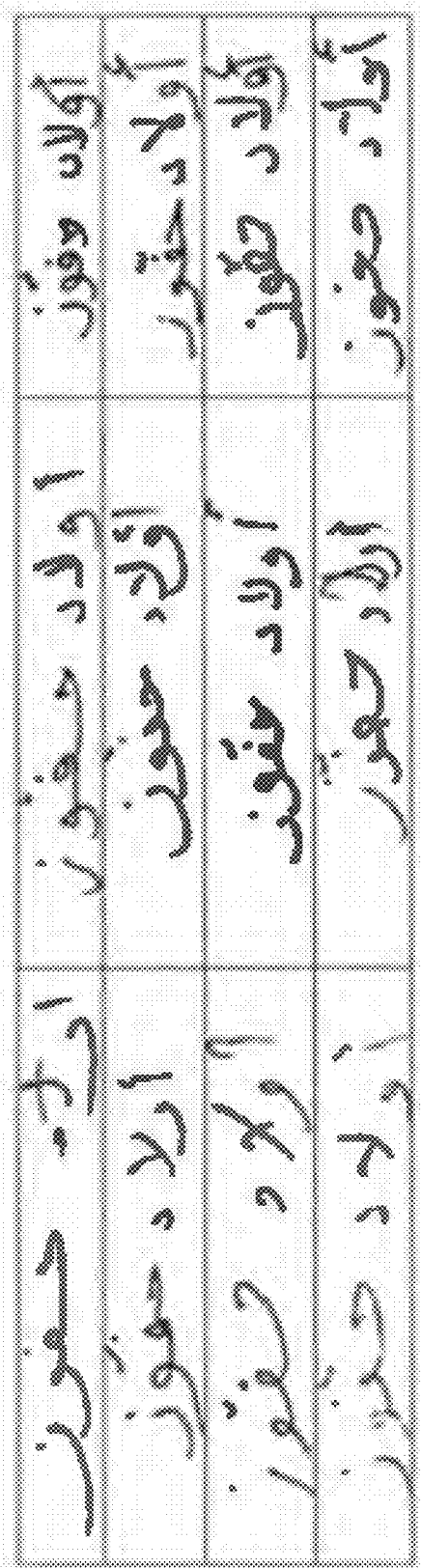
FIG. 70 illustrates a town/village name written by 12 different writers according to an exemplary embodiment.

Researchers use synthesized data to expand the training set of a recognition systems and hence enhance its recognition rate. It is demonstrated that the possibility of benefiting from the injection of synthesized data into the training set of recognition systems. The baseline system is trained on the 2,322 word samples from the dataset. The impact of injecting synthesized data to the baseline system is assessed and samples of the EG concatenation model are injected for one set of experiments and samples of the SE concatenation model for another set of experiments. SE results are better than GE results due to their components' variability. Furthermore, evaluation of the system takes place on Set 'D' and Set 'E' of the IFN/ENIT benchmark consisting of 937 city names. Some samples from IFN/ENIT are shown in FIG. 70. FIG. 70 illustrates names of towns/village names written by 12 different writers to further illustrates the type of different letter connections.

Our text recognition system is a continuous HMM system using the HTK tools. A left-to-right continuous Hidden Markov model (HMM) of Bakis topology with constant number of states per character-shape recognizer is used. Nine statistical features are extracted from the word images. These features are adapted from and appended nine derivative features to the original features such that the dimension of the feature vector is 18. Each character-shape HMM is modeled with the same number of states. The optimal number of states is decided based on the evaluation results.

Incremental numbers of injected data are experimented on and the results are summarized in Table 29. The top 1 word recognition rates (WRR), along with the statistical significance of the 95% confidence level, the top 5, and the top 10 best results are presented. After six samples per city name, the change in WRR halts being statistically significant.

TABLE 29

Results of injecting different number of 'SE' synthesized samples in the original training data.

| Number of samples injected for each of the 721 city names | Word Recognition Rates | | | |
| --- | --- | --- | --- | --- |
| | Top 1 | Statistical significance | Top 5 | Top 10 |
| Zero sample (Baseline System) | 48.52 | (±1.00) | 64.17 | 67.74 |
| One sample | 64.51 | (±0.97) | 78.09 | 81.67 |
| Two samples | 66.76 | (±0.95) | 81.05 | 84.09 |
| Three samples | 67.86 | (±0.94) | 81.66 | 84.68 |
| Four samples | 69.00 | (±0.94) | 82.67 | 85.38 |
| Five samples | 69.18 | (±0.94) | 82.05 | 84.89 |
| Six samples | 70.13 | (±0.93) | 82.94 | 85.53 |
| Seven samples | 69.82 | (±0.93) | 82.62 | 85.42 |
| Eight samples | 69.29 | (±0.93) | 82.54 | 85.55 |

TABLE 29-continued

Results of injecting different number of 'SE' synthesized samples in the original training data.

| Number of samples injected for each of the 721 city names | Word Recognition Rates | | | |
|---|---|---|---|---|
| | Top 1 | Statistical significance | Top 5 | Top 10 |
| Nine samples | 69.74 | (±0.93) | 82.89 | 85.59 |
| Ten samples | 70.58 | (±0.92) | 84.22 | 87.03 |

Figure 71:
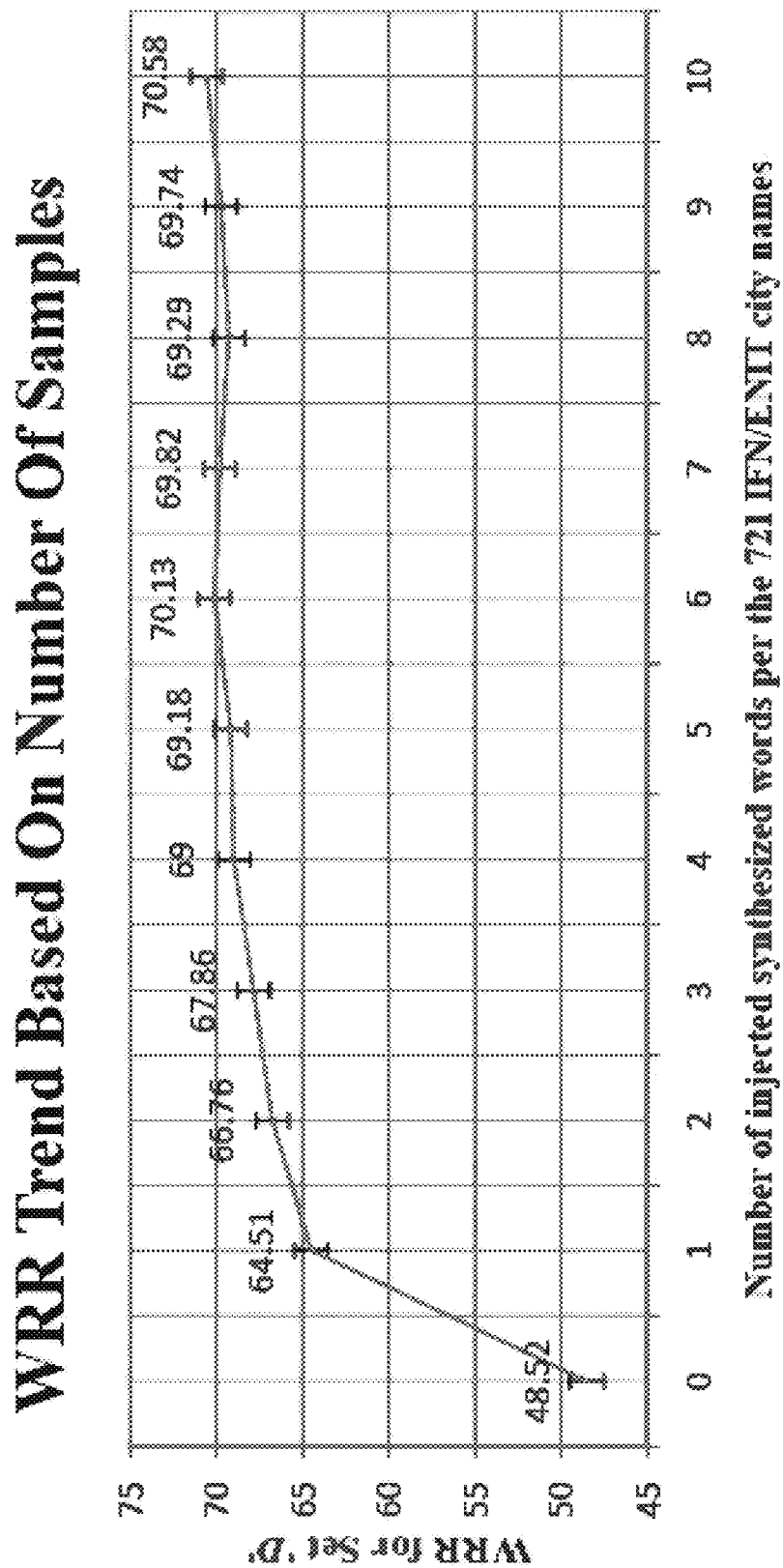
FIG. 71 illustrates recognition result and significance for injecting different number of SE synthesized samples in the original training data according to an exemplary embodiment.

The WRR trend with number of injected images for each city name is graphically shown in FIG. 71. FIG. 71 illustrates recognition results and significance for injecting different number of "SE" synthesized samples in the original training data.

Table 30 shows that the EG technique reports a WRR of 63.67%, an improvement of 9.93% whereas the SE technique reports a WRR of 70.13%, an improvement of 16.39% over the baseline system, and an improvement of 6.46% over the EG technique when tested on Set 'D'. It shows the same trend when tested on Set 'E'. It can be clearly seen from the table that adding synthesized training data to the baseline training set significantly improves the results. Both, the EG and the SE techniques, lead to significant improvement although SE lead to a better improvement. In order to make sure that the improvements are indeed due to the synthesized data and not only due to simple addition of more data, one more set of experiments is conducted where the baseline training data is doubled by simply adding a copy of the baseline images. The results using the double number of training samples did not show any significant improvement over the baseline system; thereby further corroborating the conclusions drawn on improvements due to synthesized data.

TABLE 30

Word Recognition Rates (WRR) for text recognition task on IFN/ENIT database.

| | Testing | | | | | | | |
|---|---|---|---|---|---|---|---|---|
| | Set 'D' | | | | Set 'E' | | | |
| Training | Top 1 | Statistical significance | Top 5 | Top 10 | Top 1 | Statistical significance | Top 5 | Top 10 |
| Baseline System | 53.74 | (±1.06) | 64.17 | 67.74 | 48.52 | (±1.00) | 67.31 | 70.35 |
| Doubled Baseline System | 53.82 | (±1.06) | 64.29 | 67.86 | 48.44 | (±1.00) | 67.30 | 70.29 |
| Expanded by EG synthesis | 63.67 | (±1.05) | 74.44 | 77.98 | 58.54 | (±0.97) | 77.65 | 80.67 |
| Expanded by SE synthesis | 70.13 | (±1.01) | 81.19 | 84.19 | 66.51 | (±0.93) | 82.94 | 85.53 |

Handwriting synthesis has applications that target recognition systems, the human eye, or both. Through the injection of segmented and re-concatenated Arabic characters, the present disclosure results in a significantly improved recognition system over one trained only on the collected samples. The improvement is shown to be due to the synthesis operations rather than to the mere repetition of the same data.

Synthesizing training sets can increase the variability of character-shapes, of their connections, or of both for a given handwriting dataset. Synthesis by concatenation of Arabic characters mostly adds to the variability of the connections between character-shapes, as well as the spacing and overlapping between them. It plays a role in enhancing the robustness of explicit or implicit segmentation, independently from the underlying system. Synthesis by concatenation is particularly useful for holistic recognition systems where under-represented patterns of a certain vocabulary can be needed.

A comprehensive dataset of unligative character-shapes is designed and Arabic character-shapes are collected from their natural flow within words. Thereafter, several character segmentation and alignment schemes are developed and evaluated to separate them. It is worth noting that the character evaluation framework of the present disclosure can be of benefit for benchmarking the currently open problem of Arabic character-segmentation.

Handwriting is synthesized from extended and strictly-segmented character-shapes. Extended character-shapes contain some connection extensions before/after the character body. They can be selected and connected directly, without need for explicit connection strokes between them. Strict character-shapes contain the character body without or with minimal extensions; hence, they need connection strokes between them. Synthetic connection strokes are modeled and generated for this aim.

The connections stroke is modeled by estimating discrete probabilities for the following parameters: the stroke width, the upper contour direction of each of 5 equal portions of the stroke entering to a specific character-shape, and the lower contour direction conditional to the corresponding upper contour direction value. While synthesizing handwriting from extended character-shapes may be easier, synthetic strokes add to the shape-variability of the synthesized handwriting.

As in natural data, the improvement due to the injection of synthesized data may gradually reach saturation. In one embodiment, six versions per each of the 721 Tunisian town/village names that are synthesized were enough for saturation. The extended glyphs technique resulted in an improvement of 9.93% and that of synthetic connections reached an improvement of 16.39% over the baseline system.

This work can be extended in a number of ways. Certain ligatures may be used instead of their corresponding unligative character-shapes. Generation-based synthesis can be used to increase the variability of character-shapes themselves. Other datasets can be used to enrich the investigations on their impact on different segmentation and recognition systems. Writing styles of specific writers can be captured and synthesized, and their results can be tested by the accuracy of writer-identification systems in distinguishing them.

Figure 82:
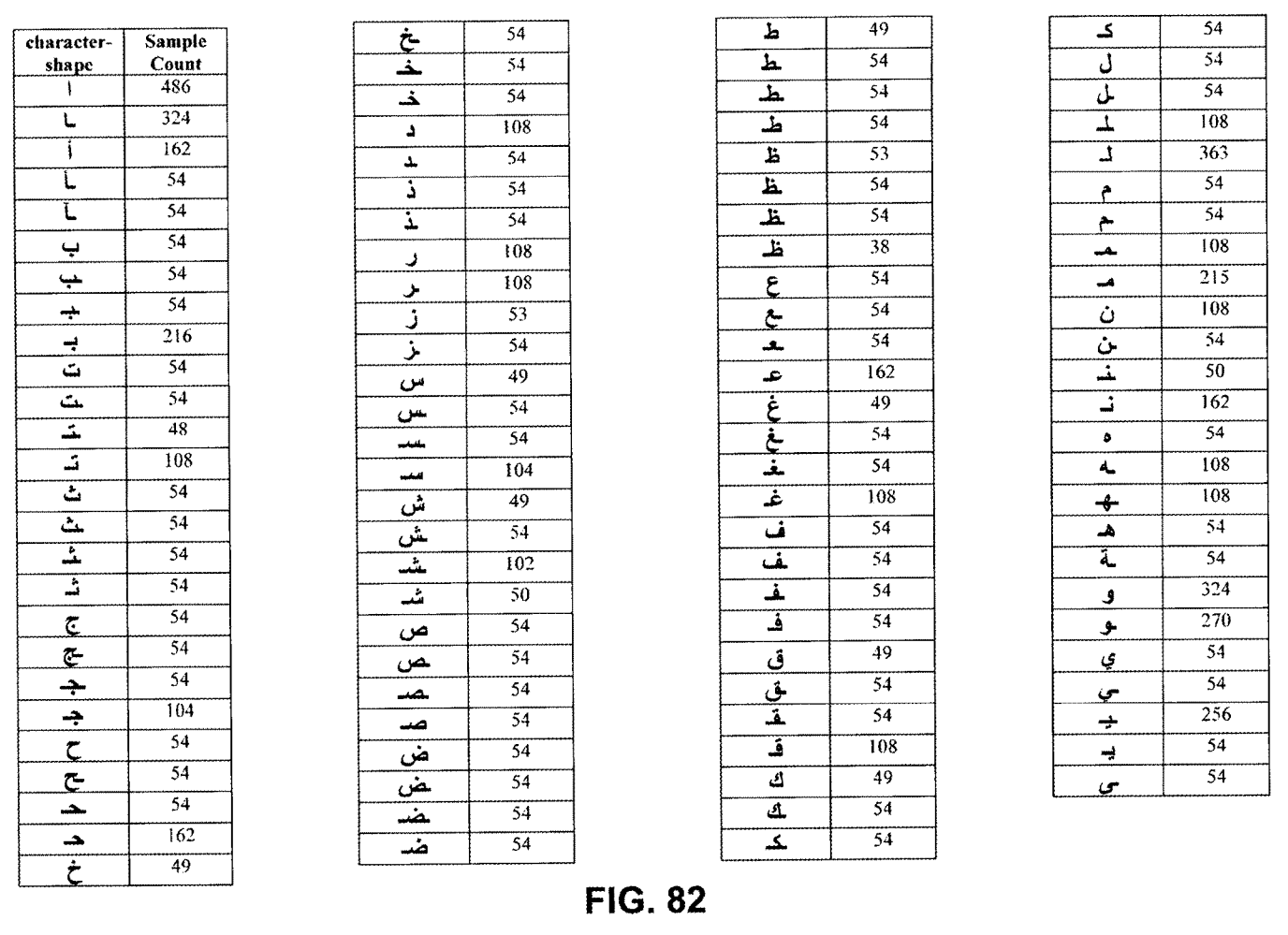

Table 31, illustrated by FIG. 82 shows numbers of samples per character-shape used in experiments.

Figure 83A:
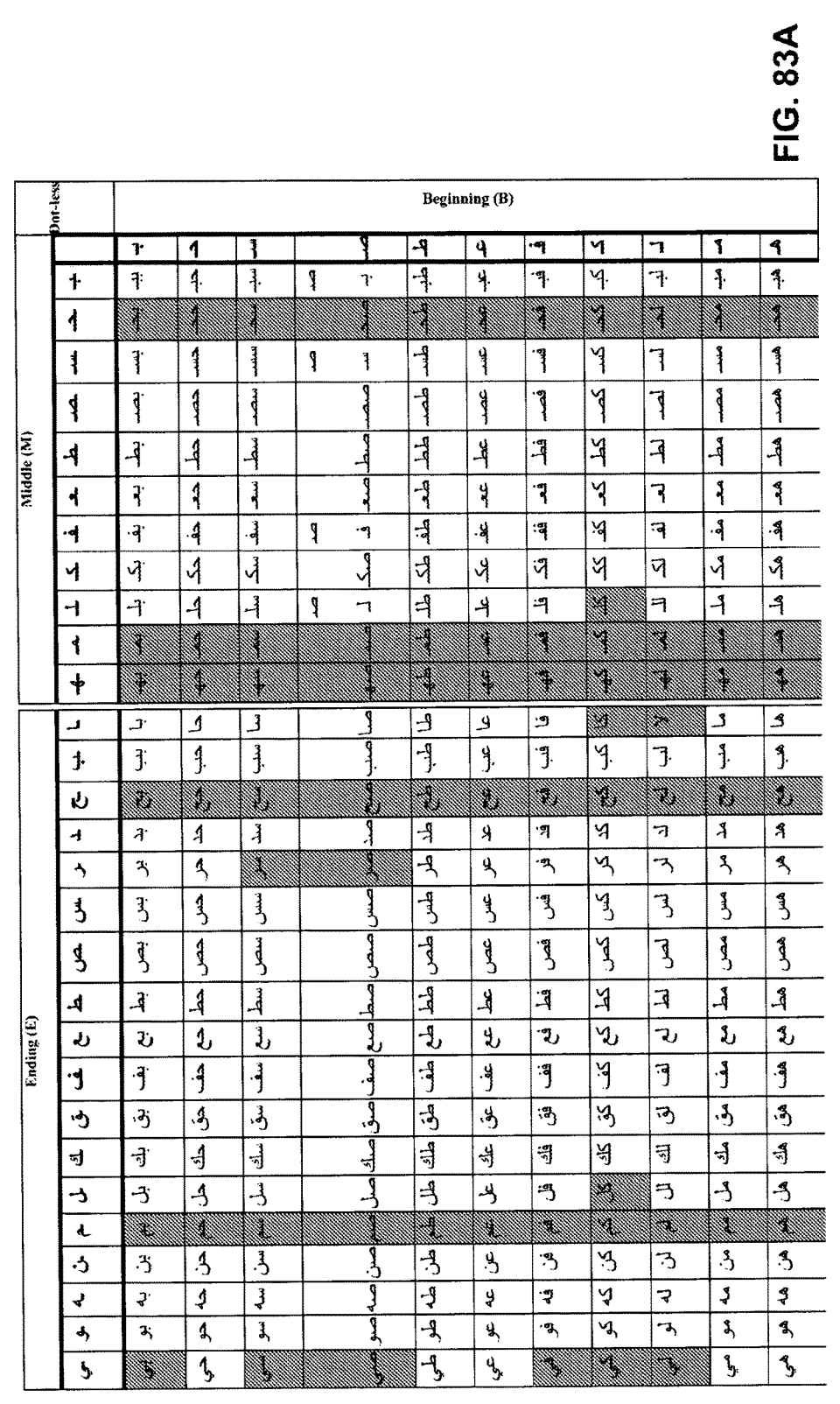
Figure 83B:
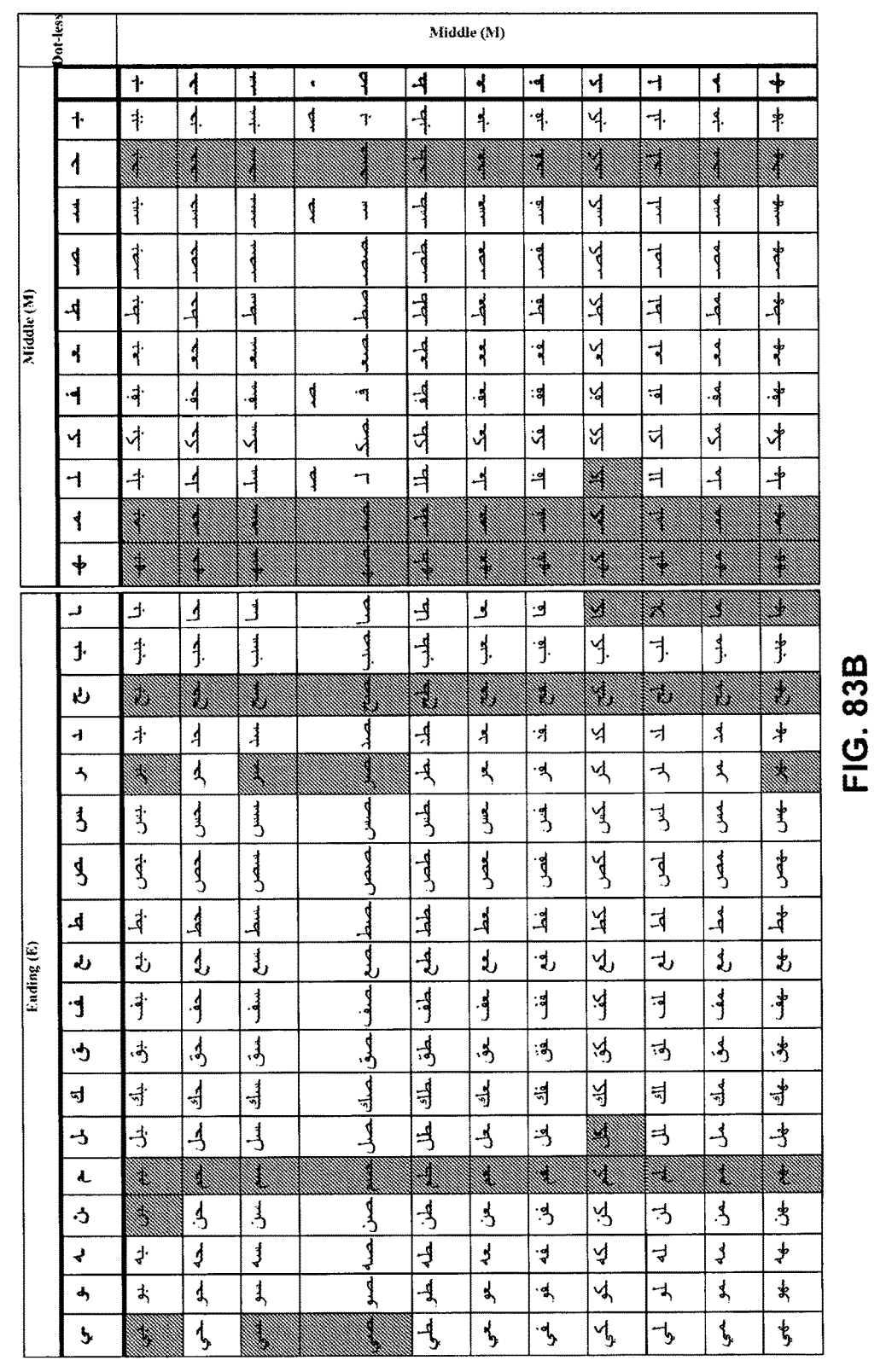

Table 32, illustrated by FIGS. 83A and 83B, illustrates bigrams of the dot-less typographic model representing 548 out of all possible 2,622.

TABLE 33

Probabilities of the passage part.
The average difference between corresponding character probabilities in the passage part and Gigaword is approximately 0.13%.

| character-shape | Gigaword | 1000 Forms |
|---|---|---|
| ء | 0.40% | 0.41% |
| ا | 10.97% | 10.02% |
| ـا | 7.01% | 7.17% |
| ب | 0.23% | 0.21% |
| بـ | 1.86% | 1.63% |
| ـبـ | 1.25% | 1.30% |
| ـب | 0.26% | 0.35% |
| ت | 0.96% | 1.10% |
| تـ | 1.36% | 1.64% |
| ـتـ | 2.31% | 2.74% |
| ـت | 0.38% | 0.26% |
| ث | 0.07% | 0.07% |
| ثـ | 0.20% | 0.17% |
| ـثـ | 0.25% | 0.30% |
| ـث | 0.07% | 0.12% |
| ج | 0.06% | 0.06% |
| جـ | 0.73% | 0.66% |
| ـجـ | 0.39% | 0.46% |
| ـج | 0.02% | 0.06% |
| ح | 0.09% | 0.09% |
| حـ | 0.70% | 0.73% |
| ـحـ | 0.58% | 0.61% |
| ـح | 0.06% | 0.07% |
| خ | 0.01% | 0.00% |
| خـ | 0.40% | 0.47% |
| ـخـ | 0.18% | 0.29% |
| ـخ | 0.02% | 0.01% |
| د | 1.21% | 1.06% |
| ـد | 2.15% | 2.21% |
| ذ | 0.17% | 0.20% |
| ـذ | 0.41% | 0.59% |
| ر | 1.92% | 1.70% |
| ـر | 3.48% | 2.93% |
| ز | 0.34% | 0.34% |
| ـز | 0.43% | 0.34% |
| س | 0.11% | 0.09% |
| سـ | 1.22% | 1.09% |
| ـسـ | 1.19% | 1.04% |
| ـس | 0.31% | 0.34% |
| ش | 0.02% | 0.00% |
| شـ | 0.47% | 0.29% |
| ـشـ | 0.65% | 0.74% |
| ـش | 0.04% | 0.02% |
| ص | 0.03% | 0.05% |
| صـ | 0.38% | 0.34% |
| ـصـ | 0.70% | 0.58% |
| ـص | 0.03% | 0.05% |
| ض | 0.07% | 0.08% |
| ضـ | 0.33% | 0.33% |
| ـضـ | 0.26% | 0.29% |
| ـض | 0.05% | 0.06% |
| ط | 0.03% | 0.04% |
| طـ | 0.34% | 0.32% |
| ـطـ | 0.63% | 0.66% |
| ـط | 0.09% | 0.09% |
| ظ | 0.01% | 0.01% |
| ظـ | 0.04% | 0.04% |
| ـظـ | 0.13% | 0.20% |
| ـظ | 0.01% | 0.01% |
| ع | 0.18% | 0.19% |
| عـ | 1.45% | 1.64% |
| ـعـ | 1.41% | 1.67% |
| ـع | 0.36% | 0.43% |
| غ | 0.00% | 0.01% |
| غـ | 0.17% | 0.12% |

TABLE 33-continued

Probabilities of the passage part.
The average difference between corresponding character probabilities in the passage part and Gigaword is approximately 0.13%.

| character-shape | Gigaword | 1000 Forms |
|---|---|---|
| ـغـ | 0.21% | 0.14% |
| ـغ | 0.10% | 0.02% |
| ف | 0.16% | 0.19% |
| فـ | 0.58% | 0.63% |
| ـفـ | 0.63% | 0.59% |
| ـف | 0.16% | 0.16% |
| ق | 0.20% | 0.18% |
| قـ | 1.04% | 0.97% |
| ـقـ | 1.17% | 1.25% |
| ـق | 0.20% | 0.22% |
| ك | 0.09% | 0.08% |
| كـ | 0.90% | 0.88% |
| ـكـ | 0.75% | 0.80% |
| ـك | 0.11% | 0.17% |
| ل | 0.63% | 0.61% |
| ـل | 5.69% | 5.90% |
| لـ | 1.71% | 1.89% |
| ـلـ | 0.63% | 0.79% |
| م | 0.61% | 0.46% |
| مـ | 2.69% | 2.58% |
| ـمـ | 1.33% | 1.55% |
| ـم | 0.42% | 0.55% |
| ن | 1.21% | 0.97% |
| نـ | 1.32% | 1.02% |
| ـنـ | 1.66% | 1.57% |
| ـن | 1.54% | 1.44% |
| ه | 0.16% | 0.24% |
| هـ | 0.59% | 0.77% |
| ـهـ | 0.86% | 1.11% |
| ـه | 0.41% | 0.51% |
| و | 3.08% | 3.44% |
| ـو | 3.11% | 2.58% |
| ى | 0.08% | 0.34% |
| يـ | 2.38% | 2.02% |
| ـيـ | 4.36% | 3.55% |
| ي | 0.23% | 0.92% |
| ئ | 0.00% | 0.00% |
| ـئ | 0.52% | 0.41% |
| ئـ | 0.09% | 0.12% |
| ـئـ | 0.00% | 0.00% |
| ة | 0.77% | 0.84% |
| ـة | 3.10% | 3.33% |
| ى | 0.42% | 0.16% |
| ـى | 1.57% | 0.79% |
| ؤ | 0.01% | 0.01% |
| ـؤ | 0.14% | 0.19% |
| أ | 0.48% | 1.05% |
| ـأ | 0.11% | 0.26% |
| إ | 0.15% | 0.47% |
| ـإ | 0.01% | 0.04% |
| آ | 0.03% | 0.04% |
| ـآ | 0.00% | 0.00% |

Next, a hardware description of a device according to exemplary embodiments illustrated in FIGS. 1-71 is described with reference to FIG. 72. In FIG. 72, the device includes a CPU 7200 which performs the processes described above. The process data and instructions may be stored in memory 7202. These processes and instructions may also be stored on a storage medium disk 7204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the present advancements may be provided as a utility application, background daemon, or component of an operating system, or combination thereof, executing in conjunction with CPU 7200 and an operating system such as Microsoft Windows 7, UNIX, Solaris, LINUX, Apple MAC-OS and other systems known to those skilled in the art.

CPU 7200 may be a Xenon or Core processor from Intel of America or an Opteron processor from AMD of America, or may be other processor types that would be recognized by one of ordinary skill in the art. Alternatively, the CPU 7200 may be implemented on an FPGA, ASIC, PLD or using discrete logic circuits, as one of ordinary skill in the art would recognize. Further, CPU 7200 may be implemented as multiple processors cooperatively working in parallel to perform the instructions of the inventive processes described above.

Figure 72:
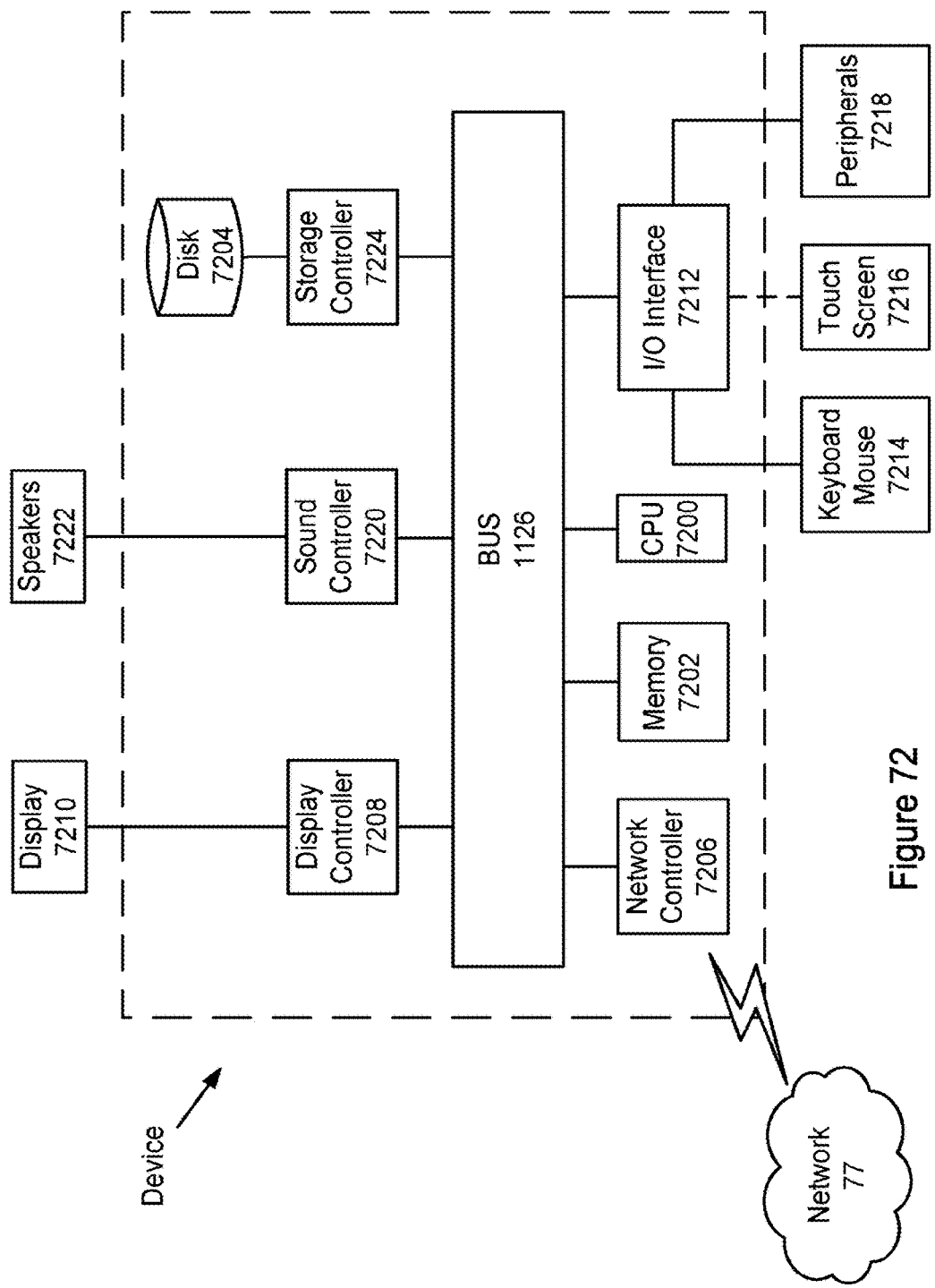
FIG. 72 illustrates a hardware diagram of a device according to exemplary embodiments.

The device in FIG. 72 also includes a network controller 7206, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The device further includes a display controller 7208, such as a NVIDIA GeForce GTX or Quadro graphics adaptor from NVIDIA Corporation of America for interfacing with display 7210, such as a Hewlett Packard HPL2445w LCD monitor. A general purpose I/O interface 7212 interfaces with a keyboard and/or mouse 7214 as well as a touch screen panel 7216 on or separate from display 7210. General purpose I/O interface also connects to a variety of peripherals 7218 including printers and scanners, such as an OfficeJet or DeskJet from Hewlett Packard.

A sound controller 7220 is also provided in the device, such as Sound Blaster X-Fi Titanium from Creative, to interface with speakers/microphone 7222 thereby providing sounds and/or music.

The general purpose storage controller 7224 connects the storage medium disk 7204 with communication bus 7226, which may be an ISA, EISA, VESA, PCI, or similar, for interconnecting all of the components of the device. A description of the general features and functionality of the display 7210, keyboard and/or mouse 7214, as well as the display controller 7208, storage controller 7224, network controller 7206, sound controller 7220, and general purpose I/O interface 7212 is omitted herein for brevity as these features are known.

Handwriting synthesis necessitates the acquisition of samples that cover a writing system. Coverage, here, refers to the presence of sufficient samples to be capable of generating any arbitrary text in a given scripting system. Moreover, the samples may need preprocessing and preparation to enhance their usage. Arabic typographic models and ligatures are analyzed and a design and collection of a covering dataset for Arabic script is implemented. In exemplary embodiments, digital text may be received and synthesized to produce hand written text associated with a user. From such synthesized text, arbitrary vocabulary for training and testing handwritten systems may be produced. In one example, different configurations or style versions of each word may be produced. Because Arabic language is different than other languages in styles and text, different style of illustration of different words may be completely different. For example, the same letter may be portrayed in any number of different styles, including how it connects to another letter via Kashida. In another example, the length of the Kashida may also play a factor in the style of the word presented.

Embodiments of the present disclosure may be used to make any number of versions of each word that is synthesized from handwritten text. Furthermore, parts of words may be arbitrarily elongated using the synthesized Kashidas described. Furthermore, the synthesized Kashidas may be further used to determine curvatures of the Kashidas to influence handwritten styles and synthesis of the handwritten styles. The device in FIG. 72, including CPU 7200 may be configured using the hardware and software configurations to output words that resemble specific writer's style in order to allow a user to digitally portray their own handwriting for example. Such output may be implemented in greater applications as will be further described hereinafter.

Further exemplary embodiments include training and testing data for handwriting optical character recognition (OCR) including word spotting and holistic recognition. Once data is generated and the word is input into the system, the aspects of the disclosure may be utilized to make enhanced determination on writer imitation and authentication related issues as well as determine forgery status on handwriting documentation. Exemplary aspects of the disclosure may also be used to enhance handwritten CAPTCHA determination uses in computer networks and internet authentication. Accordingly, the device may be utilized in determining forgery of input data for user handwriting samples. Such applications may be used in banking systems where personalized checks may be processed and handwriting can be checked. Furthermore, the device may be used in other applications including steganography which includes transferring of information through the shapes/lengths of the synthesized Kashidas as well as personalized font generation and aesthetical calligraphy generation used in word processing and digital art production.

In one exemplary embodiment, the Kashida manipulation of the present disclosure may include data encryption such that different Kashida lengths may denote different messages within the text. For example, words with certain Kashida lengths may be attributed to additional meanings beyond their known dictionary translation. While different Kashida lengths may denote different messages and meanings, in yet another exemplary embodiment, different emphasis of Kashida lengths of different letters may denote different meanings. For example, whether a specific letter includes an elongated Kashida or not may denote a specific meaning further to the actual length of the Kashida, which itself may also denote a specific meaning.

Thus, the foregoing discussion discloses and describes exemplary embodiments of the present disclosure for clarity. As will be understood by those skilled in the art, the present invention may be embodied in other specific forms without departing from the spirit or essential characteristics thereof and aspects of the exemplary embodiments described herein may be combined differently to form additional embodiments or omitted. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for synthesizing and outputting synthesized Arabic handwritten text, comprising:
 accessing, with circuitry, character shape images of Arabic characters of the Arabic alphabet;
 determining, with the circuitry, a connection point location between two or more character shapes based on a calculated right edge position, a calculated left edge position of the character shape images and baseline information;
 extracting, with the circuitry, character features that indicate Arabic language attributes and width attributes of characters of the character shape images, the Arabic language attributes including character Kashida attributes;
 identifying, with the circuitry, Kashida extensions as part of the character Kashida attributes;
 isolating, with the circuitry, the identified Kashida extensions from pepper noise components based on a predetermined ground-truth label, by constraining the extracted character features to be two consecutive characters;
 extracting, with the circuitry, the identified Kashida extensions based on the predetermined ground-truth label; and
 generating, with the circuitry, images of Arabic cursive text based on the character Kashida attributes and the width attributes.

2. The method of claim 1, further comprising
 removing a left edge segment and a right edge segment from the identified Kashida extensions.

3. The method of claim 2, wherein a width of each of the left edge segment and the right edge segment is adaptively computed based on a Kashida width based on the calculated right edge position and the calculated left edge position.

4. The method of claim 2, further comprising:
 classifying each extracted Kashida based on at least: a width of the extracted Kashida, a slope of an upper contour direction (UCD) of the extracted Kashida, and a slope of a lower contour direction (LCD) of the extracted Kashida.

5. The method of claim 4, further comprising:
 generating a width probability density function (PDF) for each of the width, UCD and LCD of the extracted Kashida,
 wherein the width PDF is generated based on one or more selected square bins having a width of 8-pixel; and
 discarding extracted Kashida having a width of less than 6-pixels.

6. The method of claim 5, further comprising:
 generating the width PDF based on at least one of an author related attribute of the character shape, an Arabic character from which the extracted Kashida originates, or an Arabic character to which the extracted Kashida connects.

7. The method of claim 1, further comprising:
 filtering out attributes relating to a thickness of a left edge segment and a thickness of a right edge segment of the extracted Kashida.

* * * * *